July 12, 1966 R. E. STOBBE 3,259,957

PRESETTABLE CONTROL SYSTEM

Filed Sept. 3, 1963 29 Sheets-Sheet 1

INVENTOR.
Richard E. Stobbe
BY William C. Gleisner, Jr.
Attorney

PRESETTABLE CONTROL SYSTEM

Filed Sept. 3, 1963 29 Sheets-Sheet 2

INVENTOR.
Richard E. Stobbe
BY William C. Gleisner Jr.
Attorney

INVENTOR.
Richard E. Stobbe
BY William C. Gleisner, Jr.
Attorney

Fig. 4

PROGRAM SELECTORS

FUNCTIONS AVAILABLE FOR EACH PROGRAM PHASE, AND DETERMINED BY CODED SETTING OF EACH COOPERATING PAIR OF PROGRAM SELECTOR SWITCHES, CORRESPONDING TO A PARTICULAR PROGRAM PHASE

| CODED SWITCH INDICIA | | | | | | | | | | | | | | | | | | | | | CODED SETTING | | FUNCTION SELECT CONTROLLERS—RELAY BANKS | |
|---|---|---|---|---|---|---|---|---|---|---|---|---|---|---|---|---|---|---|---|---|---|---|---|---|
| XS | YS | ZS | A | S | XX | YY | ZZ | XR | YR | P1 | P2 | P3 | P4 | P5 | P6 | P7 | P8 | P9 | P0 | FUNCTIONS SELECTED | "A" SWITCHES | "B" SWITCHES | AR | BR |
| X | | | | | | | | | | X | | | | | | | | | | X MOVEMENT-RATE AND POSITION | XS | P1 | AXS | BP1 |
| | X | | | | | | | | | X | | | | | | | | | | Y MOVEMENT " " " | YS | P1 | AYS | BP1 |
| | | X | | | | | | | | X | | | | | | | | | | Z MOVEMENT " " " | ZS | P1 | AZS | BP1 |
| | | | | | X | | | | | X | | | | | | | | | | X MOVEMENT " " " | XX | P1 | AXX | BP1 |
| | | | | | | X | | | | X | | | | | | | | | | Y MOVEMENT " " " | YY | P1 | AYY | BP1 |
| | | | | | | | X | | | X | | | | | | | | | | Z MOVEMENT " " " | ZZ | P1 | AZZ | BP1 |
| | | | | | | | | X | | X | | | | | | | | | | X MOVEMENT-RAPID AND POSITION | XR | P1 | AXR | BP1 |
| | | | | | | | | | X | X | | | | | | | | | | Y MOVEMENT " " " | YR | P1 | AYR | BP1 |
| | | | | | | | | | | | | | | | | | | | | | | | | |
| | | | | X | | | | | | X | | | | | | | | | | SUB-CYCLE I | S | P1 | AS | S1 |
| | | | | X | | | | | | | X | | | | | | | | | SUB-CYCLE II | S | P2 | AS | S2 |
| | | | | X | | | | | | | | X | | | | | | | | SUB-CYCLE III | S | P3 | AS | S3 |
| | | | | X | | | | | | | | | X | | | | | | | SUB-CYCLE IV | S | P4 | AS | S4 |
| | | | X | | | | | | | X | | | | | | | | | | PLANNED STOP | A | P1 | AA | BP1 |
| | | | X | | | | | | | | X | | | | | | | | | END OF PROGRAM | A | P2 | AA | BP2 |
| | | | X | | | | | | | | | X | | | | | | | | SPINDLE ON CW | A | P3 | AA | BP3 |
| | | | X | | | | | | | | | | X | | | | | | | SPINDLE ON CCW | A | P4 | AA | BP4 |
| | | | X | | | | | | | | | | | X | | | | | | SPINDLE OFF | A | P5 | AA | BP5 |
| | | | X | | | | | | | | | | | | X | | | | | TOOL CHANGE | A | P6 | AA | BP6 |
| | | | X | | | | | | | | | | | | | X | | | | MIST COOLANT ON | A | P7 | AA | BP7 |
| | | | X | | | | | | | | | | | | | | X | | | COOLANT ON | A | P8 | AA | BP8 |
| | | | X | | | | | | | | | | | | | | | X | | COOLANT OFF | A | P9 | AA | BP9 |
| | | | X | | | | | | | | | | | | | | | | X | PROGRAM STOP | A | P0 | AA | BP0 |
| | | | | | | | | | | | | | | | | | | | | | | | | |
| | | | | X | | | | | | | | | | | | X | | | | RECYCLE | S | P7 | AS | BP7 |

"A" SELECTOR SWITCHES "B" SELECTOR SWITCHES

INVENTOR.
Richard E. Stobbe
BY William C. Gleisner, Jr.
Attorney

INVENTOR.
Richard E. Stobbe
BY William C. Gleisner Jr.
Attorney

INVENTOR.
Richard E. Stobbe
BY William C. Gleisner Jr.
Attorney

INVENTOR.
Richard E. Stobbe
BY William P. Gleisner Jr.
Attorney

July 12, 1966 R. E. STOBBE 3,259,957

PRESETTABLE CONTROL SYSTEM

Filed Sept. 3, 1963 29 Sheets-Sheet 8

INVENTOR.
Richard E. Stobbe
BY William C. Gleisner Jr.
Attorney

INVENTOR.
Richard E. Stobbe
BY William C. Gleisner Jr.
Attorney

INVENTOR.
Richard E. Stobbe
BY William C. Gleisner Jr.
Attorney

INVENTOR.
Richard E. Stobbe
BY William C. Gleisner Jr.
Attorney

INVENTOR.
Richard E. Stobbe
BY William C. Gleisner Jr.
Attorney

INVENTOR.
Richard E. Stobbe
BY William C. Gleisner Jr.
Attorney

PRESETTABLE CONTROL SYSTEM

Filed Sept. 3, 1963

INVENTOR.
Richard E. Stobbe
BY William C. Gleisner, Jr.
Attorney

INVENTOR.
Richard E. Stobbe
BY William C. Gleisner Jr.
Attorney

INVENTOR.
Richard E. Stobbe
BY William C. Gleisner
Attorney

INVENTOR.
Richard E. Stobbe
BY William C. Gleisner Jr.
Attorney

July 12, 1966 R. E. STOBBE 3,259,957

PRESETTABLE CONTROL SYSTEM

Filed Sept. 3, 1963 29 Sheets-Sheet 18

INVENTOR.
Richard E. Stobbe
BY William C. Gleisner Jr.
Attorney

INVENTOR.
Richard E. Stobbe
BY William C. Gleisner Jr.
Attorney

July 12, 1966 R. E. STOBBE 3,259,957

PRESETTABLE CONTROL SYSTEM

Filed Sept. 3, 1963 29 Sheets-Sheet 20

INVENTOR.
Richard E. Stobbe
BY William C. Gleisner Jr.
Attorney

INVENTOR.
Richard E. Stobbe
BY William C. Gleisner Jr.
Attorney

July 12, 1966 R. E. STOBBE 3,259,957

PRESETTABLE CONTROL SYSTEM

Filed Sept. 3, 1963 29 Sheets-Sheet 22

INVENTOR.
Richard E. Stobbe
BY William C. Gleisner, Jr.
Attorney

INVENTOR.
Richard E. Stobbe
BY William C. Gleisner Jr.
Attorney

INVENTOR.
Richard E. Stobbe
BY William C. Gleisner Jr.
Attorney

INVENTOR.
Richard E. Stobbe
BY William C. Fleisner Jr.
Attorney

INVENTOR.
Richard E. Stobbe
BY William C. Glenning
Attorney

INVENTOR.
Richard E. Stobbe
BY William C. Gleisner Jr.
Attorney

July 12, 1966 R. E. STOBBE 3,259,957

PRESETTABLE CONTROL SYSTEM

Filed Sept. 3, 1963 29 Sheets-Sheet 28

INVENTOR.
Richard E. Stobbe
BY William C. Heisner Jr.
Attorney

INVENTOR.
Richard E. Stobbe
BY William C. Gleisner Jr.
Attorney

United States Patent Office 3,259,957
Patented July 12, 1966

3,259,957

PRESETTABLE CONTROL SYSTEM

Richard E. Stobbe, Milwaukee, Wis., assignor to Kearney & Trecker Corporation, West Allis, Wis., a corporation of Wisconsin Filed Sept. 3, 1963, Ser. No. 306,077
14 Claims. (Cl. 29—26)

This invention is directed generally to a presettable control system adapted to preset a program of events or functions in such a manner that a machine can be automatically operated to perform the preselected events or functions in accordance with the preset program.

A principal object of the invention is to provide a manually presettable program control system having great flexibility in use.

Another object is to provide a unique coded selectivity in the manner in which a program control system may be manually preset in order to greatly enlarge the total number of machine functions or machine events that are available in each succeeding step of the preset program.

Another object is to provide an improved program control system that is manually presettable to predetermine the sequence in which machine functions are to occur, with selected program steps being preset to program a sub-cycle or sub-routine in such a manner that selected portions of a preset program may be selectively repeated during the entire machine program.

Another object is to provide a program control system capable of manual presetting for determining the order of machine events or functions, with the added capability of recycling selected program steps to increase the total number of machine events or functions that are available.

Another object of the invention is to provide an improved manually presettable program control system in combination with a machine tool and that is operative to constitute a quickly presettable manual data input supply system for effecting selected machine functions in any predetermined sequence.

A still further object of the invention is to provide an improved manually presettable program control system that is comparable in flexibility of operation with a tape control system, without the necessity of utilizing a record such as punched or magnetic tape to store the program of events that are to take place.

According to this invention, a manually presettable control system is illustrated in combination with a milling machine having a rotatable tool spindle and a cooperating work support carried for rectilinear movement in three mutually perpendicular planes. The milling machine is adapted to perform a plurality of functions in any predetermined sequence for effecting a complete program of machining operations on a workpiece. To effect this result, the program control system is provided with a plurality of sequentially energizable phases of operation, with distinct movements or functions being effectuated during each phase under command of input instructions that are manually preset on a single, central control panel.

The main program selectors comprise separate pairs of coordinately operable program selector switches that are operable in code fashion to select the particular function or functions which are to subsequently occur during that corresponding phase of machine operation. Separate sets, or banks of switches provided on the same central control panel are likewise presettable for determining the extent of worktable movement in each of its three mutually perpendicular planes, the rate of worktable movement as it is being moved to predetermined position, and the rate of spindle rotation. These sets of position determining switches, feed rate determining switches, and spindle speed rate determining switches, are operable in coordinated relationship with the plurality of pairs of program selector switches for effecting the required positioning movements and rate controlled movements during a complete program of operations. The arrangement is such that the position determining switches preset command voltages for controlling the input to a lineal transducer or positioning control device associated with each axis of movement, the positioning transducer being adapted to provide an error output signal for controlling servo drive means to achieve the selected position.

Completion of one preselected function operates to advance the program control for automatically initiating the next preset function. To provide the utmost flexibility in operation, recycle selector switches and subcycle selector switches are presettable to modify the sequence of events or instructions which are sequentially ordered by the code operated program selector switches. The recycle selector switches, for example, are operative to be preset for either skipping certain program phases during a portion of the overall machine program, or repeating certain preset program phases whenever this is advantageous to an enlargement of the total available program controlled steps or phases of machine operation. Likewise, the subcycle selector switches are adapted to be preset for controlling a preselected sequence of machine functions that may be advantageously repeated in identical sequence at selected points throughout the entire machine program.

The foregoing and other objects of the invention which will become more fully apparent from the following detailed description of apparatus exemplifying this invention, may be achieved by the particular presettable program control system and associated machine tool described herein as a preferred embodiment thereof in connection with the accompanying drawings, in which:

FIG. 4 is a chart illustrating certain of the coded settings for effecting a desired machine function;

Figure 9:
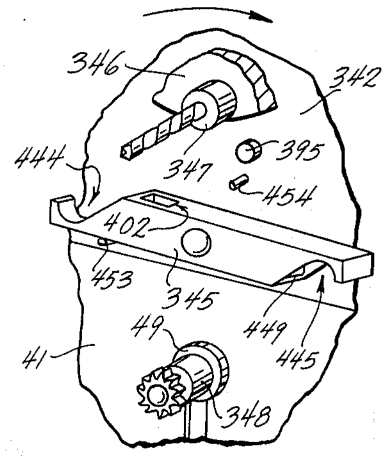
Figure 9A:
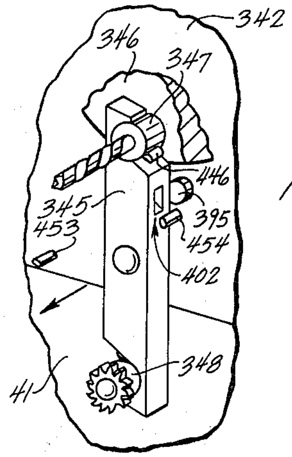
Figure 9B:
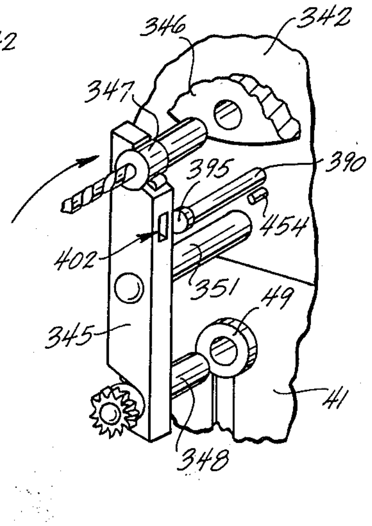
Figure 9C:
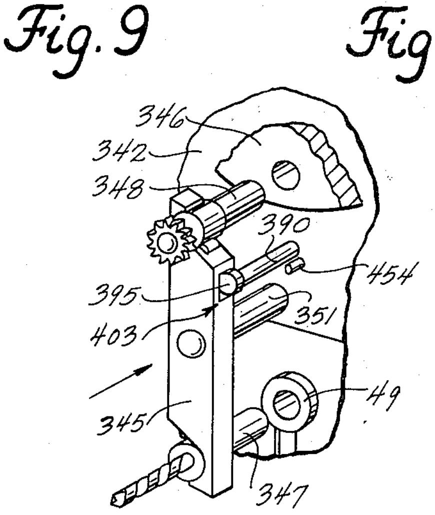
Figure 9D:
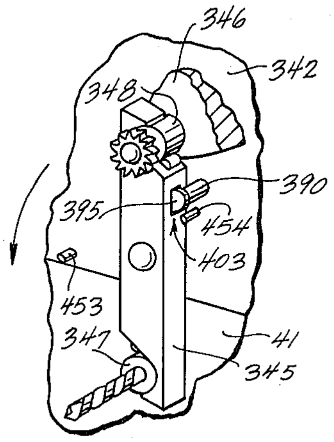
Figure 9E:
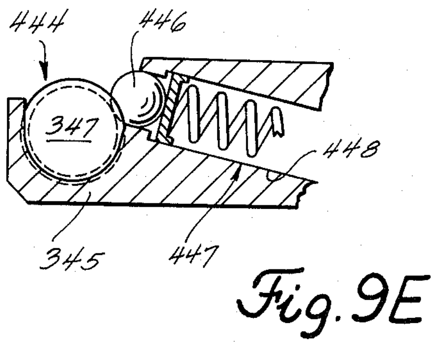
Figure 10:
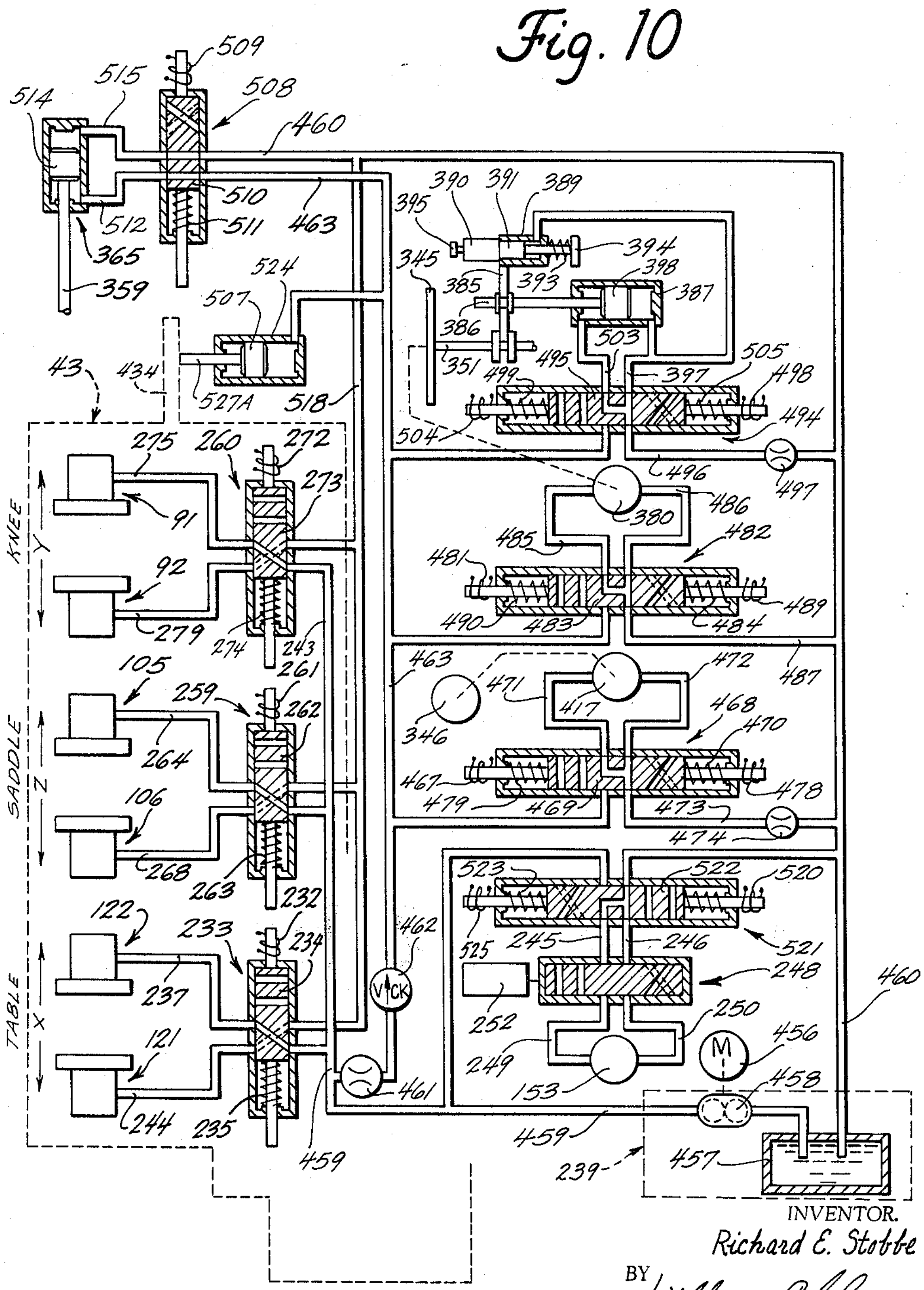
Figure 11:
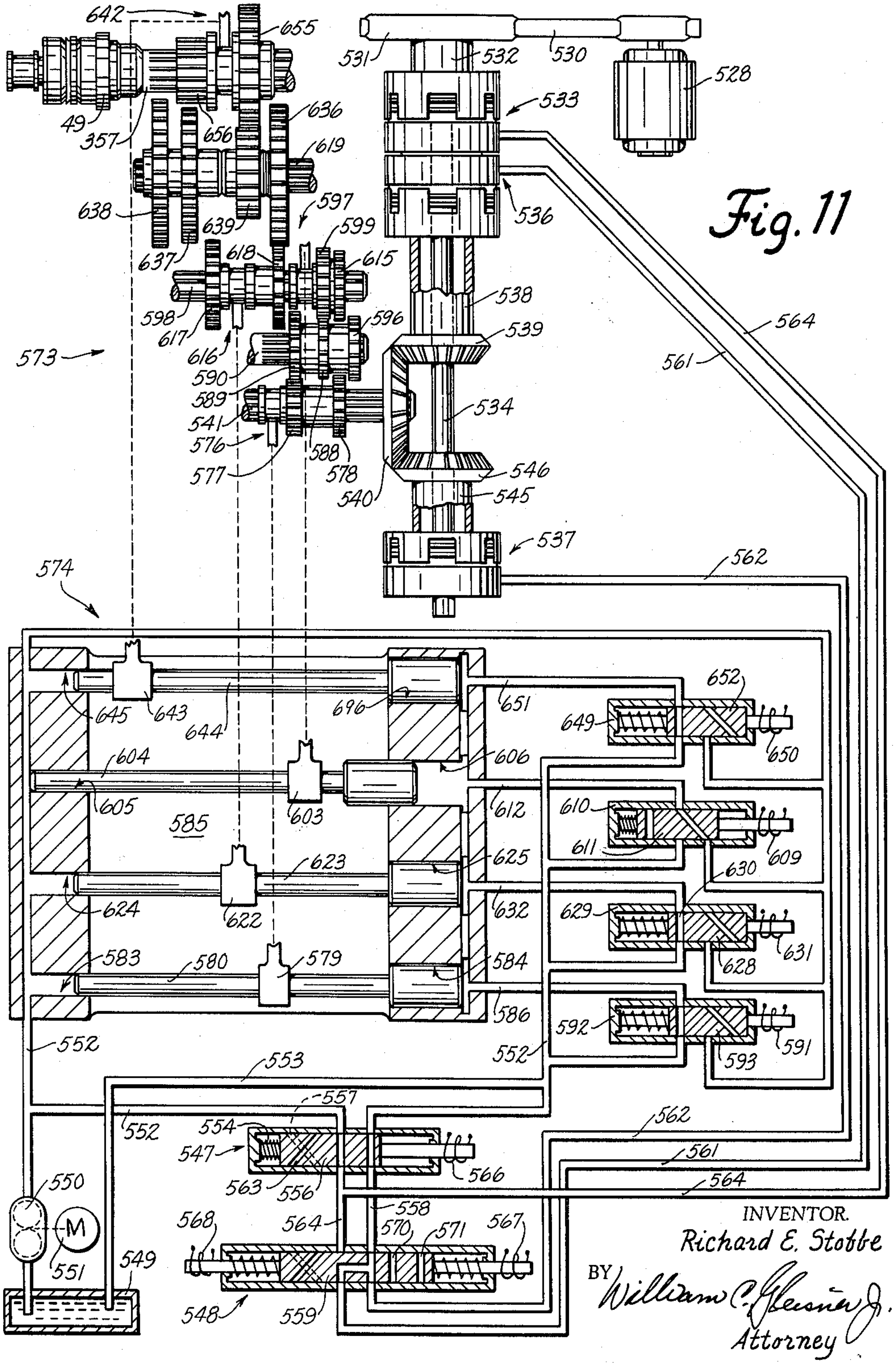
Figure 12:
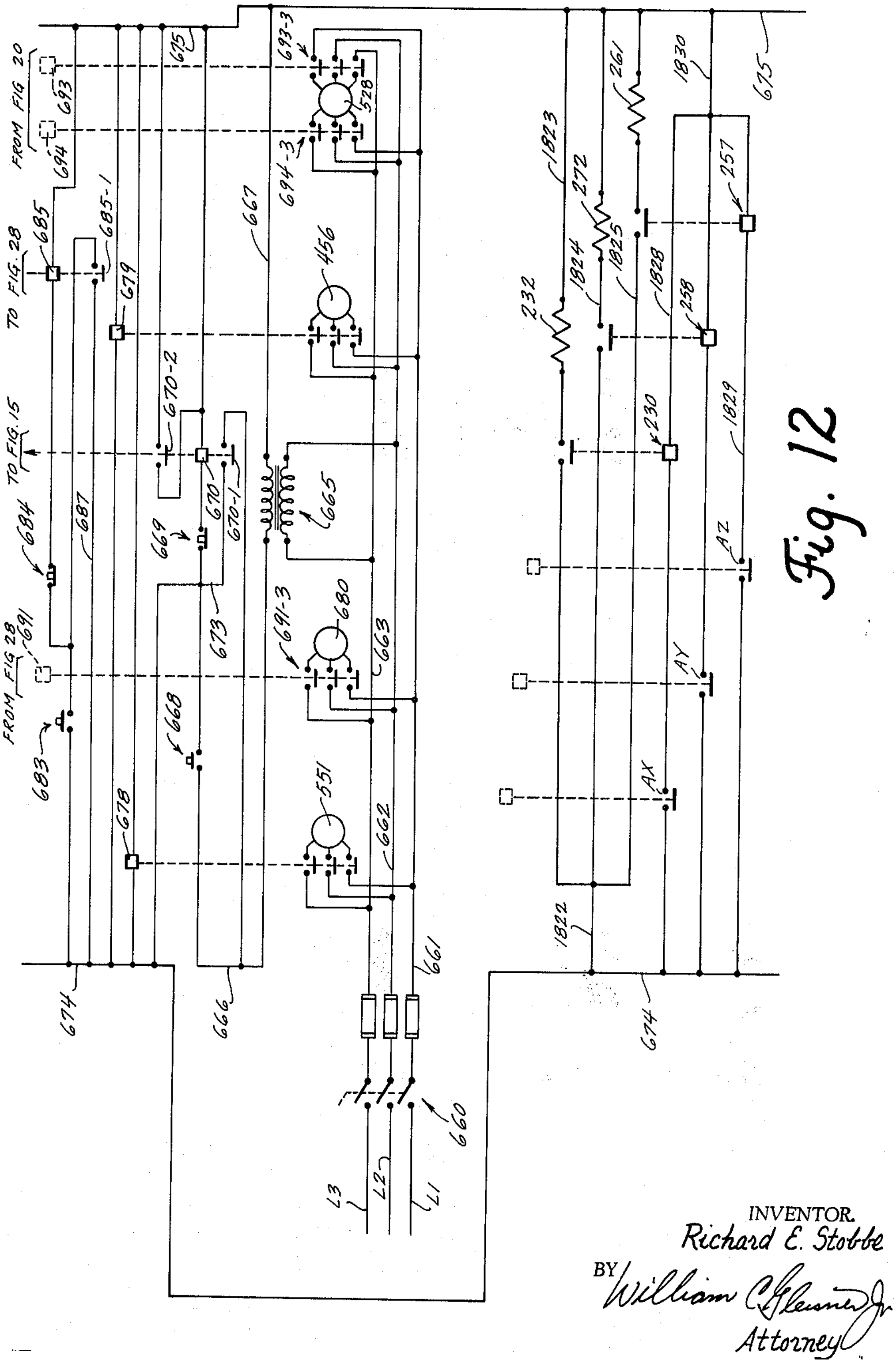
Figure 13:
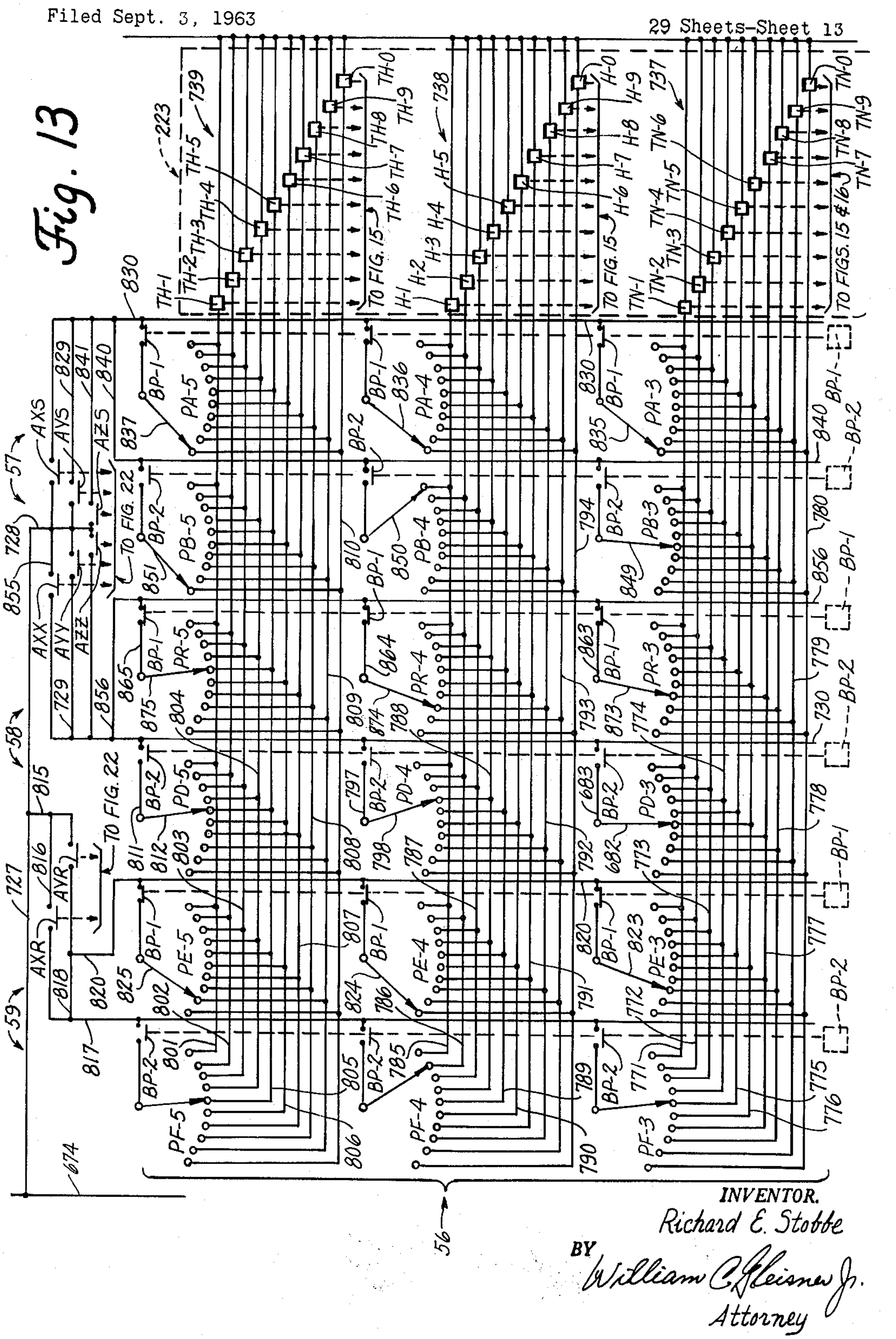
Figure 14:
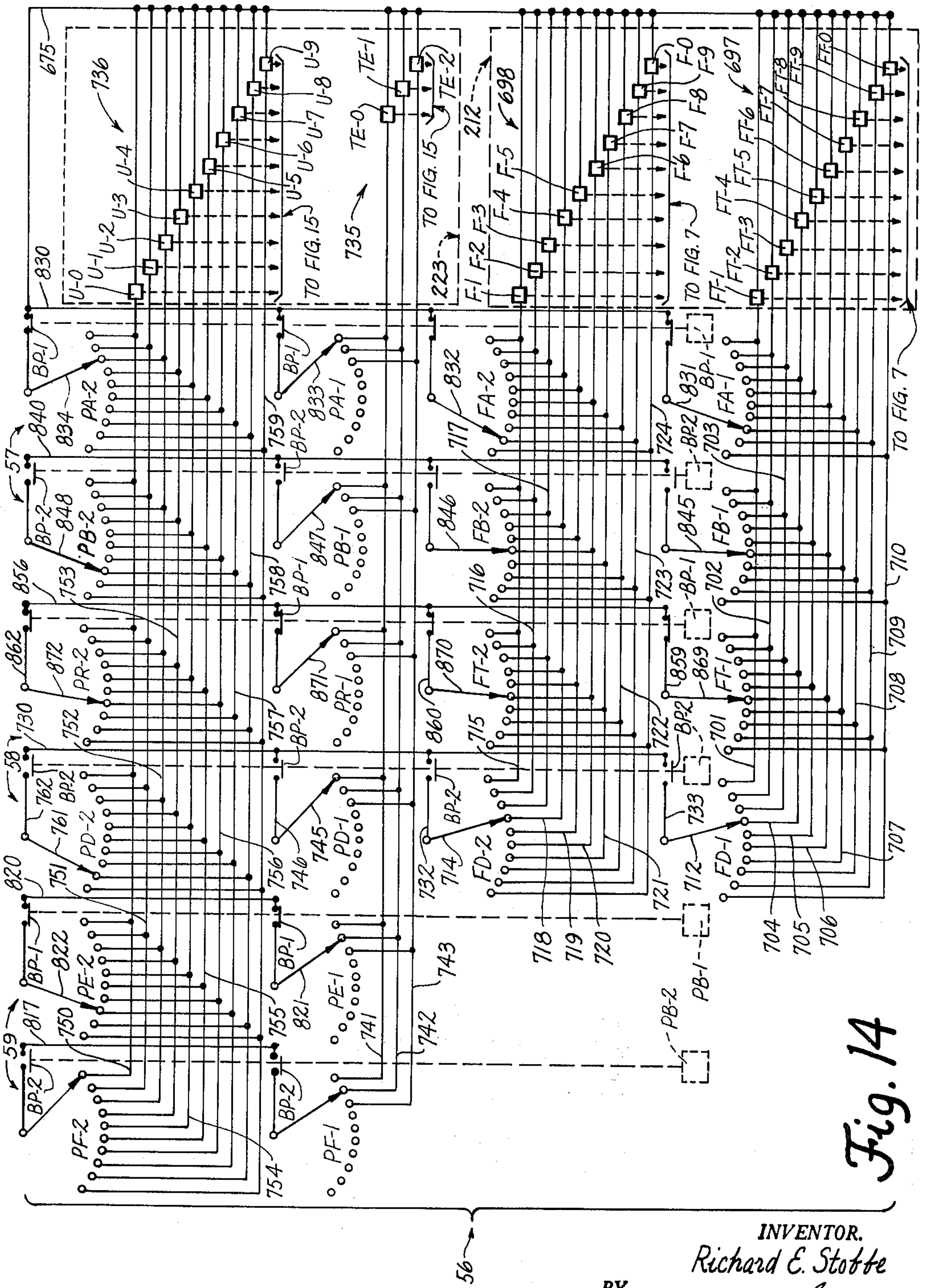
Figure 15:
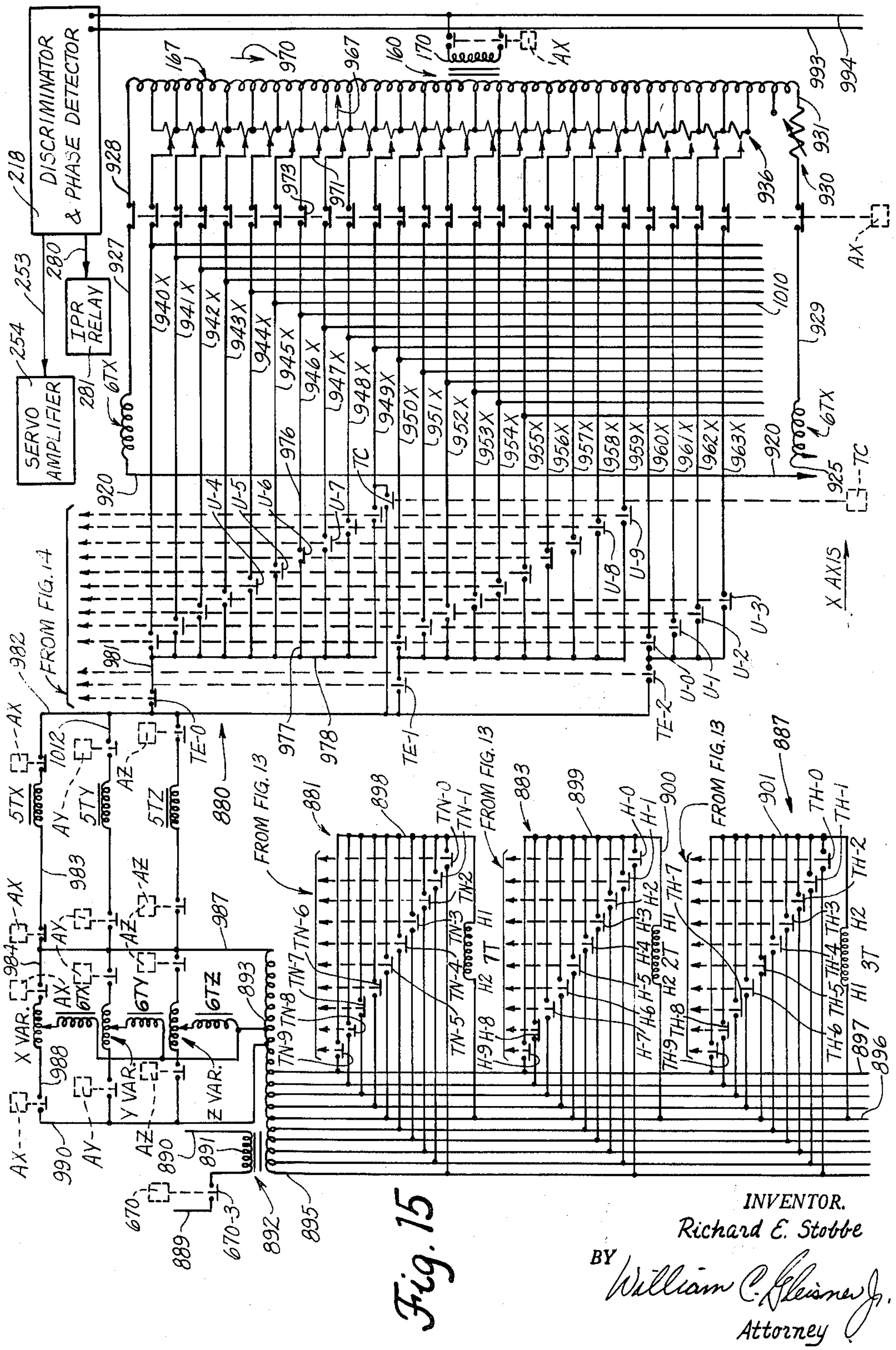
Figure 16:
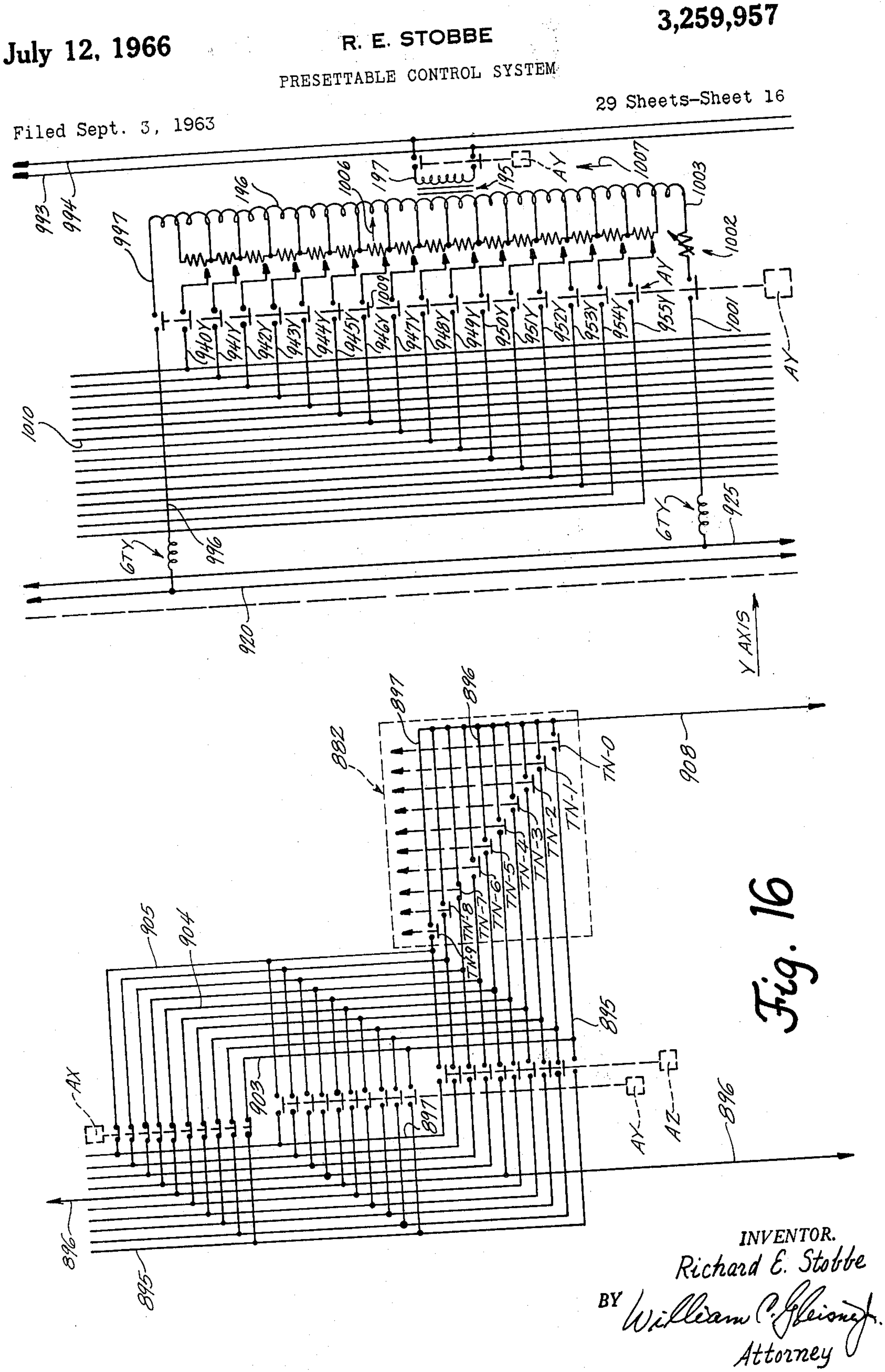
Figure 17:
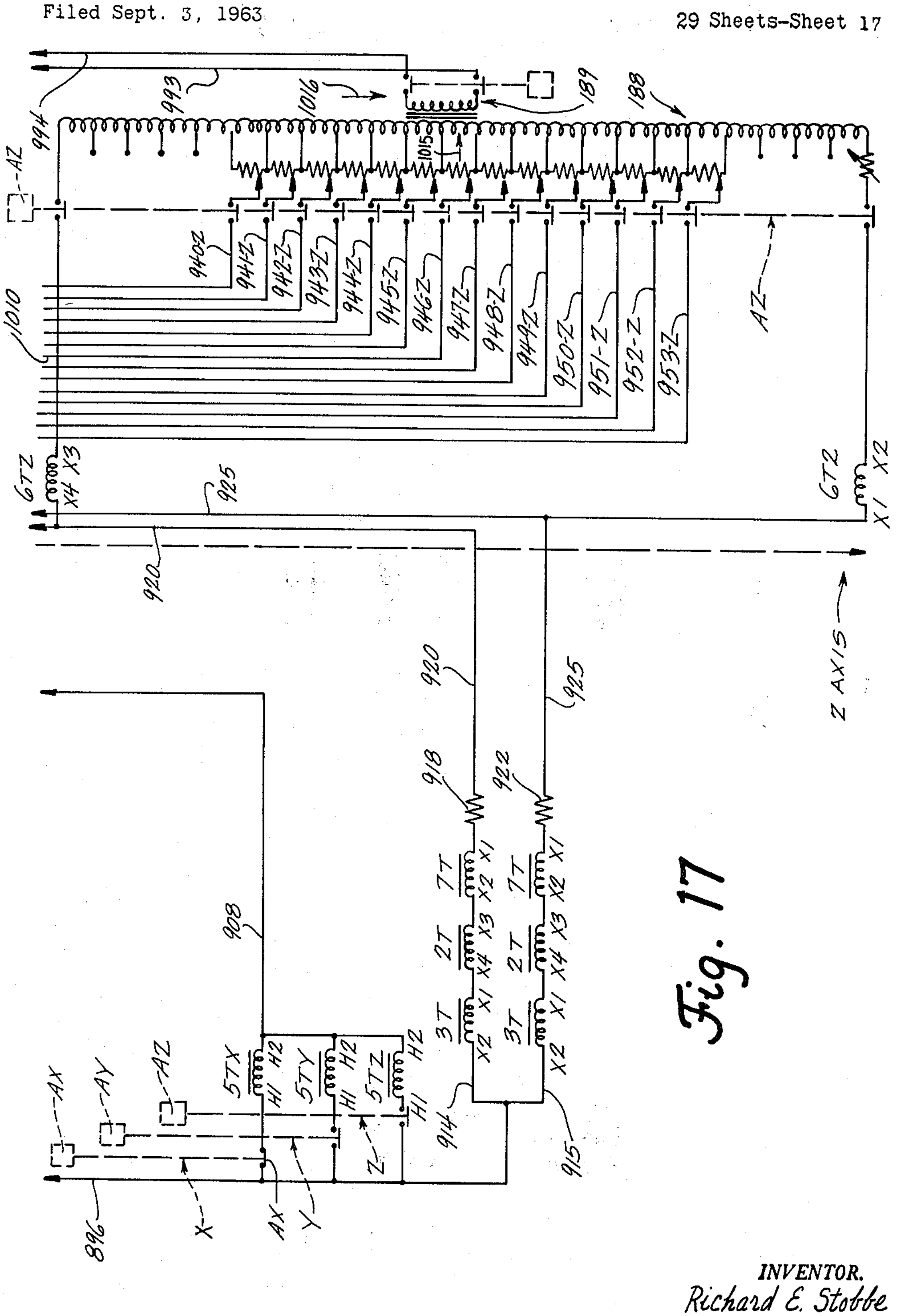
Figure 18:
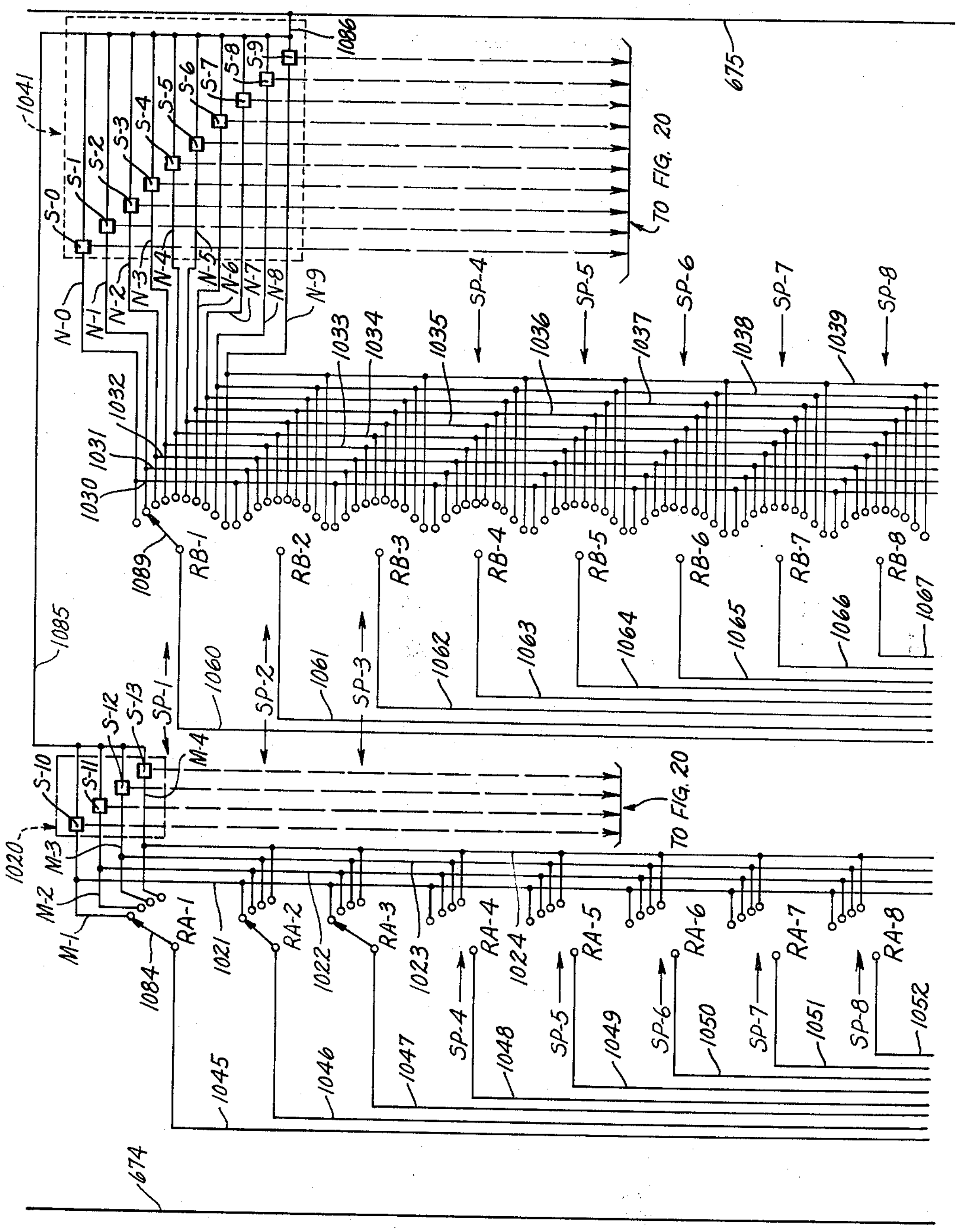
Figure 19:
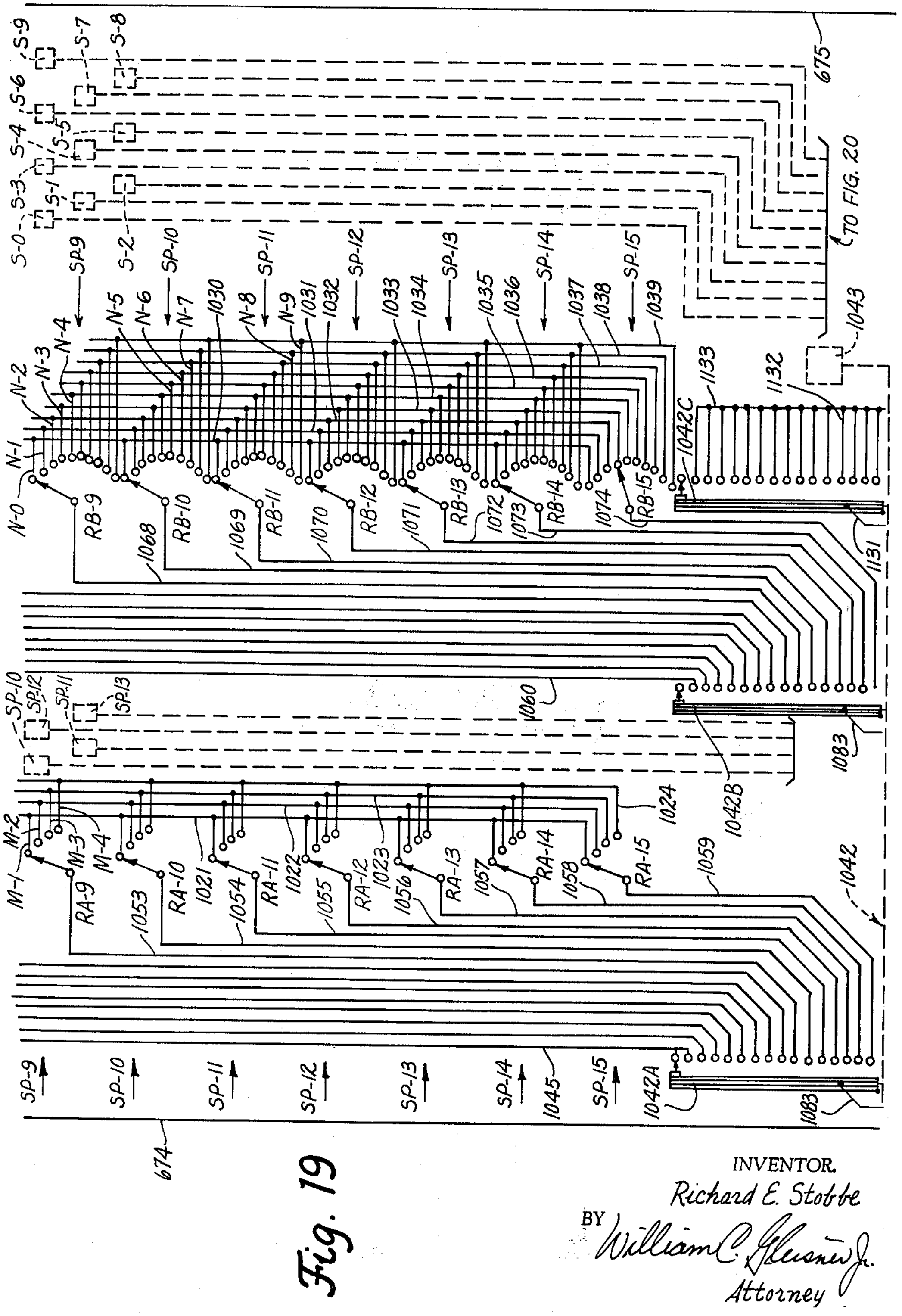
Figure 20:
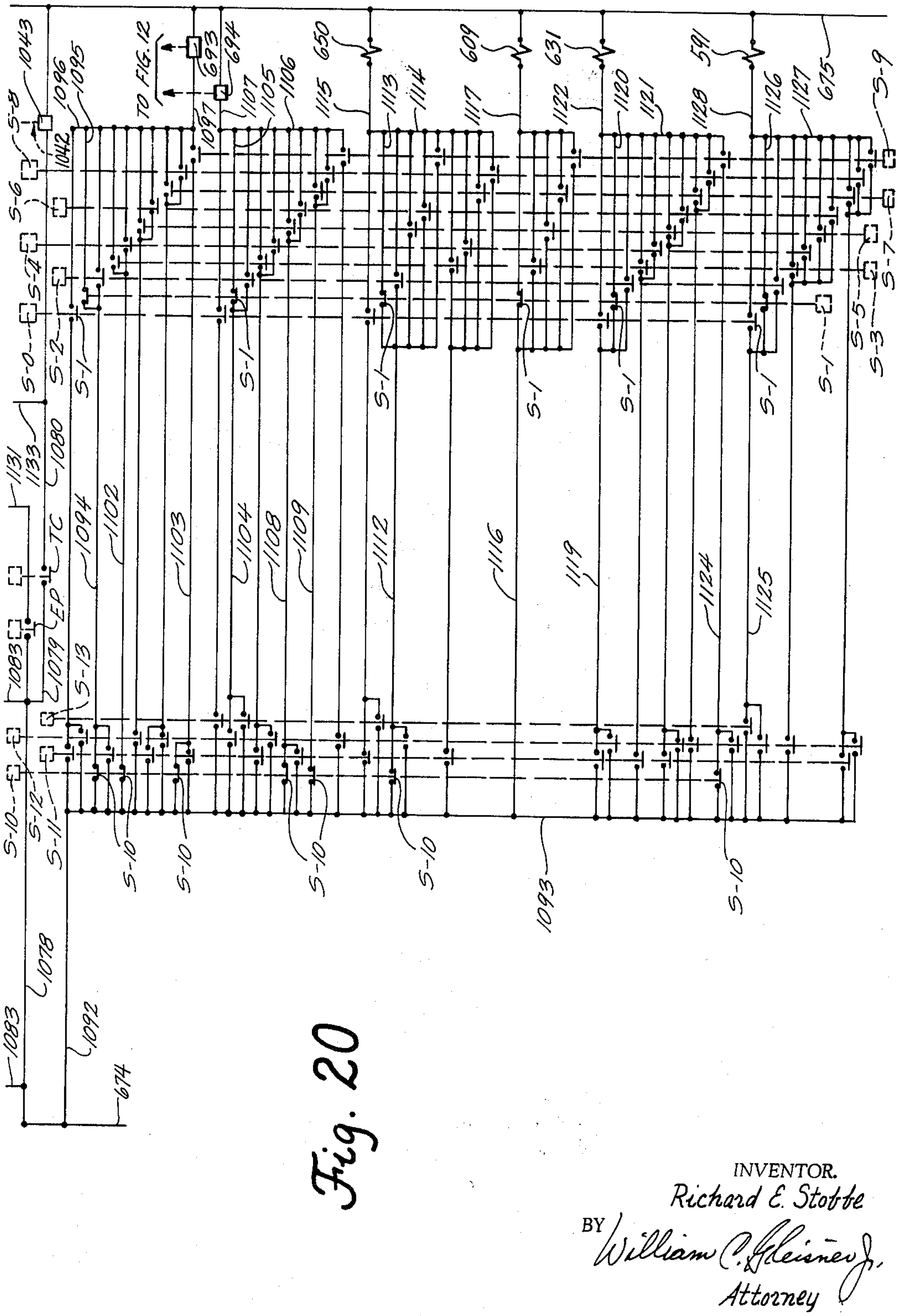
Figure 21:
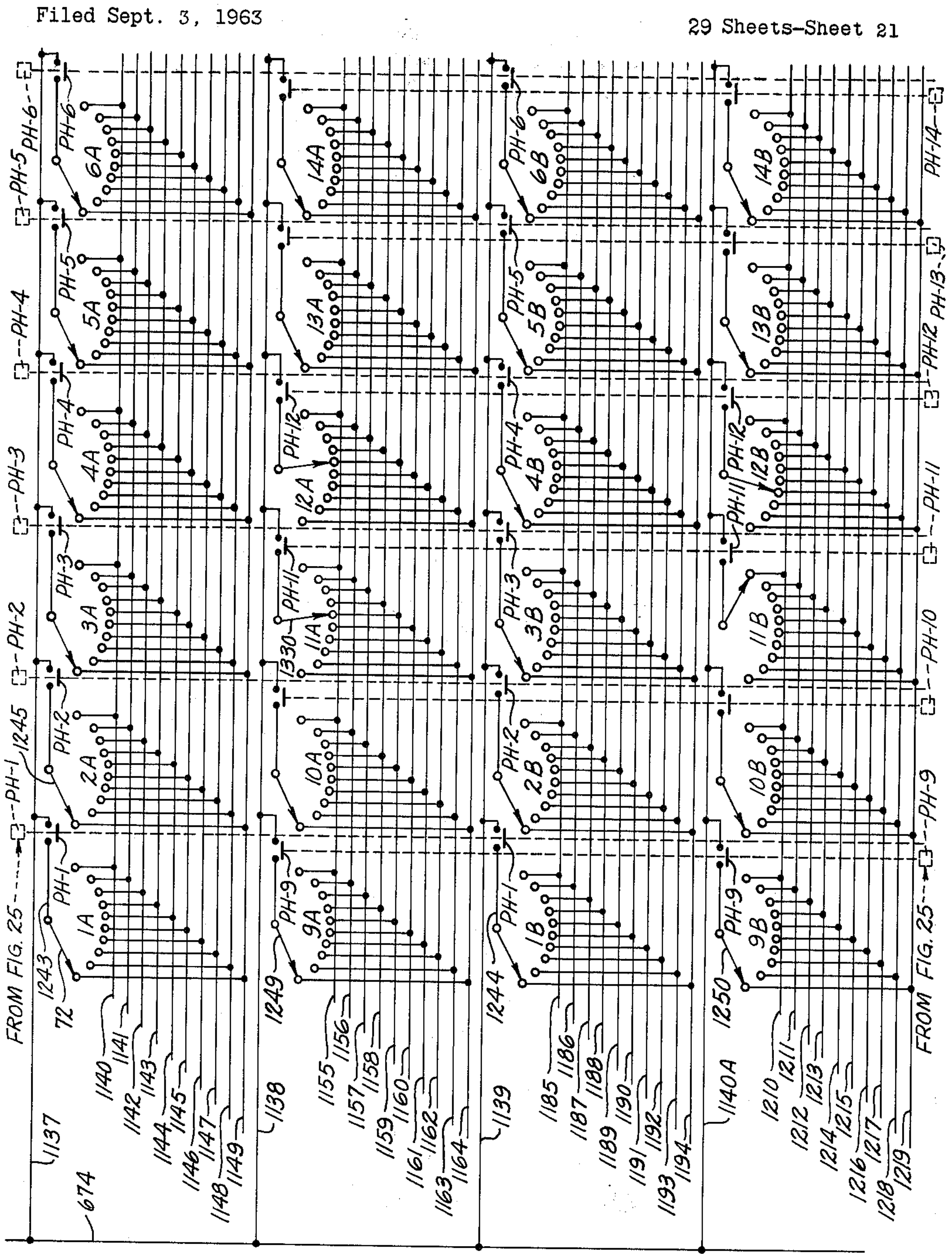
Figure 22:
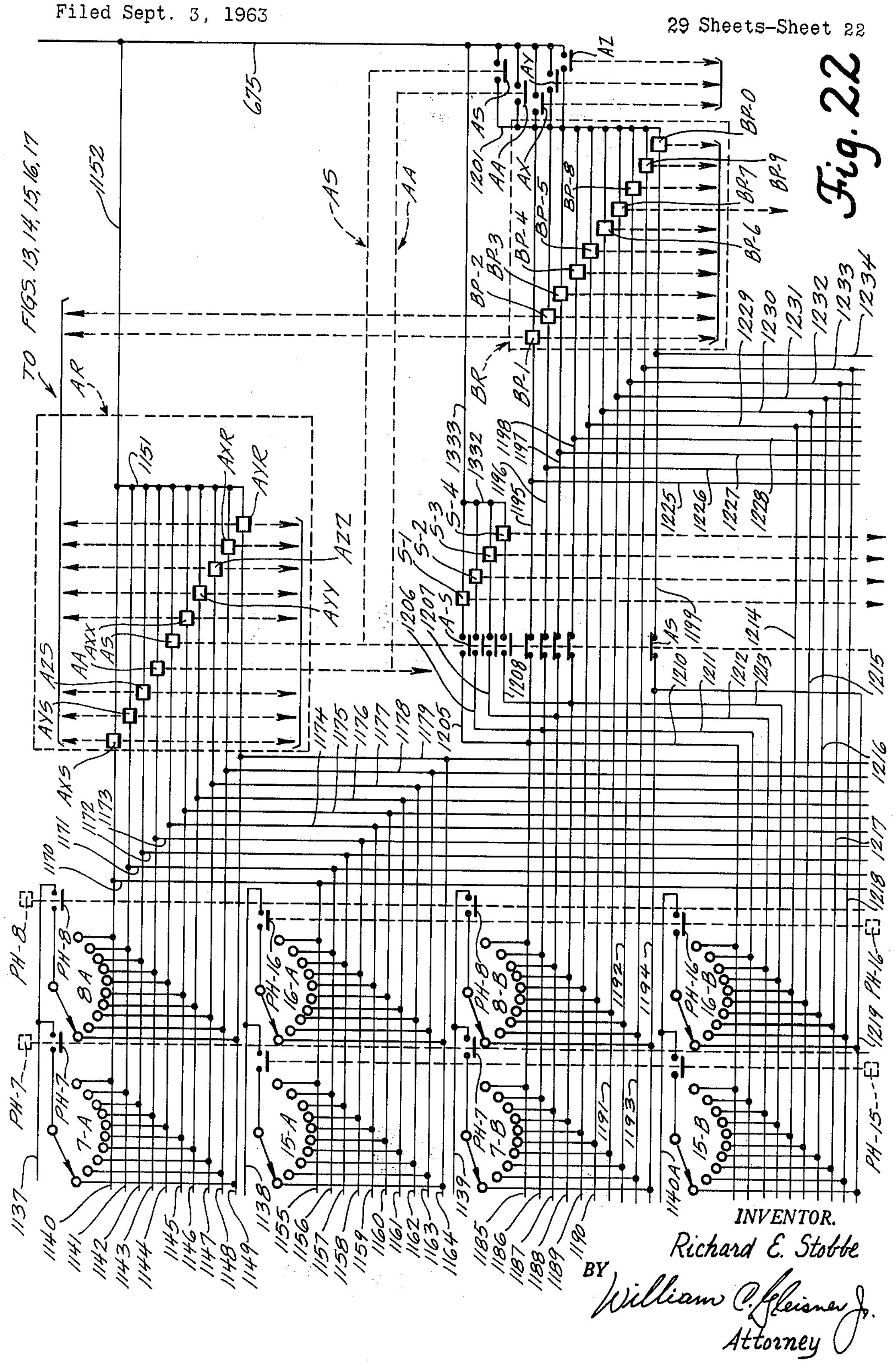
Figure 23:
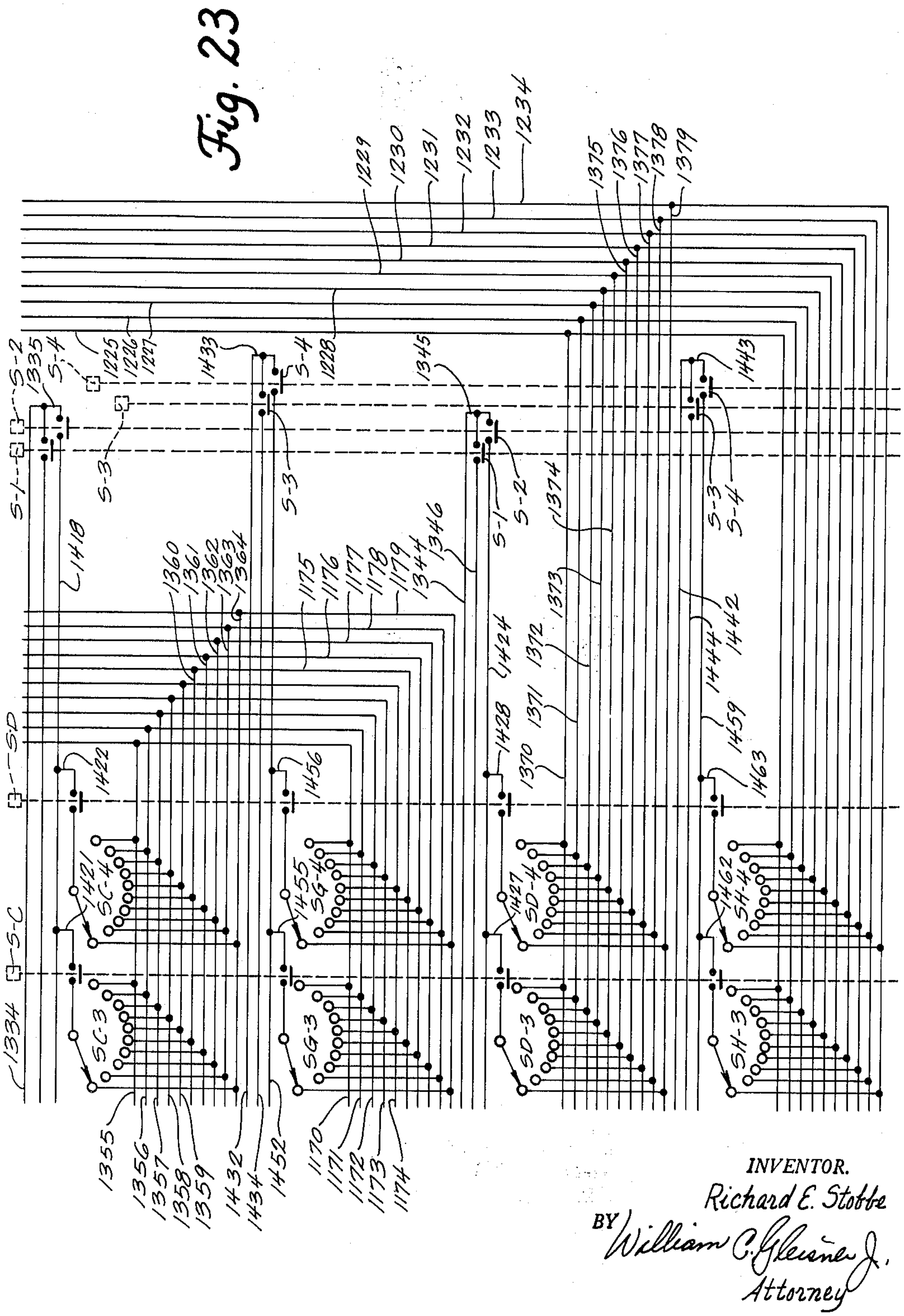
Figure 24:
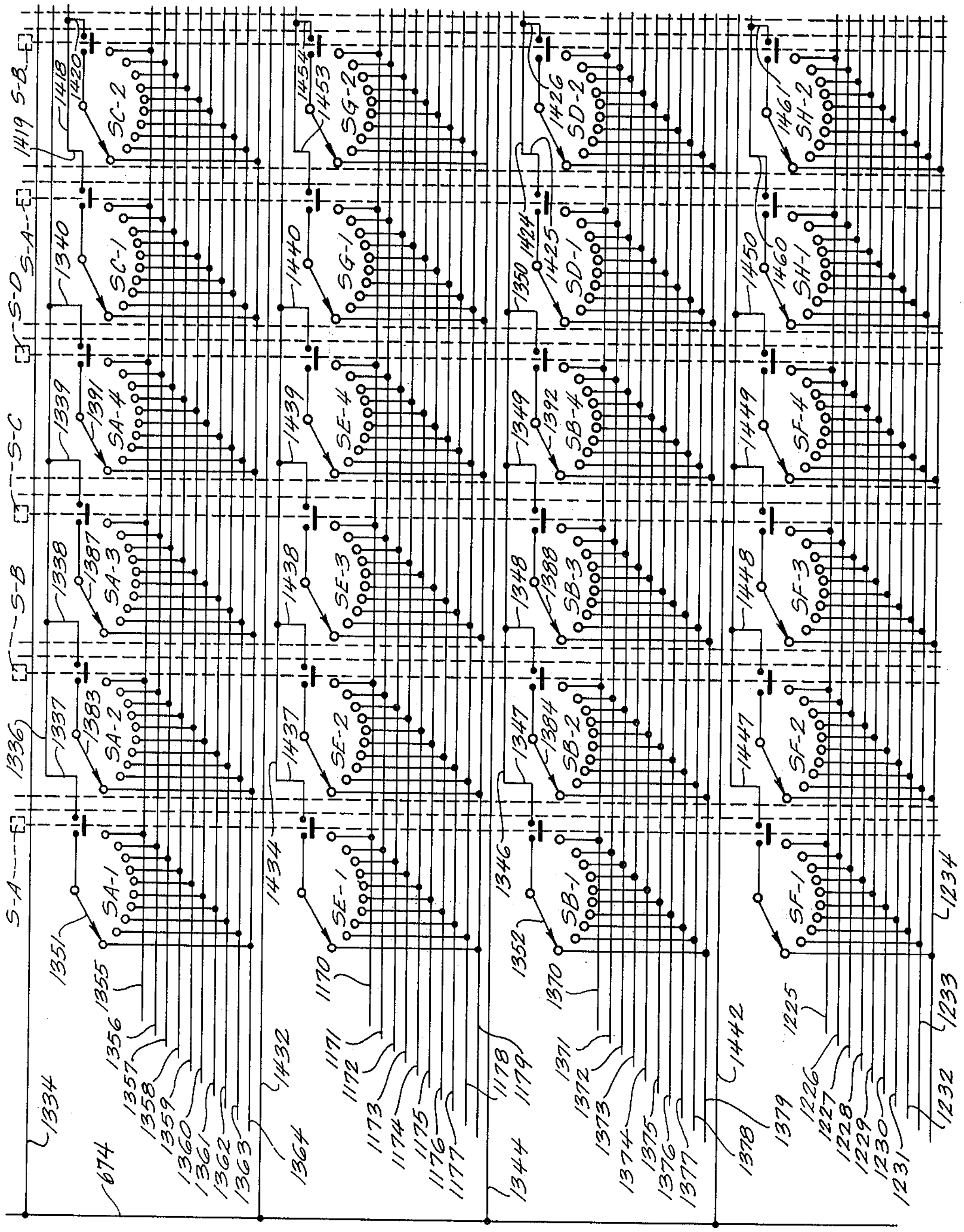
Figures 25, 25A:
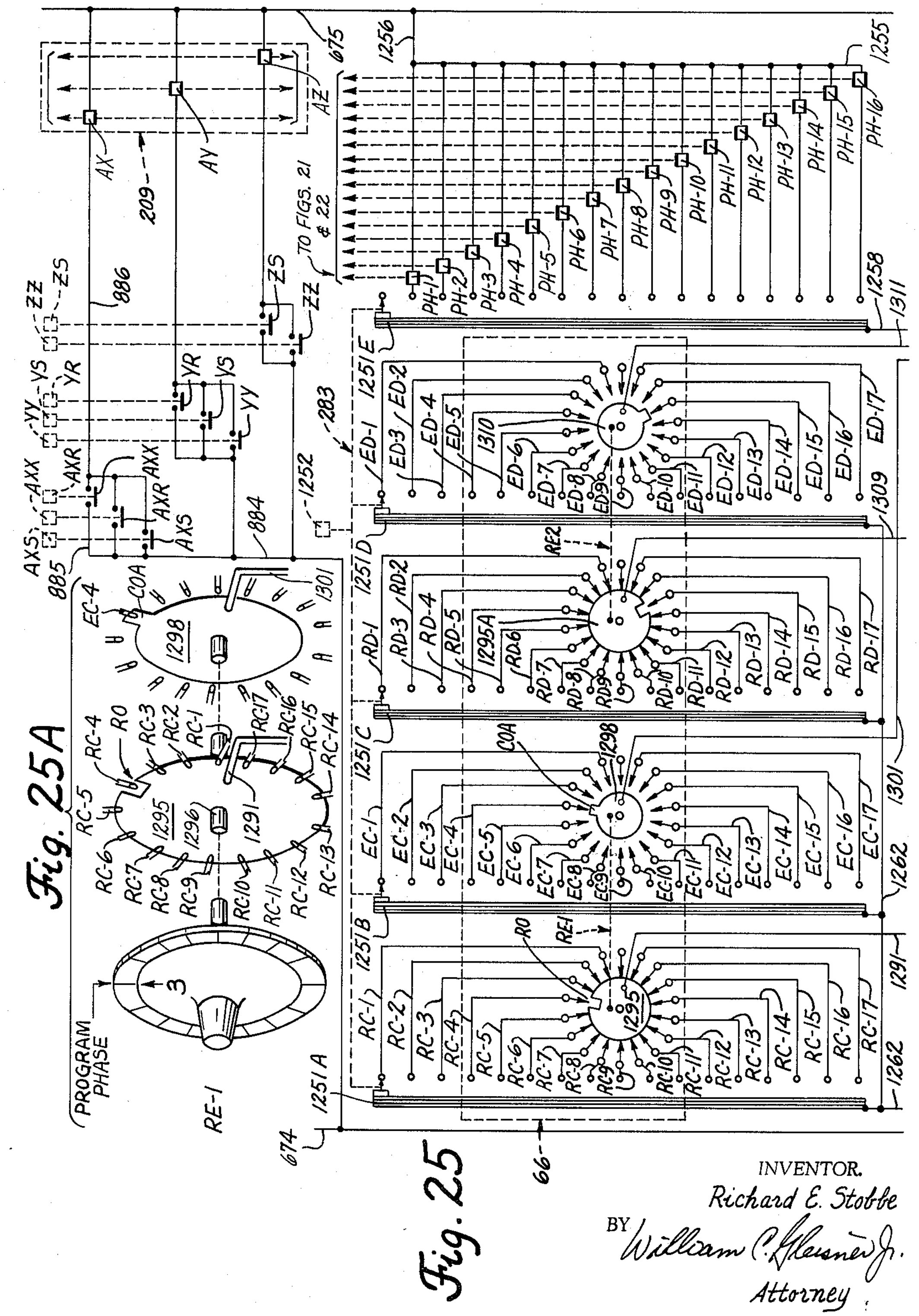
Figure 26:
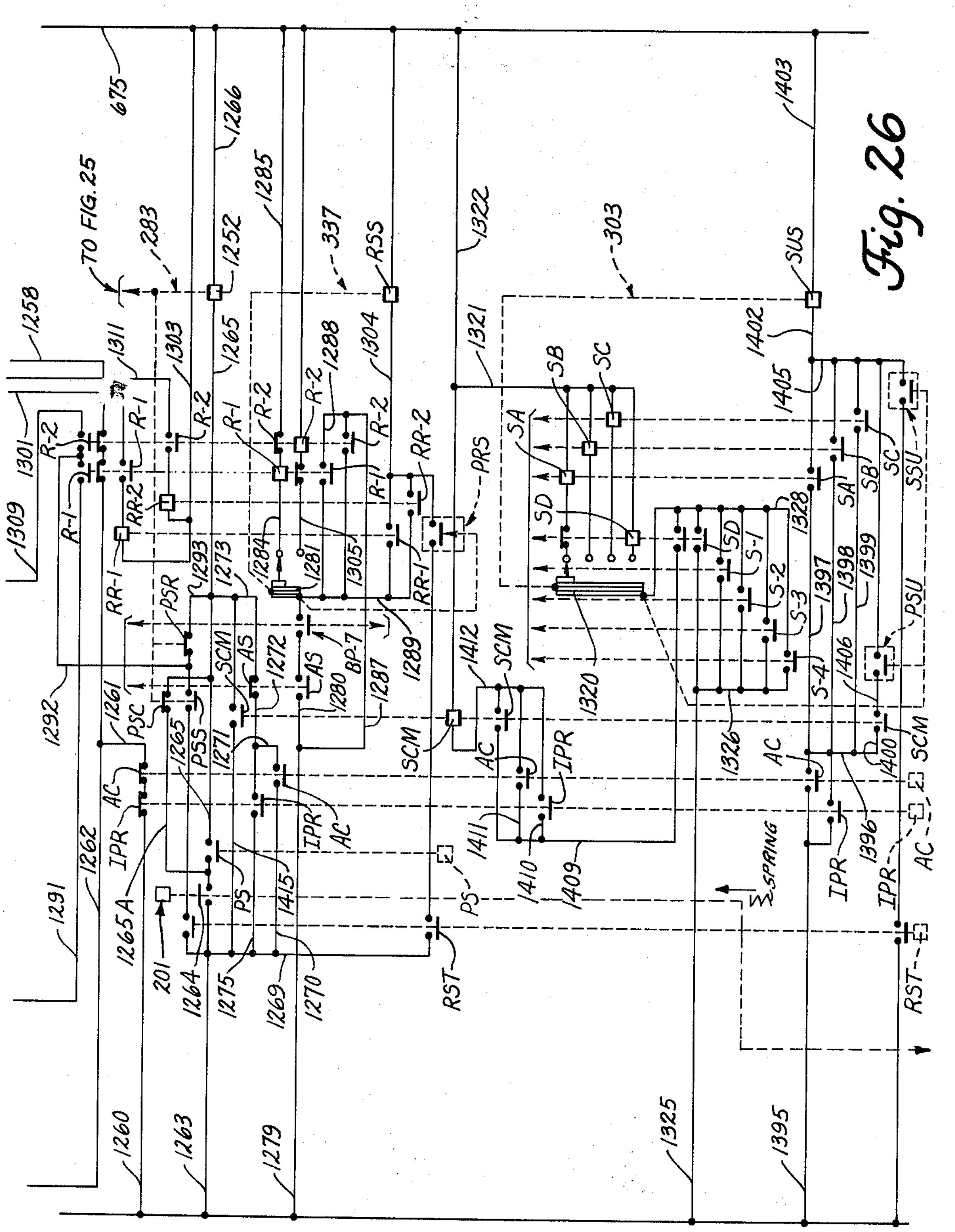
Figure 27:
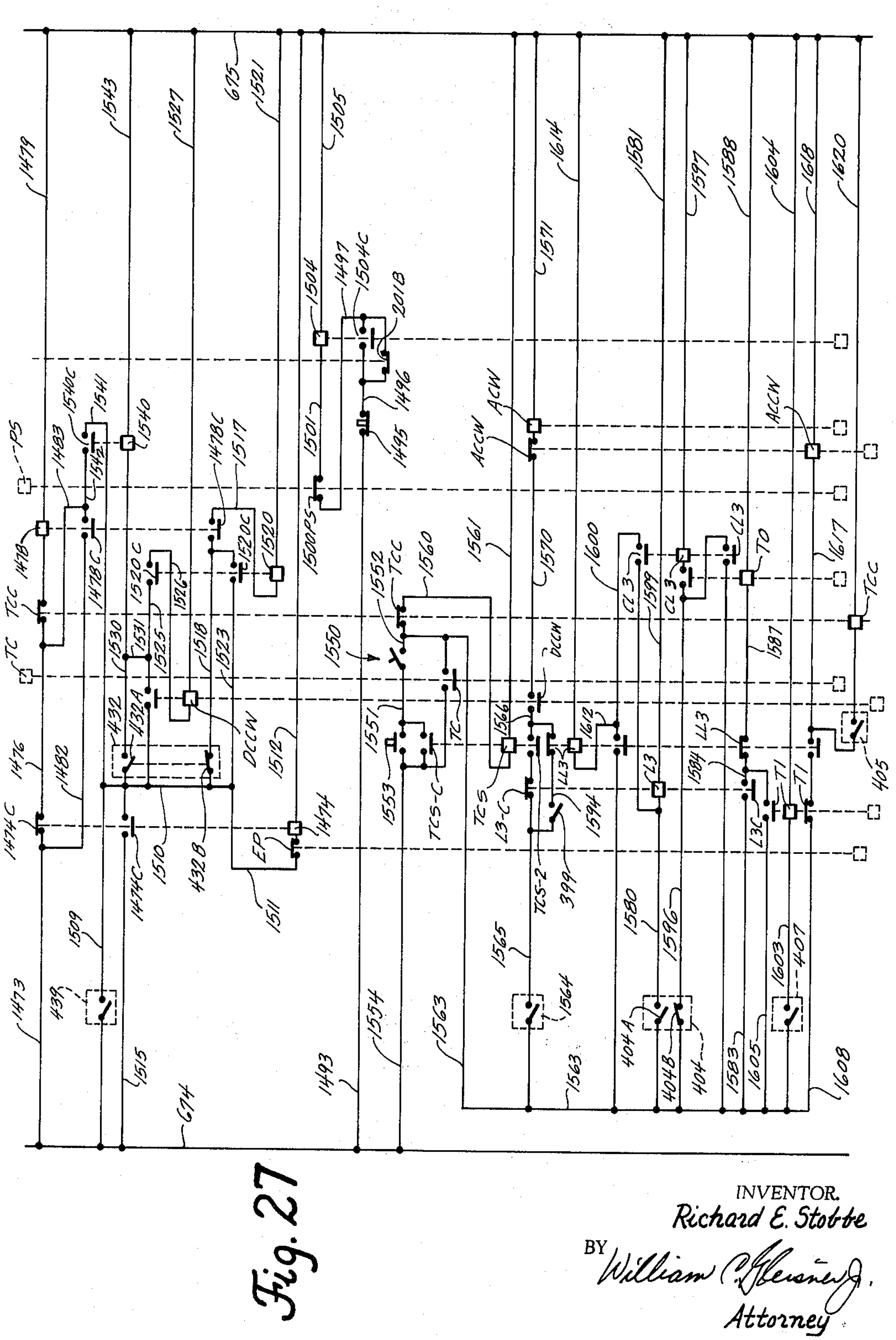
Figure 28:
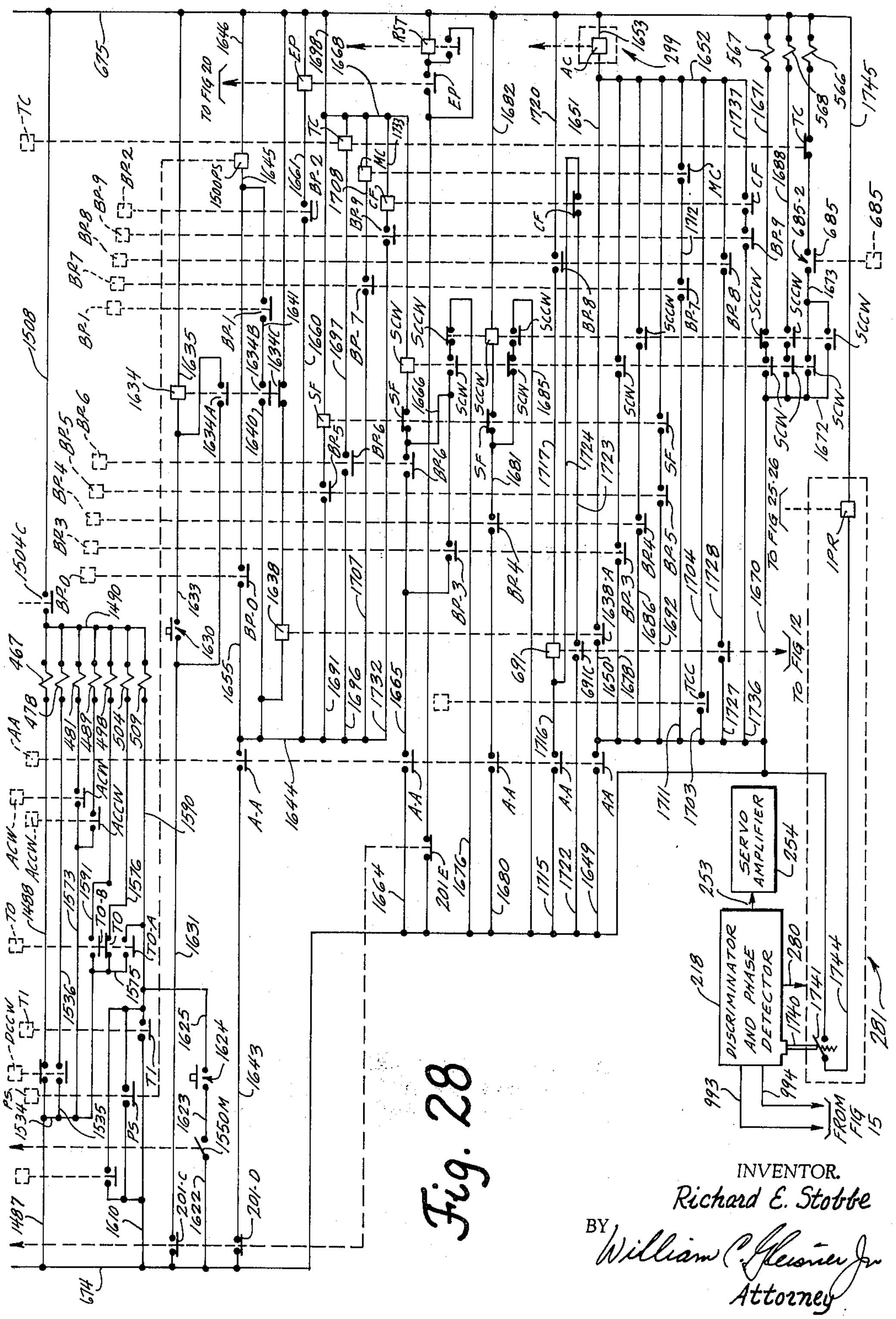
Figure 29:
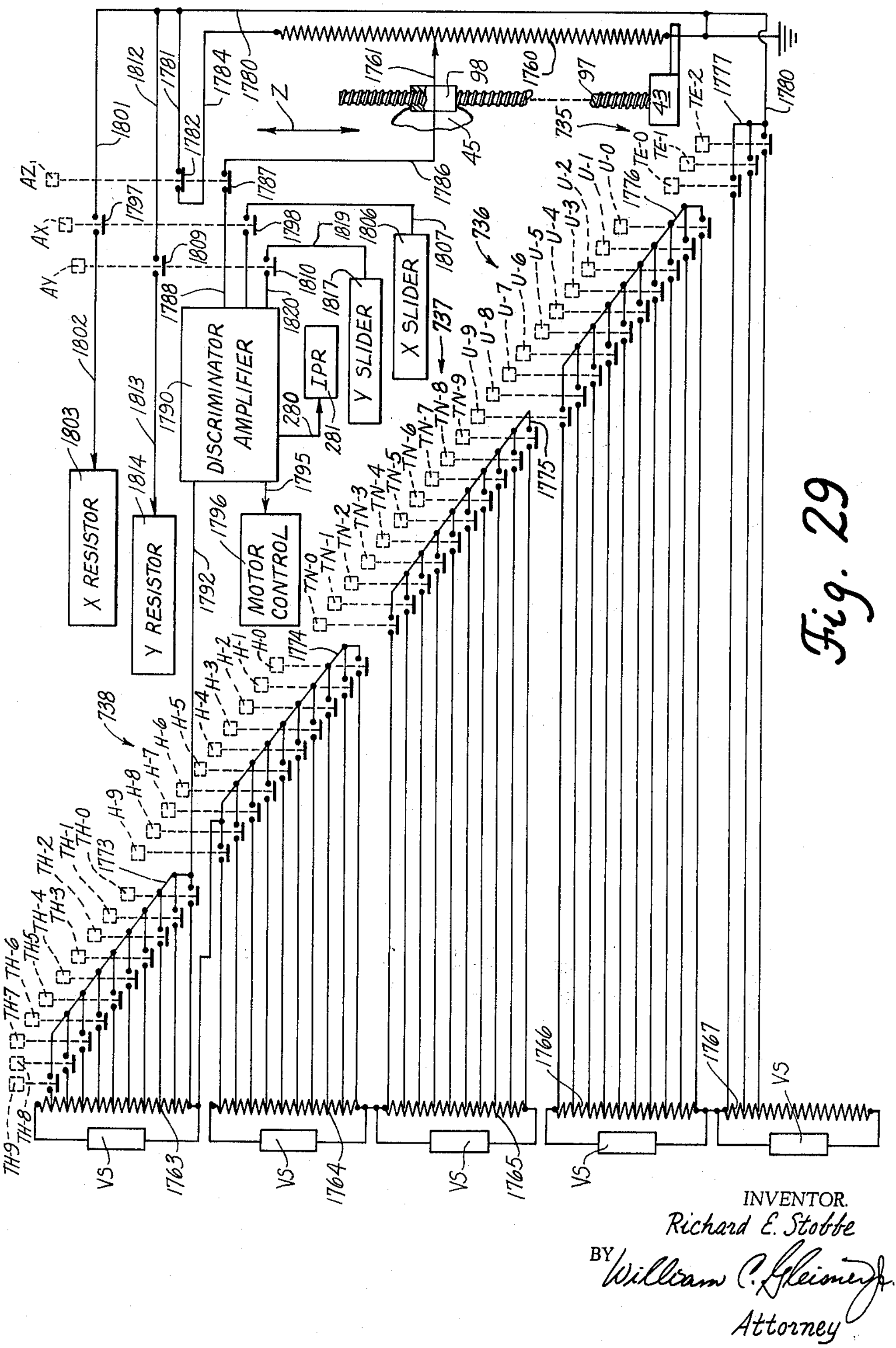

FIGS. 9 to 9D inclusive are fragmentary views in perspective illustrating certain movements of the tool change mechanism in one operating cycle;

FIG. 9E is an enlarged fragmentary view in section through a portion of the tool change arm;

FIG. 10 is a schematic representation of a portion of the hydraulic control circuit;

FIG. 11 is an enlarged diagrammatic view of the selectively variable speed spindle driving transmission mechanism together with an associated electro-hydraulic shift control mechanism;

FIG. 12 is a portion of the electrical circuit including the master start control for energizing the control system and certain of the driving motors;

FIGS. 13 and 14 represent that portion of the electrical control circuit for predetermining the rate and extent of positionally controlled movement along the X, Y and Z axes;

FIGS. 15, 16 and 17 are electrical circuit drawings of the command transformers and associated X, Y and Z axis position indicating devices controlled thereby;

FIGS. 18, 19 and 20 are electrical circuit drawings representing the switching network for presetting the rotational speed rate for the tool spindle;

FIGS. 21 and 22 illustrate that portion of the control circuit directed to the program selectors for predetermining the sequence of events in a machine program;

FIGS. 23 and 24 illustrate an interconnecting portion of the control circuit showing the code related selectors for presetting a sub-cycle to occur during a predetermined phase of the machine program;

FIGS. 25, 25A and 26 illustrate that portion of the control circuit directed to automatically controlling the sequence of program phases, sub-cycle sub-phases and recycle functions;

FIGS. 27 and 28 are directed to other portions of the control circuit for controlling the advancement of the machine program from one phase to the next, as well as for controlling the sequence of a tool interchange; and, FIG. 29 illustrates a modified form of position control device.

Figure 1:
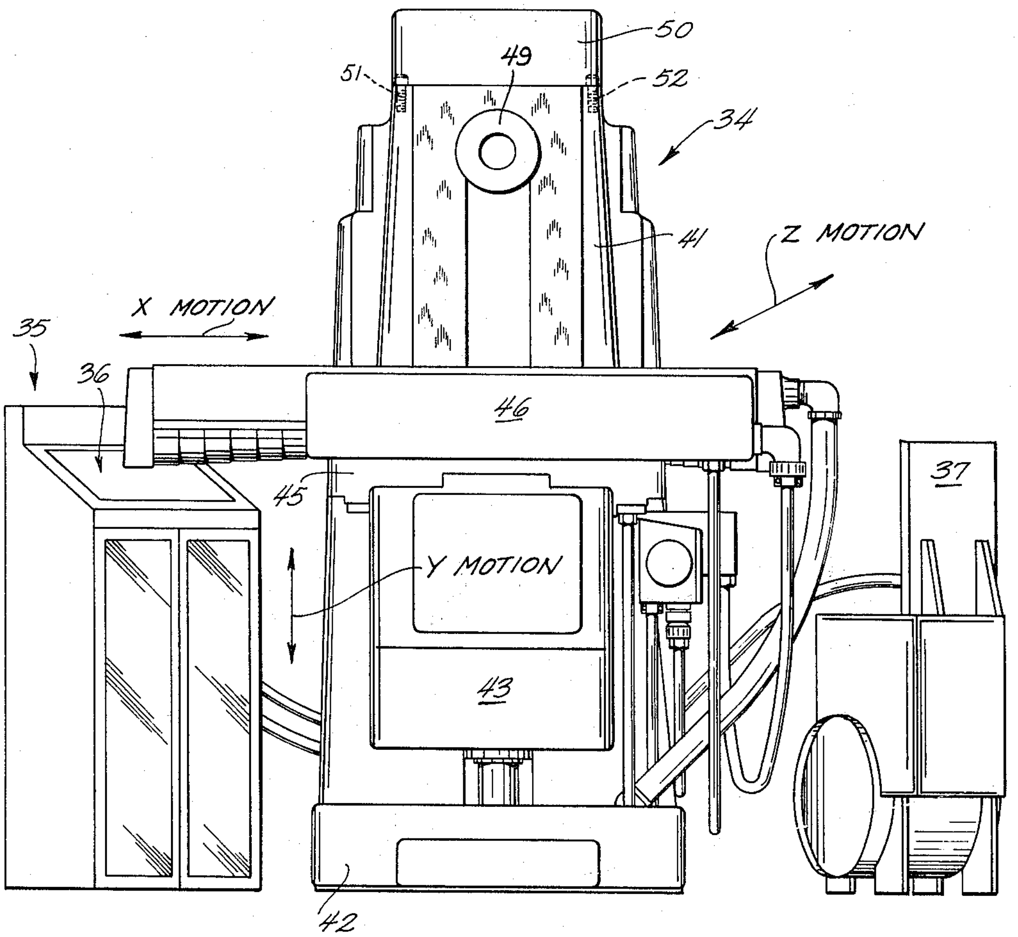
FIGURE 1 is a view in front elevation of a machine tool in combination with an associated source of hydraulic power, and a control console housing the manually presettable control system.

Referring now to the drawings and particularly to FIG. 1 thereof, a machine tool 34 of the knee and column type is adapted to be controlled by a manually presettable control system contained principally with the spaced apart control cabinet 35. Control cabinet 35 is provided with an angularly inclined program control panel 36 presenting separate manually operable presetting means as will hereinafter be more fully explained. An associated cabinet 37 is adapted to provide a source of fluid pressure. The program control cabinet 35 and hydraulic supply cabinet 37 are electrically and hydraulically interconnected with the machine tool 34 by means of flexible control conduits as represented in FIG. 1.

The exemplifying machine tool 34 is provided with a vertically upstanding central column 41 and a forwardly extending base 42 above which are mounted three slidably superimposed work supporting members. As is well known in the machine tool art, the three work supporting members include a hollow knee structure 43 slidably secured to the front face of the column 41 for selective vertical movement along a Y axis. On the upper surface of the knee structure 43, a saddle 45 is slidably guided for transverse movement along a Z axis toward and away from the column 41. As is likewise known in the machine tool art, a workpiece to be operated upon is secured directly to a worktable 46 which is movably secured to the saddle 45 for longitudinal movement along an X axis.

To perform operations on a workpiece carried by the worktable 46, a tool receiving spindle 49 is rotatably journaled within the upper central portion of the column 41. A column cap 50 is removably secured to the upper end of the column 41 by means of cap screws 51 and 52. It will be understood that all available positional movements and functions of the machine tool 34 represented in FIG. 1 may be controlled in any predetermined sequence by the presettable control panel 36 for effecting a complete predetermined program of operations. In addition to this, as will hereinafter be more fully explained, a tool storage and tool change mechanism may be secured directly to the upper portion of the column 41 in lieu of the column cap 50. In such a case, the manually presettable control panel 36 is operable to effect control of the machine tool 34 shown in FIG. 1, and coordinately therewith to effect an automatic insertion of different cutting tools into the tool spindle 49, as may be required for a particular program of machining operations.

Figure 2:
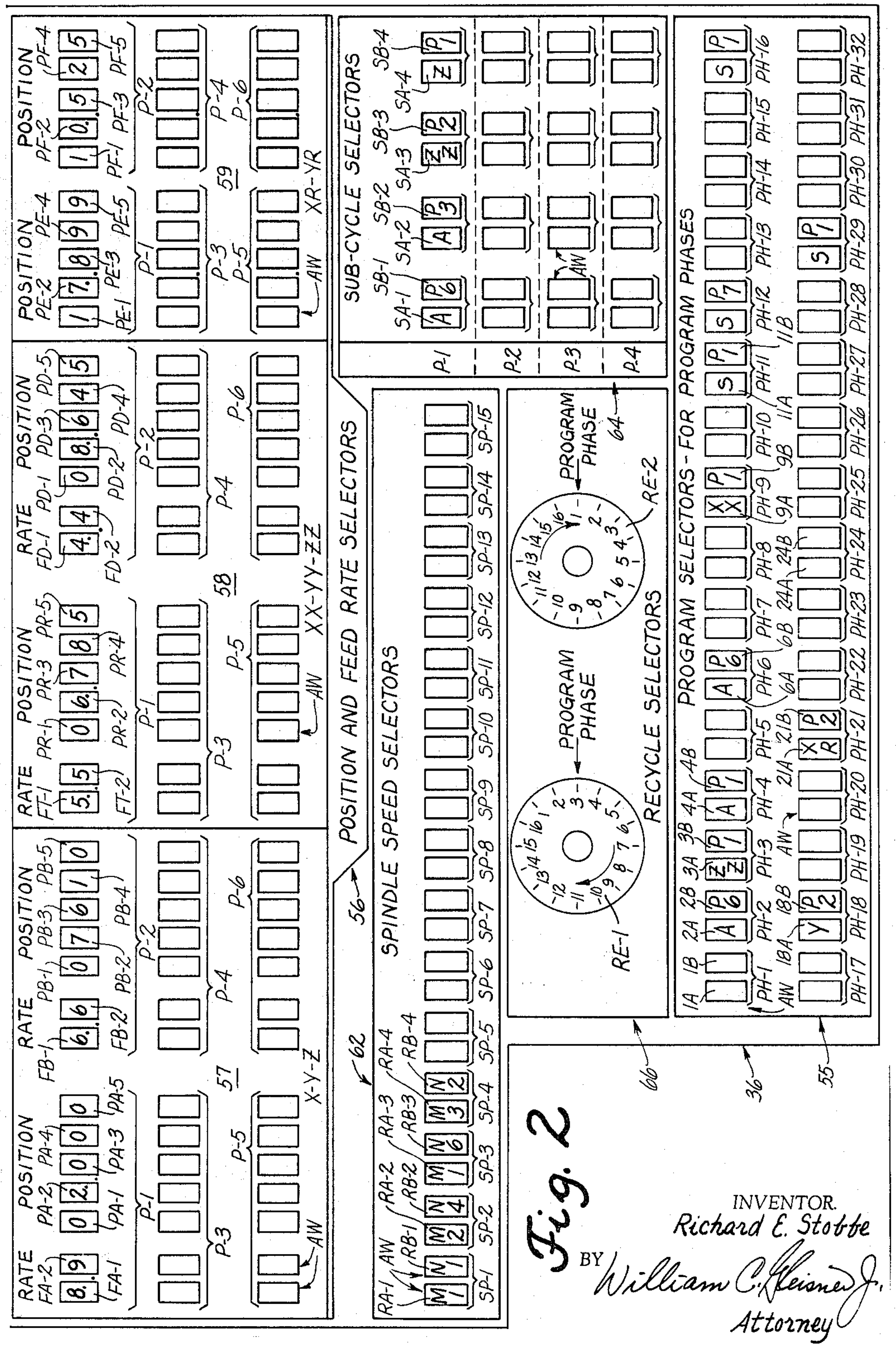
FIG. 2 is a fragmentary schematic view of the program control panel.

To illustrate the method of presetting a particular machine program, an enlarged fragmentary view of the main program control panel 36 is diagrammatically represented in FIG. 2. As there shown, the program control panel 36 comprises a flat surface in which are formed a plurality of substantially rectangular openings, such as the pair of openings AW associated with phase PH–1 for the program selectors. Each pair of the generally rectangular openings AW is provided to view coded indicia presented by associated selector switches, for example the associated program selector switches 1A and 1B in FIG. 2.

To facilitate presetting a particular program, the various rectangular openings AW and associated individual switches are grouped on various sub-panels, each of which is provided with an appropriate descriptive legend. For example, as shown in FIG. 2, a sub-panel 55 designated "Program Selectors" is provided with 32 pairs of presettable switches with the pairs of selector switches being designated as comprising phases PH–1 to PH–32 respectively. Each pair of selector switches, such as switches 1A and 1B in phase PH–1, are preset to determine the particular machine function or functions which will subsequently occur during phase PH–1. Upon starting a preset program of machine functions in automatic mode, the machine is automatically operative to perform the function selected by the preset condition of switches 1A and 1B for phase PH–1. In response to completion of the selected function for phase one, the program automatically advances to effect the function for phase PH–2 which depends upon the preset coded positions of switches 2A and 2B.

For presetting the extent and rate of movement of each of the three slidably superimposed work supporting members, there is provided, as illustrated in FIG. 2, a sub-panel 56 designated "Position and Feed Rate Selectors." The sub-panel 56, in turn, is subdivided into three separate sections 57, 58, and 59, respectively, provided with code identifying legends "X–Y–Z" "XX–YY–ZZ" and "XR–YR." To simplify presetting of the machine, each separate section of the sub-panel 56 is provided with six separate sets or groups of switches, with each group being identified by associated code numbers P–1 to P–6. It will be understood that a different selector switch is associated with each of the generally rectangular openings AW represented on the sections 57, 58 and 59. Inasmuch as each separate set of switches provided on the sub-panel 56 performs a generally similar function, only that set of switches identified as P–1 on section 58 will be described. A pair of switches FT–1 and FT–2 are preset in code fashion to effect machine slide movement at the desired feed rate, for example, 5.5 inches per minute. The five switches designated PR–1 to PR–5 inclusive are respectively preset to indicate the position to which the slide will be moved. In the illustrative example on section 58 of sub-panel 56, the "P–1" position setting is "06.785" inch. Assume now that X and Y movements have been completed and that movement is required along the Z axis at the feed rate of 5.5 inches per minute to the 6.785 inch position during phase three of a particular preset machine program. To achieve this result, program selector switch 3A on sub-panel 55 is preset to its "ZZ" position, and associated switch 3B will be preset to its "P–1" position. Subsequently, upon operating the machine during automatic mode, the described functions will be effected during phase three operation of the machine, these functions corresponding to the coded preset positions of program selector switches 3A and 3B. Although the particular block of instructions identified as "P–1" on section 58 have been described as being programmed to occur during phase three, this same identical block of feed rate and position instructions can be programmed to occur at any phase of automatic machine operation, depending upon the coded setting of a pair of selector switches associated with that particular phase. Likewise, in the event the identical feed rate and position is required for a different axis of movement, the block of instructions identified as "P–1" on section 58 of sub-panel 56 may be used for that purpose. This condition is illustrated by the preset, coded positions of selector switches 9A and 9B associated with phase PH–9 of the program selector 55.

The other five blocks of feed rate and position instructions may be preset in section 58 by an appropriate positioning of the sets of switches respectively identified as P–2 to P–6 inclusive. For illustrative purposes, the set of switches identified as P–2 on section 57 have been present to effect a 6.6 inch feed rate to a "07.610" inch position. Assuming that this particular block of instructions is also utilized to control movement along the Y axis during pase 18 of a particular machine program, the selector switches 18A and 18B associated with that phase are respectively preset to the Y and P–1 positions.

The six sets of position switches provided on section 59 of sub-panel 56 are operative to control movement to the selected position at rapid rate only, instead of at a selected feed rate. For effecting movement along the X axis to the "10.525" inch position, during phase PH–21, the associated program selector switches 21A and 21B are preset to the XR and P–2 positions, as shown on sub-panel 55.

For selecting a particular speed, the sub-panel 62 designated "Speed Selectors" is provided with fifteen pairs of speed selector switches, with the respective pairs of switches being indicated as SP–1 to SP–15 inclusive on FIG. 2. For example, selector switches RA–1 and RB–1 on the spindle speed panel 62 have been respectively preset to their M–1 and N–1 positions, this setting adapted to produce one desired rate of spindle rotation.

Assuming now that the first selected spindle speed will occur during the second phase of a machine program, then program selector switches 2A and 2B are respectively set to their A and P–6 positions. With the tool spindle stopped, speed selector switches RA–1 and RB–1 will then be connected to effect the appropriate shiftable movement of a variable speed spindle mechanism upon the initiation of program phase PH–2. In a machine not provided with a tool change mechanism, the coded setting A and P6 functions to initiate a speed change. In a machine having the tool change mechanism, FIG. 8, the coded setting A and P6 functions both to initiate a speed change and to effect a tool change as will hereinafter be more fully explained. The tool spindle will then continue to rotate at the desired preset speed.

For selectively repeating a sub-cycle of program phases in identical predetermined sequence, there is provided a presettable sub-panel 64, and identified as "Sub-Cycle Selectors," as shown in FIG. 2. As indicated by the vertically disposed code numbers P–1 to P–4 inclusive, four separate and distinct sub-cycles are provided. Each of the sub-cycles comprises four sequentially operative pairs of sub-cycle selector switches. As shown extending rightwardly from a coded legend P–1, the first sub-cycle comprises four successive pairs of selector switches including switches SA–1 and SB–1, switches SA–2 and SB–2, switches SA–3 and SB–3, and switches SA–4 and SB–4. Each associated pair of sub-cycle selector switches is presettable in code fashion, and in a manner identical to that described for presetting one associated pair of program selector switches. To differentiate, however, each step of a sub-cycle will hereinafter be identified as a sub-phase to distinguish from the program phases, even though the coded presetting for each is identical. The four pairs of P–1 sub-cycle selector switches are represented as being preset in code fashion to sequentially initiate each of four different machine functions. To initiate the illustrative sub-cycle during phase PH–11, program switches 11A and 11B on sub-panel 55 are preset in code fashion to the S and P–1 positions as shown. With this condition existing and with spindle rotation stopped, completion of the PH–10 function effects immediate advancement of the program to the phase PH–11 for initiating the sequential actuation of the four selected sub-phases comprising the P–1 sub-cycle Upon completion of the fourth sub-phase of the selected P–1 sub-cycle, the program automatically returns to initiate phase PH–12 of the main program sub-panel 55.

Each sub-cycle can be programmed to occur at any selected phase or step of the main machine program. For example, the program selector switches associated which phase PH–29 have been respectively preset to their S and P–1 positions.

For selectively repeating machine phases that have already been completed, there is provided a recycle selector sub-panel 66. It will now be assumed that a machine program comprising a desired program of operation has been established by presetting the sequentially related pairs of program selector switches on machine phases PH–1 to PH–16 inclusive. It will further be assumed advantageous to repeat machine phases PH–3 to PH–11 during phase twelve (12). To accomplish this, a recycle selector switch RE–1 on sub-panel 66 is preset to program phase PH–3. To initiate the desired recycle function during the phase twelve, program selector switches 12A and 12B on sub-panel 55 are preset to their S and P–7 positions respectively, and which represent the coded setting for initiating a recycle function. Therefore, upon advancing to the twelfth phase, with the recycle selector switch RE–1 preset to the third phase position, the program control will automatically repeat, in identical preset sequence, phases PH–3 to PH–11 of programmed operation. Upon returning to the twelfth phase a second time, the program will automatically advance to whichever phase has been preset on recycle selector switch RE–2 of the preset machine program.

Although not specifically represented in the fragmentary schematic view of the main program control panel 36 in FIG. 2, it is re-emphasized that a separate function selector switch is operatively associated with each of the generally rectangular panel openings, such as the openings AW. Further, it is emphasized that this invention is not limited to either the program panel configuration illustrated in FIG. 2, or to the exact number of function selector switches associated with each of the interrelated sub-panels.

Figures 3, 3A, 3B:
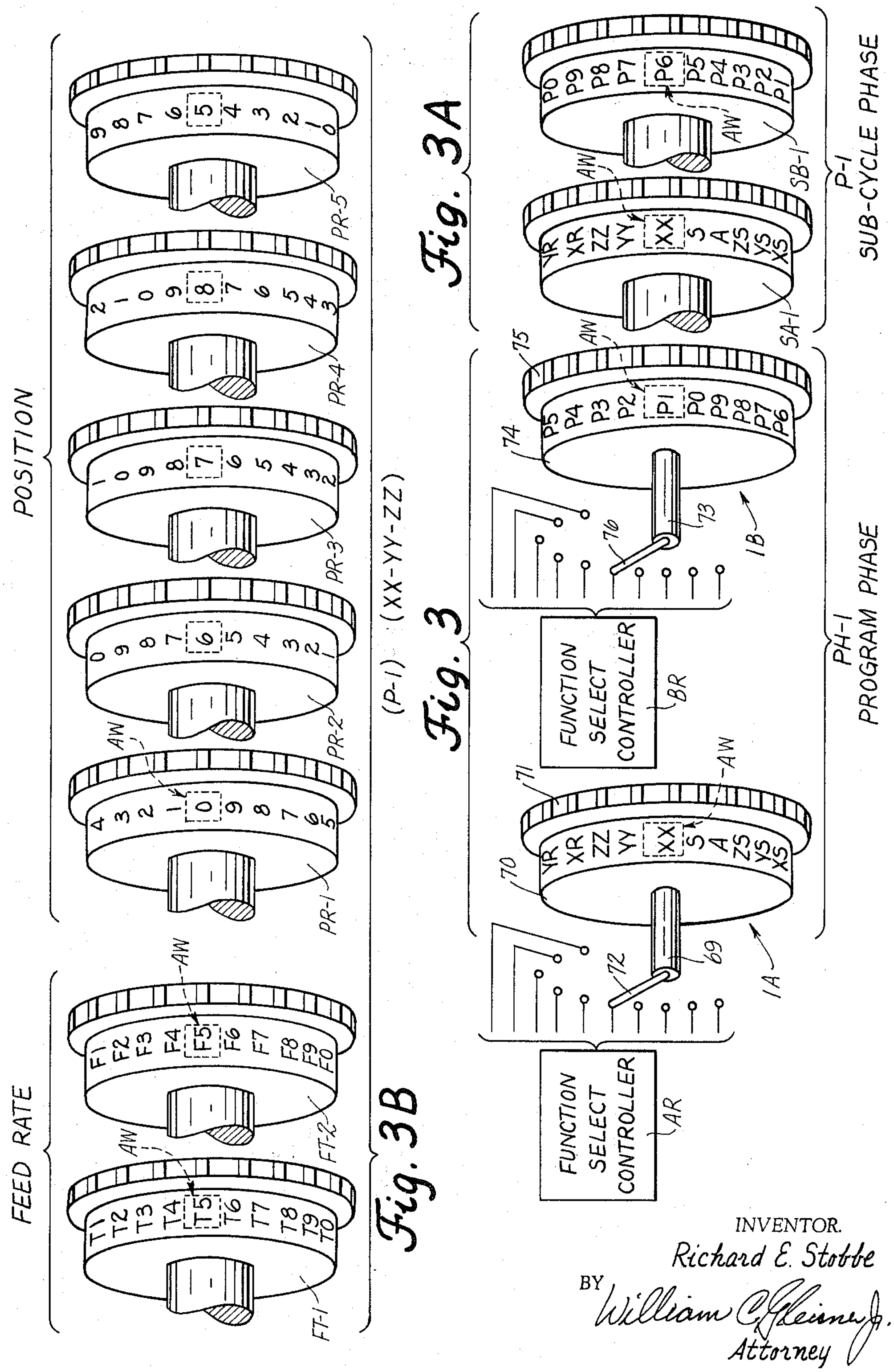
FIGS. 3, 3A and 3B are enlarged diagrammatic views in perspective illustrating certain cooperably associated program selector switches.

To illustrate the operative relationship of each selector switch to an associated generally rectangular opening AW, FIG. 2, fragmentary schematic views of several operatively associated groups of switches are illustrated in FIGS. 3, 3A and 3B. In FIG. 3, the pair of program selector switches 1A and 1B for program phase PH–1 are represented. Switch 1A is carried for rotation by a shaft 69 and is provided with an annular dial 70 carrying coded indicia, as graphically illustrated. A knurled thumb wheel 71 integrally formed with the switch dial 70 is adapted to facilitate rotatable adjustment for moving the appropriate coded indicia into viewing position relative to the associated generally rectangular opening AW. Indexable movement of the switch 1A effects corresponding engagement of a switch wiper arm 72 carried by the shaft 69 into conducting position relative to one of a bank associated switch contacts. The associated program selector switch 1B is likewise carried by a rotatable shaft 73, and is provided with peripherally spaced coded indicia 74. Thumb wheel 75 is provided to effect indexable rotation of switch 1B for moving the coded indicia into proper viewing position relative to the generally rectangular opening AW. Simultaneously therewith, a switch wiper arm 76 secured to the shaft 73 is moved into the corresponding required engagement with one of a group of associated switch contacts. The usual detent mechanisms (not shown) are provided to retain switches 1A and 1B in proper indexed position for maintaining their associated wiper arms in proper contact engaging positions. The banks of contacts respectively associated with program selector switches 1A and 1B are, in turn, connected to effect the appropriate coded actuation of a pair of function select controllers AR and BR respectively, as will hereinafter be more fully explained.

Inasmuch as each pair of sub-cycle selector switches is provided with peripheral indicia corresponding to that presented by a pair of program selector switches, the single associated pair of sub-cycle selector switches SA–1 and SB–1 are illustrated in fragmentary perspective form in FIG. 3A. Likewise, a single set of feed rate and position control switches is schematically represented in fragmentary perspective form in FIG. 3B. The particular switches illustrated in FIG. 3B correspond to those switches coded as P–1 on Section 58 of the position and feed rate selector sub-panel 56 in FIG. 2.

A chart illustrating certain of the functions available by a coded setting of each associated pair of program selector switches is illustrated in FIG. 4. As hereinbefore explained with reference to FIG. 2, additional presetting of other switches on the main control panel is required to obtain proper intermediate command instructions for X, Y or Z movement; for the functions to be performed in any sub-cycle; for spindle speed rate changes; and, for a recycle function. Certain other functions include, for example, a planned stop, a tool change, or a program stop require no additional presetting of other switches.

In this preferred embodiment of the invention it is not necessary to program a speed change as a single function by a coded setting of a pair of function selector switches. Instead, as represented in FIG. 4, shifting of gears to effect a speed change occurs automatically as an incident to programming a pair of program selector switches to their A and P–6 positions for effecting a tool change. In all cases, of course, spindle rotation is caused to be stopped prior to the selected speed change being effected by the preset programming. One advantage of obtaining a speed change as an incident to another programmed function is that one less programmd step or phase is required.

Figures 5, 5A:
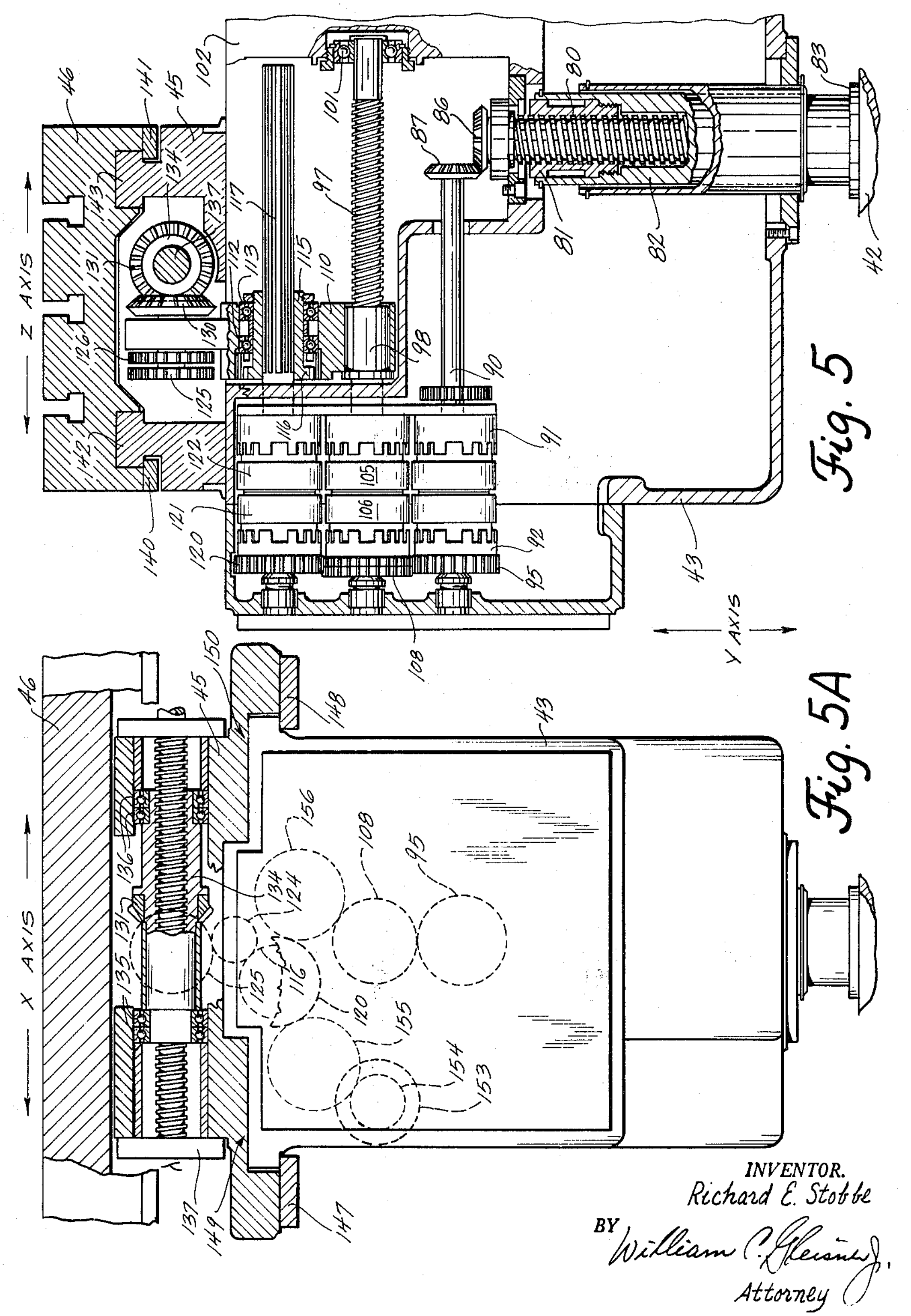
FIG. 5 is an enlarged fragmentary detailed view of the machine in transverse vertical section.
FIG. 5A is an enlarged fragmentary view of the machine in longitudinal vertical section.

Power operated translating mechanisms for moving the work table 46 along the X, Y and Z axes are diagrammatically illustrated in vertical sectional views, FIGS. 5 and 5A. As represented in FIG. 5, the knee 43 is vertically movable along the Y axis by means of a rotatable screw 80 and a cooperating non-rotatable nut 81. The stationary elevating screw nut 81 is fixedly secured within the upper end of a tubular pedestal having a flanged lower end 83 secured directly to the upper face of the machine base 42. The cooperatively disposed elevating screw 80 is supported for rotation within a transverse wall of the knee 43, and has secured to its upper end a driving bevel gear 86. The gear 86, in turn, meshingly engages a bevel gear 87 secured to one end of a horizontally disposed rotatable drive shaft 90 that is normally constrained against rotation in either direction by means of a hydraulically actuated multiple disc brake 91. In order to effect rotation of the horizontal shaft 90 for rotating the screw 80 to effect elevational movement of the knee, it is necessary to effect hydraulic disengagement of the multiple disc brake 91, and simultaneously therewith, effect hydraulically actuated engagement of a multiple disc drive clutch 92 operatively associated therewith. Input driving power for rotating the driving plates (not shown) associated with the clutch 92 is provided by spur gear 95 in well known manner.

In a similar manner, the translating mechanism for effecting transverse movement of the saddle 45 along the Z axis comprises a rotatable cross feed screw 97 and a cooperating non-rotatable nut 98. At its inner end, the cross feed screw 97 is rotatably supported by a bearing 101 that is fixedly secured within a circular recess formed in a vertical inner wall 102 of the knee 43. At its outer end, the cross feed screw 97 is operatively supported for rotation within a cooperatively disposed multiple disc brake 105 and an axially aligned multiple disc drive clutch 106. A power driven spur gear 108 is connected in well known manner to rotate the driving plates (not shown) of the multiple disc drive clutch 106. The cooperating, cross feed nut 98 is secured within a circular opening formed in a vertical web 110 integrally formed with, and depending from the saddle 45. Thus, upon simultaneous hydraulically actuated disengagement of the brake 105 and engagement of the drive clutch 106, the cross feed screw 97 is rotated to effect transverse movement of the non-rotatable nut 98 and saddle 45.

For effecting transverse Z axis movement of the saddle 45, the vertical web 110 depending therefrom is provided with another enlarged circular opening adapted to receive the outer races of anti-friction bearings 112, 113, the inner races of which rotatably support the internally splined, elongated hub 115 of a spur gear 116. A horizontal splined drive shaft 117 journaled to rotate within the knee 43 slidably engages the internally splined hub 115 of the gear 116 irrespective of the transfer position of the saddle 45 along the upper surface of the knee 45.

Driving power for rotating the splined drive shaft 117 for moving the worktable 46 is derived from a continuously rotating spur gear 120 that is connected in well-known manner to rotate the drive plates (not shown) associated with the hydraulically actuated multiple disc drive clutch 121. Whenever the worktable 46 is to be moved along the X axis, the drive clutch 121 is hydraulically engaged, and, at the same time, an axially aligned multiple disc brake 122 is hydraulically disengaged to effect rotation of the splined shaft 117 and internally splined gear 116.

As shown in FIG. 5A, the gear 116 is connected to drive an idler gear 124, the latter being in driving engagement with a spur gear 125. The gear 125 is secured to one end of a shaft (not shown) journalled for rotation in a vertically upstanding web 126, FIG. 5, integrally formed with the saddle 45 and secured at its opposite end to a bevel gear 130. As shown in FIGS. 5 and 5A, the bevel gear 130 engages a meshing bevel gear 131 which is fixedly secured to the outer periphery of a rotatable tubular table screw nut 134. Spaced apart pairs of bearings 135 and 136 carried by the saddle 45 support the tubular nut 134 for rotatable engagement with a non-rotatable table screw 137, the latter being secured in well-known manner at its opposite ends to depending brackets (not shown) secured directly to the opposite ends of the worktable 46. For guiding the worktable 46 during longitudinal movement, spaced apart gibs 140 and 141 secured to the opposite undersides thereof in well-known manner slidably engage upstanding flanged ways 142 and 143 presented by the saddle 45. In a similar manner, as shown in FIG. 5A, the saddle 45 is guided for Z axis movement by means of gibs 147 and 148 secured thereto in a manner to retain way surfaces presented by the saddle in slidable engagement with spaced apart way surfaces 149 and 150 presented by the upper face of the knee 43. In a like manner, the knee 43 is guided for vertical movement along the front face of the column 41 by means of gibs (not shown).

Power for driving the worktable 46 along any selected axis of movement is derived from a hydraulically actuatable, reversible servo drive motor 153 carried within the knee 43 as diagrammatically illustrated in FIG. 5A. An output gear 154 connected to be reversibly driven by the servo motor 153 engages an idler gear 155 that, in turn, is connected to drive the input gear 120 for the selectively engageable table drive clutch 121. In addition to providing input power for driving the table 46 along the X axis, the clutch gear 120 meshingly engages an idler gear 156, the latter directly engaging the input gear 108 which is connectable upon engagement of the associated clutch 106 for effecting transverse movement of the saddle 45 along the Z axis. Clutch input gear 108 directly engages the knee input gear 95 which is operable upon engagement of the clutch 52, and disengagement of the associated brake 91, to effect vertical movement of the knee 43 along the Y axis.

Figures 6, 6A:
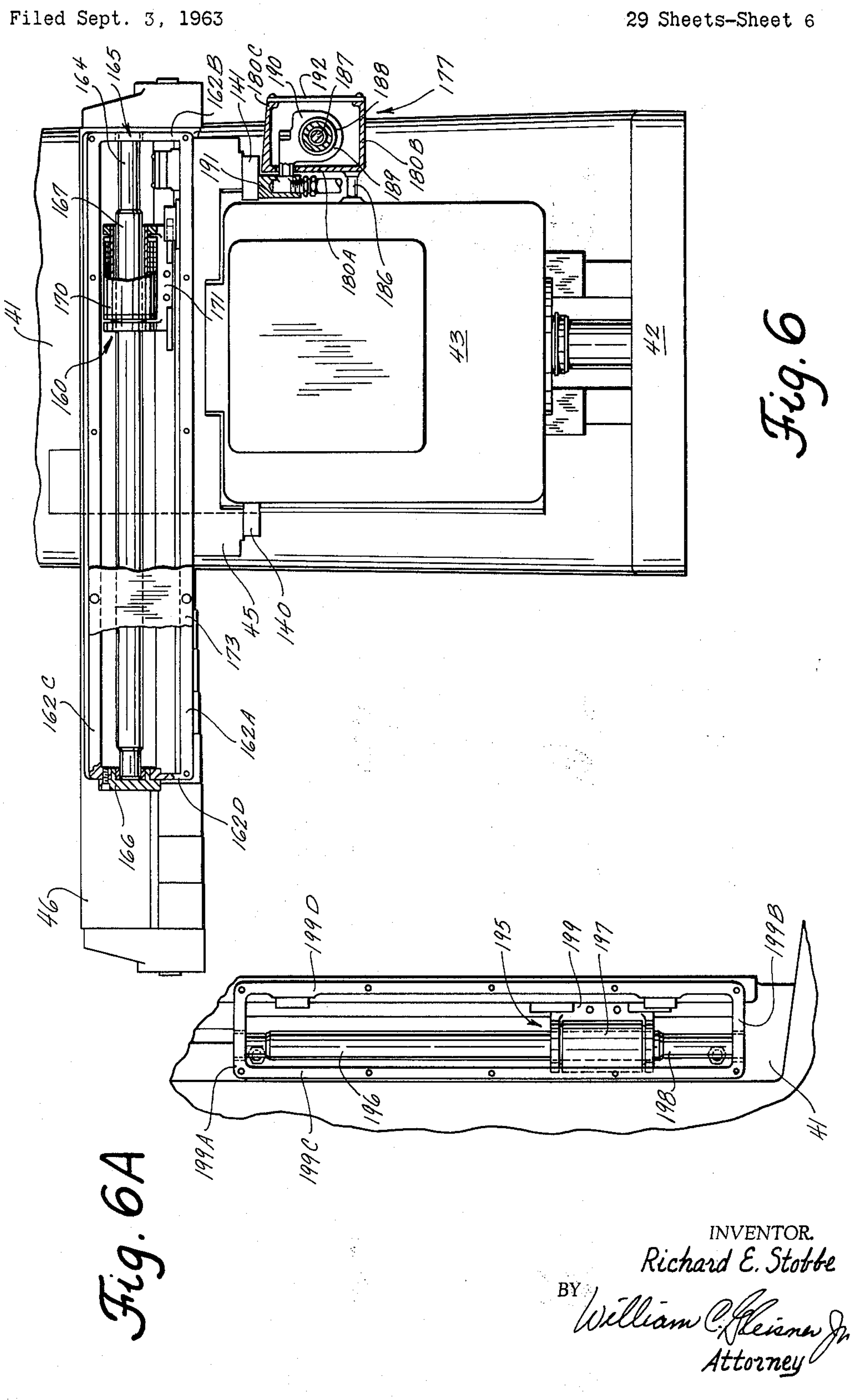
FIG. 6 is an enlarged fragmentary view of the machine, partly in front elevation, partly in longitudinal section, and with certain parts broken away.
FIG. 6A is an enlarged fragmentary view in side elevation, and with certain parts broken away.

It will be readily apparent that upon selective activation of the servo drive motor 153, the three clutch input gears 95, 108 and 120 are simultaneously rotated to provide input power for moving the knee 43, saddle 45 and worktable 46 respectively. For accurately controlling longitudinal movement of the table 46 along the X axis, as shown in FIG. 6, an electrical position indicating device 160 is interconnected between the worktable 46 and the transversely movable saddle 45. The positioning device 160 is contained within a hollow, elongated box-like structure comprising four adjacent walls 162A, 162B, 162C and 162D integrally formed with, and extending forwardly from the worktable 46. In the embodiment illustrated in FIG. 6, the positioning device 160 actually comprises a single stage lineal transducer having a central core 164 engaged at one end in a circular opening 165 formed in the right wall 162B, and its opposite end in an axially aligned circular opening presented by a cover plate 166 bolted to the left wall 162D. The transducer core 164 is provided with a longitudinally extending primary winding 167, extending through a circular opening in a cooperating secondary winding 170 that is fixedly carried by a bracket 171 secured to the saddle 45. Thus, movement of the worktable 46 along the X axis causes corresponding movement of the primary winding 167 relative to the secondary winding 170, and saddle 45. As will hereinafter be more fully explained, a selected input command voltage is applied to the primary winding for effecting movement of the worktable 46 to its next selected position. Depending upon the existing position of the worktable 46 relative to the saddle 45, movement in the required direction will then be effected in accordance with the requirements of an error output command voltage from the secondary winding 170, with movement continuing until a null condition is established by the coaction of the secondary winding with the primary winding 167. During machining operation, the position control device or lineal transducer 160 is completely enclosed by a cover plate 173, represented in fragmentary form, and which is removably secured to the four, forwardly extending walls 162A, 162B, 162C, and 162D to comprise a generally rectangular, hollow protective enclosure.

In a similar manner, a positioning control device or lineal transducer 177 is operatively interconnected between the saddle 45 and the knee 43 to control transverse movement of the saddle 45 along the Z axis. The lineal transducer 177 is carried within a transversely extending hollow enclosure comprising an inner wall 180A, a lower wall 180B, and an upper wall 180C that are supported within a pair of end brackets (not shown) which are directly secured to the right side of the knee 43, as viewed in FIG. 6. In addition to the end brackets (not shown), the inner side wall 180A is directly secured to the knee by means of a plurality of transversely spaced apart tubular supports, such as the support 186. The lineal transducer 177 comprises a transversely extending primary winding 188, and an encircling relationship thereto, a transversely movable secondary winding 189. The primary winding 188 is carried by a core 187 which is secured directly to the knee 43 by means of end brackets (not shown). For transverse movement relative to the primary winding, the encircling secondary winding 189 is carried within a bracket 190 extending through a slotted opening in the wall 180A, and being attached to a laterally extending support arm 191 secured to the underside of the gib 141, the latter being secured directly to the underside of the saddle 45 for transverse movement therewith. To fully enclose the lineal transducer 177 during machine operation, a cover plate 192 is removably secured to the edges of the lower wall 180B and upper wall 180C.

For controlling positional movement of the worktable 46 vertically along the Y axis, a positioning indicating device or lineal transducer 195 is operatively interconnected between the column 41 and the vertically movable knee 43. As shown in FIG. 6A, the lineal transducer 195 likewise comprises a primary winding 196 extending through, and encircled by, a cooperating relatively movable secondary winding 197. The secondary winding 197 is carried by a bracket 199 directly secured to a lateral extension of the vertically movable knee 43. The primary winding 196 is wound about a core 198 secured at its opposite ends in circular openings respectively presented by upper and lower transverse walls 199A and 199B integrally formed with the column 41. The upper and lower side walls 199A and 199B are interconnected by spaced apart laterally extending side walls 199C and 199D to constitute a protective enclosure for the position controlled indicating device 195.

Figure 7:
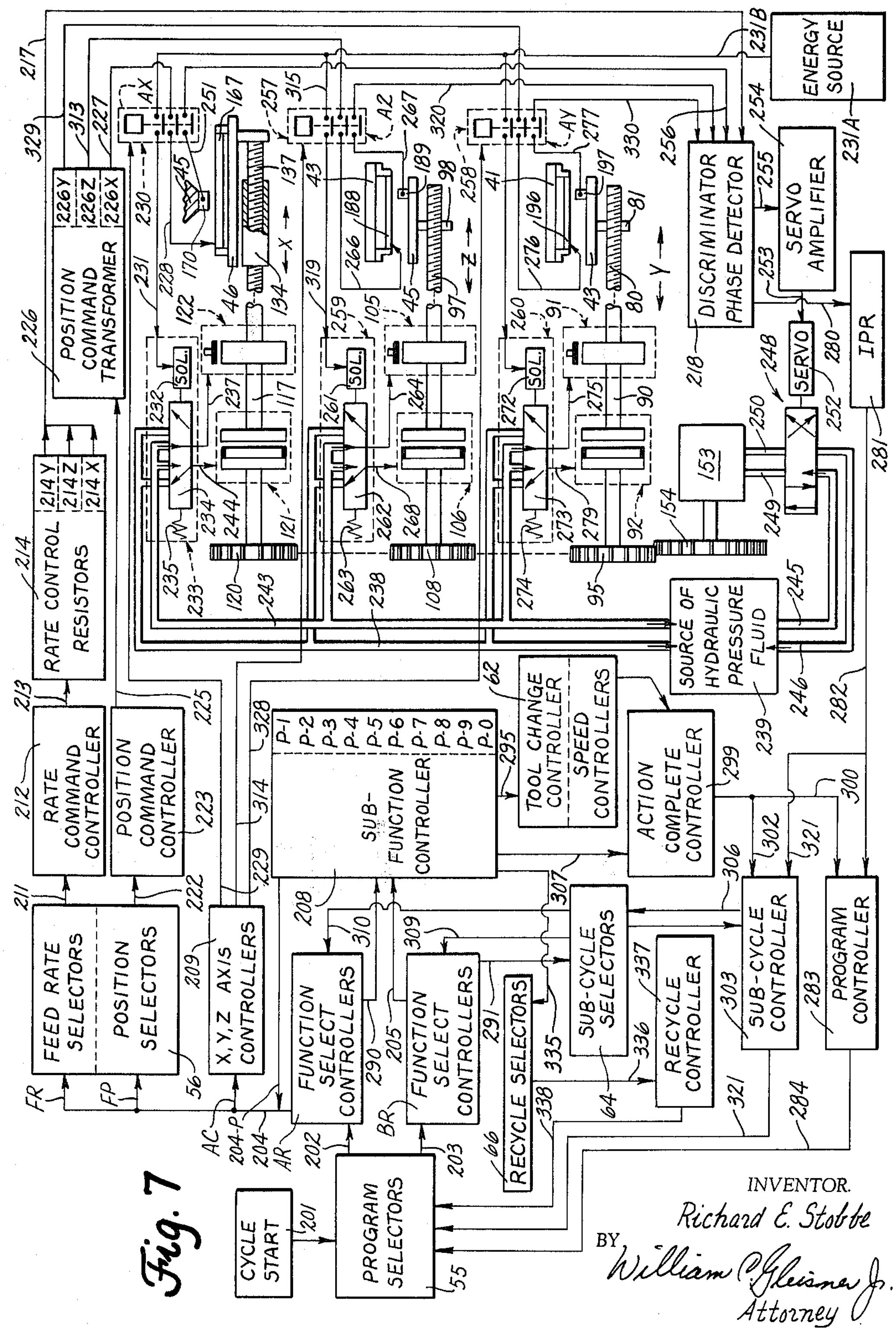
FIG. 7 is an enlarged diagrammatic view of the entire presettable control system.

The general arrangement for operating a machine in response to the presettable control system embodying the novel features of this invention is schematically illustrated in FIG. 7. In particular, there are represented in FIG. 7 the various switch control sub-panels for the program selectors 55, the feed rate and position selectors 56, the sub-cycle selectors 64, and the recycle selectors 66.

With the program selectors having been preset in code fashion for a particular machine program, operation of the machine is then initiated by momentarily depressing a cycle start button switch 201, FIG. 7. Thereupon, the first phase or event of the preset program is initiated by coded signals transmitted from the program selectors 55 via conduits 202 and 203 to activate a pair of function select controllers AR and BR in code fashion. To avoid confusion with the detailed description of the complete electrical control system, the term "conduit" is used to designate certain electrical and hydraulic control circuit paths in FIG. 7, in lieu of more specific designations, such as conductor. In the event the first phase of operation requires movement of the worktable 46 along the X axis, output command signals from the function select controllers AR and BR are transmitted along conduits 204 and 205 respectively, the combined coded output command signal being required to effect the selected positionally controlled movement. Irrespective of the selected axis of movement, the command signal from the controller BR via conduit 205 then activates a sub-function controller 208 in a manner that will hereinafter be more fully explained in connection with the detailed electrical control circuit. At the same time, the command signal from the controller AR is transmitted along conduit 204, and thence via three branch conduits FR, FP and AC to activate the feed rate and position selectors 56, as well as an axis controller 209. Thus, the respectively preset feed rate and position selectors 56 are interconnected in the control circuit to effect the described X axis of movement during the first phase of the machine program.

With table movement along the X axis being called for, the required feed rate selectors, FIG. 7, are preset to transmit a control signal along conduit 211 to adjust a rate controller 212. From the feed rate controller 212, a signal is transmitted along a conduit 213 which is connected to preset feed rate control resistors 214, the latter being connected via a conduit 217 to provide a selected modulating control effect on a discriminator and phase detector 218. At the same time, the position control selectors for the first phase X axis movement provide an output command signal along a conduit 222 to preset position command controllers 223, the latter being operative to provide a command signal along a conduit 225 for selectively presetting a command transformer 226. From the preset command transformer 226, a positional command signal for X axis movement is transmitted along a conduit 227, this conduit normally being interrupted by a normally deenergized X axis control relay 230. Since X axis movement is now being called for, however, the positional command signal along conduit 227 is transmitted via the closed middle contact bar of the now energized relay 230, to a conduit 228 connected to supply the required voltage command signal to the primary winding 167 of the lineal transducer.

Simultaneously with the presetting of rate control resistors 214 and the positional command transformer 226, the X, Y, Z axis controllers 209 are actuated for providing an X axis output command signal along a conduit 229 to effect energization of the X axis control relay 230 to its upward closed position. To simplify both the explanation and illustration of the control system in FIG. 7, the axis control relays, such as relay 230, are represented within dotted boxes. It will be understood, therefore, that the coil for the X axis control relay 230 is actually interconnectable between two energized conductors, as will hereinafter be more fully explained in the detailed description of the control circuit.

In the described condition for effecting X axis movement, the position relay 230 is now energized, permitting the transmission of a command signal from the transformer 226 via conduit 227, the now closed middle contact bar of the relay 230, to the conduit 228 connected to energize the lineal transducer winding 167. At the same time, two other circuits are simultaneously completed via the now closed upper and lower contact bars of the energized control relay 230.

Closure of the upper contact bar of the energized relay 230 thus completes a circuit from an energy source 231A, via a conduit 231B to a conduit 231 to energize a solenoid 232 of a valve 233, thereby effecting axial movement of a valve spool 234 in opposition to a spring 235. As schematically shown, movement of the valve spool 234 in opposition to spring 235 effects simultaneous disengagement of the multiple disc friction brake 122, and engagement of the multiple disc friction clutch 121 connecting the rotatable nut 134 for operation to effect the desired positional movement of the worktable 46. With the valve spool 234 urged leftwardly in opposition to spring 235, as viewed in FIG. 7, a conduit 237 is connected via a cannelure in the valve spool to a main exhaust line 238 connected to return hydraulic fluid to a source of hydraulic pressure fluid 239. Upon connection of the conduit 237 to exhaust, the normally pressure actuated friction brake 122 is released to permit X axis movement of the worktable 46. At the same time, hydraulic fluid under pressure is transmitted from the source 239 via a main pressure supply line 243, a cannelure in the leftwardly moved valve spool 234, to a conduit 244 connected to effect engagement of the multiple disc friction clutch 121.

With the multiple disc friction brake 122 now disengaged and the friction clutch 121 engaged, the gear 120 is operatively connected to effect rotation of the shaft 117, as hereinbefore described, to rotate the tubular nut 134 relative to the non-rotatable screw 137 for moving the worktable 46. Power for rotating the gear 120 to move the worktable 46 along the axis is derived from the main drive gear 154 which is driven directly by the servo-controlled hydraulic motor 153. In the present instance, the hydraulic motor 153 is connected to rotate the gear 154 in the required direction for effecting X axis positional movement of the worktable 46 in response to operation of a servo control valve 248. From the source of hydraulic pressure fluid 239, a pressure supply conduit 245 is connected to transmit fluid under pressure to the servo valve 248, an exhaust conduit 246 being connected to transmit exhaust fluid from the valve to the source. As diagrammatically illustrated in FIG. 7, the servo control valve 248 is operative in well-known manner to transmit hydraulic fluid through a conduit 249 for rotating the motor 153 in one direction, in which case fluid from the motor is exhausted at a controlled rate via the conduit 250. For rotating the hydraulic motor 153 in the opposite direction, the servo-valve 248 is connected to transmit fluid under pressure via conduit 250 to the hydraulic motor 153 and a return flow of exhaust fluid therefrom via the conduit 249.

To effect the required directional rotation of the motor 153, the servo control valve 248 is connected to be activated by a servo control 252 which is connected via a conduit 253 to be controlled by an error signal from a servo amplifier 254. The amplifier 254 is schematically represented in FIG. 7 as being energized by a conduit 255 from the discriminator and phase detector 218, the appropriate X axis positional control signal being transmitted thereto via a conduit 256. With the position control relay 230 being energized to upward closed position, as hereinbefore explained, the conduit 256 is connected via the now closed lower contact bar of the relay to a conduit 251 directly connected to receive an error signal from the secondary winding 170 of the X axis linear transducer. The output command signal from the secondary winding 170 depends on the direction in which the worktable 46 is to be moved from its existing position. In one direction, the secondary winding provides a command signal of one polarity; and, if the required movement is in the opposite direction, the command signal is of opposite polarity. Upon arrival of the secondary winding in centered relationship over the next required position along the primary winding 167, the secondary winding provides a null output command signal for stopping movement of the worktable 46.

It will be apparent, therefore, that energization of the position control relay 230 to upward closed position effects closure of the associated contact bars for simultaneously establishing a plurality of conditions to effect a required positionally controlled movement of the worktable 46 relative to the supporting saddle 45. It will be further apparent that one of the advantages of the present invention is that only one servo system, the servo control valve 248 and servo control 153 is required to effect positionally controlled movement of one of the three major movable machine members including the worktable 46, the saddle 45, or the knee 43.

During the described positional movement of the worktable 46 along the X axis, the saddle 45 and the knee 43 are positively maintained in their existing positions by hydraulically actuated engagement of the respectively associated brakes 105 and 91. To effect this result, both of the axis control relays 257 and 258 are deenergized; and, solenoid valves 259 and 260 respectively associated with the Z and Y axes of movement are maintained in deactivated condition during X axis movement. With the Z axis control valve 259 deactivated, solenoid 261 is deenergized in a manner that a valve spool 262 is resiliently urged to its rightward position by means of the spring 263, as viewed in FIG. 7. With this condition existing, pressure fluid is transmitted from the source 239, via the main supply line 243, and thence via a cannelure of the rightwardly urged valve spool 262 to a conduit 264 connected to effect pressure actuated engagement of the brake 105. At the same time, with the valve spool 262 urged rightwardly by spring 263, clutch 106 is deactuated inasmuch as clutch supply conduit 268 is then connected via a valve spool cannelure to the main exhaust line 238. With the valve spool 262 positioned to effect pressure actuated engagement of the brake 105, as shown in FIG. 7, the rotatable crossfeed screw 97 is positively braked against rotation. Therefore, the non-rotatable nut 98 affixed to the saddle 45 is constrained against movement in either direction. Likewise, the saddle 45 and lineal transducer secondary winding 189 secured thereto are constrained against movement relative to the lineal transducer primary winding 188 secured to the knee 43. With axis control relay 257 deenergized, no input command voltage is supplied to the primary winding 188 via conduit 266, and no output command voltage is available from the secondary winding 189 to a conduit 267.

In a similar manner, with the Y axis control relay 258 deenergized and the valve 260 deactivated, a solenoid 272 therefor is deenergized and a valve spool 273 is urged to its rightward position by means of a spring 274. During the described condition, the main pressure supply line 243 is connected via a cannelure in the rightwardly moved valve spool 273 to a conduit 275 connected to effect pressure actuated engagement of the multiple disc friction brake 91 which operates to prevent rotation of the shaft 90 and elevating screw 80. Thus, the non-rotatable elevating screw nut 81 and knee 43 are constrained against movement in either direction. Further, the linear transducer secondary winding 197 secured to the knee 43 is positively restrained against movement relative to the linear transducer primary winding 196 fixedly secured to the column 41. Since no input command voltage is now being supplied to the primary winding 196 via an input conduit 276 with the control relay 258 deenergized, the associated secondary winding 197 does not provide a command output voltage signal via a conductor 277. Whenever the valve spool 273 is urged rightwardly by the spring 274, the drive clutch 92 is also deactuated since a conduit 279 for the clutch is connected via a cannelure to the exhaust return line 238.

With both the saddle 45 and the knee 43 positively braked against movement in either direction, positioning movement of the worktable 46 along the X axis continues in accordance with the output command voltage supplied by the command transformer 226. Upon arrival of the worktable 46 at the preselected position, a null signal from the transducer secondary winding 170 is transmitted along conduit 251, the closed lower contact bar of relay 230, and the conduit 256 to the discriminator and phase detector 218.

With the selected positional movement function for phase PH–1 having been completed, the program selectors 55 are sequentially advanced to immediately initiate the second event or phase of the illustrative program. It will now be assumed that the second phase of the program has been preset to effect a sub-cycle of four selected functions. To initiate the sub-cycle, the second phase of the program selectors 55 in FIG. 7 are again operative to transmit a proper coded signal via conduits 202 and 203 to function select controllers AR and BR respectively. From function select controller AR, one coded signal is transmitted via a conduit 290 to actuate a sub-function controller 208; and, another coded signal is transmitted from function select controlled BR via a conduit 291 to actuate the sub-cycle selectors 64.

From the sub-cycle selectors 64, coded output signals are transmitted via conduits 309 and 310 to actuate the function select controllers AR and BR, thence to the sub-function controller 208 for initiating the first selected sub-phase of machine operation. From the sub-function controller 208, a signal is transmitted via a conduit 295 to activate a tool change controller 62, activation of the speed controller being initiated as a concomitant thereto as will hereinafter be more fully described. Although the speed selectors 62 are activated to condition a circuit for a speed change, the spindle is not rotating during this phase and the speed change is not effected until a subsequent phase during which spindle rotation is called for. With the spindle not rotating during the first sub-phase, the tool changer controller operates to effect transfer of a preselected tool from the storage magazine to the spindle. After the desired tool change has been effected, a signal is then transmitted via a conduit 296 to energize an action complete controller 299 which, in the present case, provides an output signal via conduits 300, 302 for activating a sub-cycle controller 303.

Upon actuation of the action complete controller 299, the sub-cycle controller 303 operates to transmit a control signal via a conduit 306 to effect a sequential advancement of the sub-cycle selectors 64 for initiating the second sub-phase of the selected program. To start the spindle rotating in a clockwise direction, a signal is transmitted from the sub-cycle selectors 64 via output conduits 309 and 310 to effect coded operation of controllers AR and BR and to again actuate the sub-function controller 208, which is then operative to effect the required speed change and begin rotation of the tool spindle. Upon this function being completed, a signal is then transmitted via an output conduit 307 to again actuate the action complete controller 299, the latter again being connected via conduits 300, 302 to again advance the sub-cycle controller 303.

At this time, a signal via output conduit 306 is operative to effect sequential advancement of the sub-cycle selector 64 for initiating the third selected sub-phase of operation. For operating the machine to effect movement along the Z axis during the third sub-phase, the preset sub-cycle selectors 64 are then connected to provide output signals along conduits 309 and 310 to reactivate the function select controllers AR and BR respectively. The Z axis positional movement is then initiated by coded signals from the function select controllers AR and BR along output conduits 204 and 205 respectively. The output command signal from conduit 204 is transmitted along branch conduit AC to activate axis controller 209, as well as along branch conduits FR and FP to activate the feed rate and position selectors 56 respectively.

Energization of the axis control relay 257 functions to complete a circuit from energized conduit 231B, via a branch conduit 315, the now-closed upper contact bar of the relay, to conduit 319 connected to effect energization of the solenoid 261 for activating the valve 259. Thereupon, the valve spool 262 is urged leftwardly in opposition to the spring 263, simultaneously effecting disengagement of the brake 105 and engagement of the drive clutch 106. Closure of the middle contact bar of the energized relay 257 transmits the voltage command signal from conduit 313 to the conduit 266, connected to energize the primary control winding 188 of the lineal transducer. The feedback signal for controlling the Z axis movement is then transmitted from the secondary winding 189 via a conduit 267, and the now closed lower contact bar of relay 257 to a conduit 320 connected to the discriminator and phase detector 218.

With the required machining operation being completed, the sub-cycle selectors 64 have been preset to effect movement of the saddle 45 in the opposite direction along the Z axis to the starting point. However, the sub-cycle controller 303 operates directly via conduit 321 to effect sequential advancement of the program selectors 55 from the second main program phase to the third main program phase.

Before proceeding with the description of program phase PH–3, it is emphasized that the identical sub-cycle of four sequentially interrelated sub-phases may be programmed to occur in any subsequent main program phase.

With the saddle 45 in retracted position, out of engagement with a tool carried by the spindle, it will be assumed that the program selectors have been preset to effect Y axis movement during the third phase of machine operation. Therefore, at the completion of the last sub-phase of the selected P–1 sub-cycle, actuation of the sub-cycle controller 303 functions via the conduit 321 to effect stepping advancement of the program selectors 55 to immediately initiate the desired Y axis movement.

Upon arrival of the knee 43 at the selected position, a null signal is established via conduit 280 to actuate the relay 281, from which a signal is transmitted via conduit 282 to actuate the program controller 283. The program controller 283, in turn, is connected via the conduit 284 to effect sequential stepping advancement of the program selectors 55 from the described third phase of the machine program to initiate the fourth phase.

For illustrative purposes, it will be assumed that the program selectors 55 have been preset to stop spindle rotation during the fourth phase in preparation for a tool change and speed select function programmed to occur during the fifth phase. With spindle rotation having been stopped during the fourth program phase, a command signal is again transmitted along conduit 284 to effect sequential stepping advancement of the program selectors 55 for initiating phase PH–5.

The requisite coded signal for initiating a sequential tool change and activating the speed selectors 62 during phase PH–5 is then transmitted via conduits 202 and 203 to actuate function controllers AR and BR respectively. The output command signal is again transmitted therefrom along conduits 290 and 205 to operate the sub-function controller 208 from which a signal is transmitted via the conduit 295 to operate the tool change controller 62 and activate the speed controllers.

Assuming the program selectors 55 have been preset to perform a selected program, and that the preset functions for phases 6 to 13 inclusive will be sequentially performed in a manner similar to that hereinbefore described. In all cases, completion of a function operates to both terminate the command for that function and to initiate the next preselected function. It will now be assumed that the associated selector switches 12A and 12B have been preset to operatively interconnect recycle selector RE–1 into the preset program during phase PH–12. With the recycle selector RE–1 preset to the third program phase PH–3, the system is then operative to omit all preset program phases subsequent to phase PH–12 inclusive, and repeat in their original preset sequence program phases PH–3 to PH–11 inclusive. This condition is schematically illustrated in FIG. 7 in which the sub-panel 66 for the recycle selectors is represented. Thus, upon the program selectors 55 being sequentially advanced to initiate phase PH–12, a coded output signal is again transmitted via conduits 202 and 203 to actuate function select controllers AR and BR respectively. At this time, function controllers AR and BR are connected via conduits 290 and 205 to actuate the sub-function controller 208; and, the latter is connected via a conduit 335 to actuate the recycle selectors 66 from which a command signal is connected via a conduit 336 to actuate a recycle controller 337.

It is particularly advantageous to include tool changing and speed changing functions under command of the presettable control system. In the present invention, this is accomplished by the removal of the column cap 50, FIG. 1, and substituting the tool storage and changer mechanism 341 supported by the frame 342, FIG. 8, which is secured directly to the upper face of the column by cap screws 51 and 52 respectively. The tool storage and changer mechanism illustrated in FIGS. 8 to 9E inclusive is generally similar to that disclosed in a co-pending patent application entitled "Machine Tool With Tool Changer," Serial No. 220,413, to Zankl et al., filed on August 30, 1962. The changer mechanism illustrated in FIG. 8 comprises essentially a tool engaging change arm 345 selectively operative to interchange a tool carried by the tool spindle 49 with a tool presented by an angularly disposed tool storage drum 346. The tool changer arm 345 is represented in axially extended position, having withdrawn tools 347 and 348 from tool receiving sockets respectively formed in the storage drum 346 and the tool spindle 49.

To effect a tool changing function, the tool change arm 345 is fixedly secured to the forward end of a shaft 351 supported by the changer frame 342 for rotatable and axial movement in exact parallel relationship to the tool spindle 49 journaled in the column 41.

To support a tool for a machining operation, the tool spindle 49 is retained in rotatable engagement with spaced apart bearings 352 and 353 carried by the column 41 by means of a lock nut 354. Toward its central portion, the tubular spindle 49 is provided with axially extending splines 357 maintained in driving engagement with drive gearing of a speed change transmission, as will hereinafter be more fully explained.

For releasably gripping a tool, the internally tapered forward end of the spindle 49 is provided with an axially movable tool gripping collet 358 threadedly secured at its rearward end to an axially movable actuating rod 359 extending through a longitudinally bored opening formed in the spindle. A thrust collar 360 fixedly secured to the inner flanged end of the actuating rod 359 bears against one end of a stack of disc springs 361, the opposite end of which abuts the inner end of the tubular tool spindle 49. Normally, the stack of disc springs 361 operate to urge the actuating rod 359 rearwardly in a manner to contract the segments of the spring collet 358 into tight gripping engagement with the shank of a tool inserted therein. As viewed in FIG. 8, however, the actuating rod 359 has been moved forwardly in opposition to the springs 361 to effect axial forward movement of the collet 358, thus releasing a tool carried thereby for withdrawal. Forward release movement of the actuating rod is effected by axial forward movement of a piston rod 364 carried by a collet release cylinder 365 that is affixed to a bracket 366 secured to the rearward face of the column 41. After a tool interchange is completed and the next required tool inserted into the spindle, the piston rod 364 is retracted, permitting the springs 361 to actuate the collet 358 to grip the tool.

Toward its outer central portion, the tool change shaft 351 is supported for rotatable and axial movement by a sleeve bearing 368 carried by a forward wall 369 of the tool change frame 342. At its inner end, the tool change shaft 351 is provided with external splines having slidable engagement with an internally splined tubular drive sleeve 372 journaled in bearings 374 carried by a tubular bearing support secured within a circular opening formed in a rear wall 375 of the frame 342. For rotating the internally splined tubular drive shaft 372, a worm wheel 377 secured thereto by means of a lock nut 378 is engaged by a driving worm 379 carried by the output shaft of a hydraulic drive motor 380. To control the motor 380 for limiting rotational movement of the shaft 351, a pair of sequence control cam plates 370 and 371 are fixedly secured to the drive shaft 372.

For effecting axial movement of the tool change shaft 351, a pair of annular collars 382 and 383 are pinned thereto in such a manner as to provide an annular groove 384 engaged by the forked lower end of an axially movable arm 385. The forked arm 385 is secured to the outer end of a piston rod 386 supported for axial movement by a hydraulic cylinder 387 secured at its flanged rearward end to the inner face of the rear frame wall 375. The upper end of the arm 385 is fixedly secured to a movable stop cylinder 389 provided with a circular opening adapted to support a movable stop shaft 390 for axial movement, both with and relative to the tool change shaft 351. Toward its central portion, the shaft 390 is provided with an enlarged piston 391 slidably engaged within the cylindrical opening formed in the cylinder 389. In the absence of hydraulic pressure to an inlet port 392, a spring 393 abutting the rearward face of the cylinder 389 engages a flange 394 integrally formed with the shaft 390, urging it to its rearward retracted position. Thus, the spring 393 operates to retract the shaft 390 to urge the flanged movable stop 395 to its retracted position relative to the rotatable change arm 345.

Figures 8, 8A:
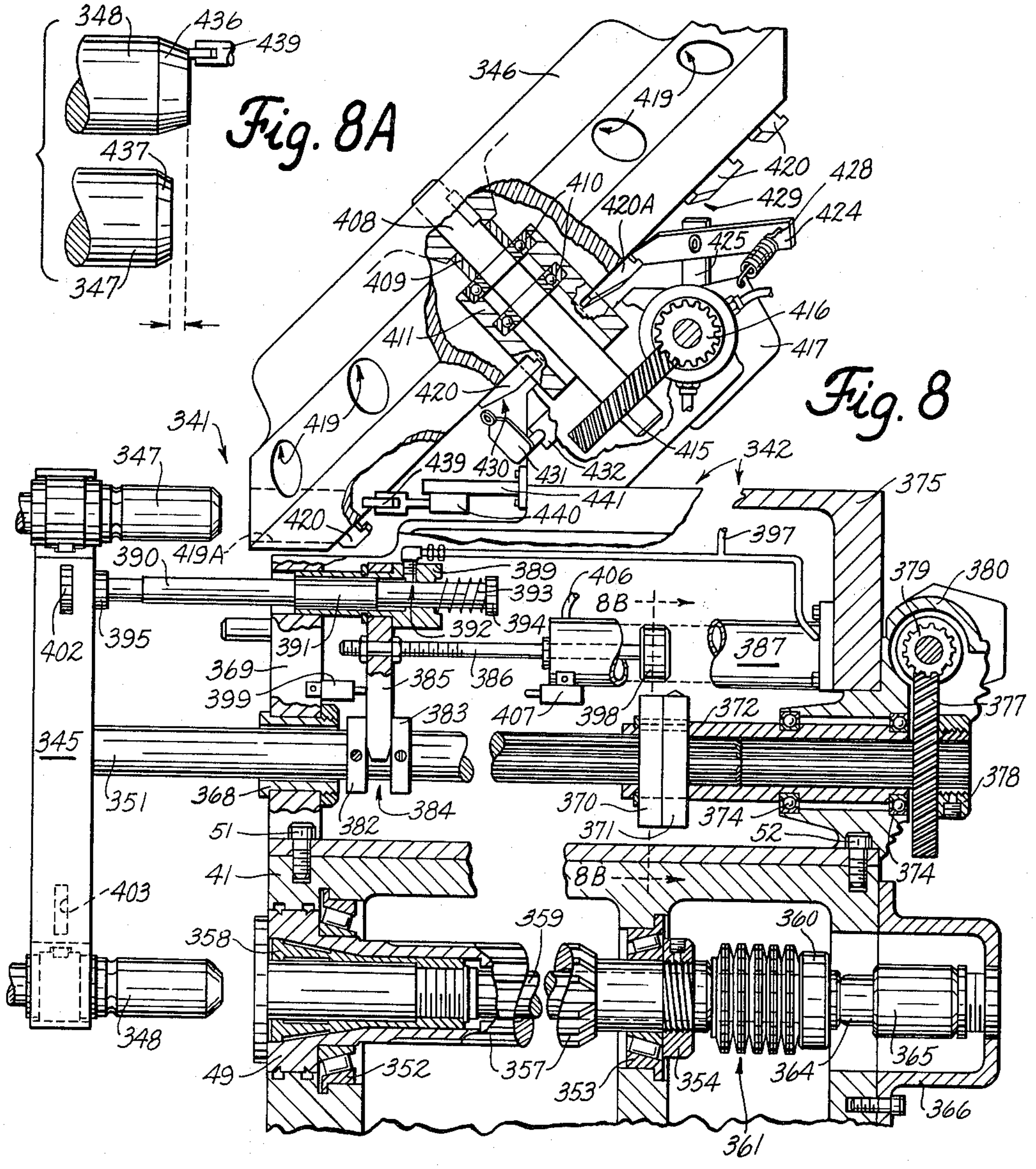
FIG. 8 is an enlarged fragmentary schematic view, partly in side elevation and partly in transverse vertical section, of the upper portion of the machine column and a unitary tool changing and tool storage mechanism.
FIG. 8A is an enlarged fragmentary view in side elevation illustrating a code identified toolholder and a noncoded toolholder.

As diagrammatically represented in FIG. 8, the tool change arm 345 has been moved axially outward to withdraw the tools 347 and 348 from the indexable storage drum 346 and tool spindle 49 respectively. To accomplish this, after the change arm has been rotated 90° from a horizontal parked position to engage the tools, hydraulic pressure fluid is transmitted to a line 397 which is connected to supply pressure fluid both to the stop cylinder 389 and the rearward end of the change arm actuating cylinder 387. Admission of hydraulic pressure fluid to the rearward end of the cylinder 387 effects outward movement of a piston 398 connected to urge the piston rod 386 and forked arm 385 forwardly. Thus, both the change arm 351 and the movable stop cylinder 389 are likewise moved to their axial forward or outward positions. At the same time, pressure fluid entering the movable stop cylinder 389 urges the piston 391 integrally formed with the shaft 390 axially forward relative to the supporting cylinder 389. With this condition existing, the flanged movable stop 395 is urged into abutting engagement with the rearward face of the outwardly urged tool change arm 345. Axial outward movement of both the change arm 351 and stop cylinder 389 is stopped upon movement of the arm 385 into actuating engagement with a sequencing limit switch 399.

Figure 8B:
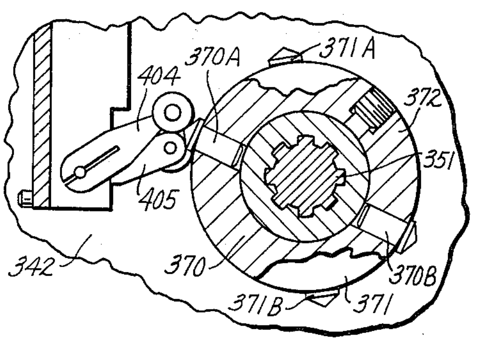
FIG. 8B is an enlarged fragmentary detailed view, partly in elevation and partly in vertical section through a cam control mechanism for the tool change arm, and taken along the lines 8B in FIG. 8.

For limiting the extent of rotational movement of the tool change shaft 351, the cam plates 370 and 371 secured to the drive shaft 372 are disposed to actuate limit switches 404 and 405, as shown in FIG. 8B. With the arm positioned vertically, as shown in FIG. 8, switch 404 is actuated by a cam 370A secured to the cam plate 370. After 180° rotation to interchange tools, a cam 370B secured to cam plate 370 is moved into a position to actuate the switch 404. The cams 370A and 370B secured to the cam plate 370 are spaced 180° apart, in a manner that the switch 404 is actuated by one of them whenever the tool change arm 345 is in vertical position.

Whenever the arm is in horizontal parked position, the swtch 405 is actuated by a cam 371A or 371B, spaced 180° apart and secured to the cam plate 371. After successive tool change functions have been completed, switch 405 is actuated alternately by cams 371A and 371B upon return movement to parked position. Due to the sequence of movements occurring during a tool change, cams 370A and 370B alternate in their actuation of switch 404. The alternation in operation of switches 404 and 405 during successive tool changing cycles is due to the movements occurring during each tool change cycle. Each tool change cycle comprises essentially five (5) major components of movement including (1) 90° clockwise rotation from a horizontal parked position to engage tools, (2) axial outward movement to withdraw tools, (3) 180° clockwise rotation to interchange aligned position of tools in preparation for reinsertion, (4) axial inward movement to reinsert the now interchanged tools in the spindle 49 and a storage socket in the drum 346, and (5) return 90° rotation of the change arm 345 to its horizontal parked position abutting the positive stop 483.

As viewed from the front of the machine, the shaft 351 and tool change arm 345 are rotated 180° in a clockwise direction from the position shown in FIG. 8 to interchange the position of the withdrawn tools in preparation for reinsertion. As soon as the change arm 345 has rotated out of engagement with the outwardly urged movable stop 395, FIG. 8, the latter is urged outwardly to its extent of movement into a position of alignment with annular slots 402 and 403 respectively formed in opposite side faces of the tool change arm 345. With the movable stop 395 now pressure urged to its outward position, it operates to limit the 180° interchange rotation of the tool change arm 345 upon movement of the annular slot 403 into intermeshing engagement therewith, as shown in tool change sequence view FIG. 9C.

During axial reinsertion of the interchanged tools from their position shown in FIG. 9C to that represented in FIG. 9D, the tool arm 345 is continuously pressure urged in a clockwise direction for maintaining the annular slot 403 in intermeshing engagement with the flanged outer end 395 of the movable stop shaft 390.

To effect inward reinserting movement, as viewed in FIG. 8, the hydraulic line 397 is connected to exhaust thereby disconnecting the flow of pressure fluid to the stop cylinder 389 and the inner end of cylinder 387. The flow of pressure fluid is then applied to a line 406 for transmitting fluid under pressure to the outer end of the cylinder 387, thereby effecting axial inward movement of the piston 398 and piston rod 386 secured thereto. As this occurs, the forked arm 285 is moved inwardly to effect corresponding axial inward movement of the tool change shaft 351 and movable stop cylinder 389 for reinserting the now interchanged tools in the storage drum 346 and tool spindle 49 respectively. Upon complete reinsertion of the interchanged tools, the forked arm 385 operates to actuate the limit switch 407 which is now actuated to disconnect the flow of hydraulic pressure fluid to the line 406, and to initiate a ninety degree (90°) counterclockwise rotation of the tool change arm 345 to its return parked position under the control of the drive motor 380. Rotation of the tool change arm 345 in a counterclockwise direction withdraws the annular slot 403 from meshing engagement with the flanged movable stop 395. Thereupon, the spring 393 effects inward movement of the movable stop shaft 390 and stop 395 to its innermost retracted position relative to the supporting movable stop cylinder 389.

To support a conical array of tools for sequential presentation to the tool change station, the indexable tool storage magazine 346 is keyed to the outer end of a rotatable shaft 408, as represented in FIG. 8. A thrust collar 409 fixedly encircling the shaft 408, is positioned to maintain the storage magazine 346 in properly spaced relationship to the upper one of a pair of antifriction bearings 410 carried within a tubular support 411 integrally formed with the support frame 342. Power for rotating the shaft 408 and storage magazine 346 is derived from a hydraulic motor 417 that is connected to rotate a worm 416 disposed to meshingly engage the worm wheel 415 which is secured to the lower end of shaft 408.

Each of the tool sockets 419 is adapted to support a tool positioned along an axis at an angle of 45° with respect to the axis of magazine rotation, as indicated by the rotatable support shaft 408. As represented in FIG. 8, the tool 347 has been withdrawn from the magazine socket 419A which is positioned at the tool change station in a position of parallelism with respect to both the tool change shaft 351 and the tool spindle 49. For maintaining the tool receiving socket 419A in the change station, a positioning dog 420A secured to the magazine 346 in properly spaced relationship is engaged by the inner end of a movable ratchet arm 424 pivotably secured to and upwardly extending support member 425 affixed to the frame 342. The dog 420A is one of a plurality of peripherally spaced dogs, such as the dogs 420, each of which is operative to position a particular one of the tool storage sockets at the tool change station. To accomplish this, the ratchet arm 424 is urged to rotate in a clockwise direction, as viewed in FIG. 8, by means of spring 428 secured at its opposite end to the support frame.

With the exception of positioning the first tool at the tool change station, advancement of the storage magazine 346 in a clockwise direction is sequential, i.e., the magazine is indexably advanced in a manner that the next succeeding one of the dogs 420 is retained in positioning engagement with the ratchet lever 424 in a position identical to that represented for the dog 420A. To accomplish this, each of the positioning dogs secured to the storage magazine 346 is provided with a beveled cam face, such as the cam faces 429 and 430 presented by the two dogs 420 respectively positioned on either side of the dog 420A. Thus, to effect a single step indexable advancement of the magazine 346 from the position represented in FIG. 8, the motor 417 is energized to rotate the magazine 346 in a clockwise direction. As this occurs, the beveled cam face 429 presented by the next succeeding dog 420 engages the ratchet arm 424, pivoting it in a counterclockwise direction. At the same time, the beveled cam face 430 presented by the dog 420 spaced immediately ahead of the dog 420A engages the pivoting, lever arm 431 of a control switch 432. Indexable movement of the magazine 346 continues in a clockwise direction, until the rearward positioning face of the succeeding dog 420 passes slightly beyond the cooperating locating face of the ratchet arm 424, at which time the spring 428 operates to pivotally return the ratchet arm 424 to its locating position. The arrangement is such that the actuated switch 432 then is connected to so operate the drive motor 417 as to effect counterclockwise rotation of the magazine 346 for positively maintaining the located face of the succeeding dog 420 in engagement with the ratchet arm 424. At this time, the next succeeding tool storage socket is indexably advanced into a position for locating the next tool at the tool change station.

In the present invention, coded identity of the first tool is accomplished by providing a tool holder of slightly longer length than all succeeding tool holders of a preselected series of tool holders to be sequentially presented during a particular machining program. As represented in FIG. 8A, for example, the tool holder 348 is provided with a beveled inner end 436 of greater length than the beveled end 437 of the tool holder 347, the latter being representative of the remaining tools in a predetermined sequential series of tools. During indexable clockwise rotation of the magazine 346 for selecting the first tool, therefor, the beveled end 436 of tool 438 engages a roller plunger 439 of a switch 440 to effect counterclockwise rotation of the magazine 346 for positioning the first tool 348 of a series at the change station. Switch 440 is supported in a position spaced inwardly from the sequentially positioned tool storage sockets by means of a bracket arm 441 secured to an upwardly extending portion of the frame 375.

To grip tools during an interchange, the tool change arm 345 is provided at its opposite ends with semi-circular tool engaging recesses 444 and 445 respectively. As represented in fragmentary form in FIG. 9E, an axially movable detent 446 is carried in spaced relationship to the semi-circular tool receiving recess 444 for engaging a tool such as a tool 347. The detent 446 is operated by a resilient biasing mechanism 447 constrained for movement within a bored opening 448 formed in the tool change arm 345. In a similar manner, a resiliently movable detent 449 is disposed in tool engaging relationship to the semi-circular recess 445 presented by the change arm 345.

Initially, therefore, the change arm 345 is pivoted 90° in a clockwise direction from the position engaging positive stop 453 represented in FIG. 9 to that shown in FIG. 9A and into abutting engagement with a positive stop 454 secured to the support frame 342.

As schematically represented in FIG. 10, there is provided an electro-hydraulic control circuit for operating the tool storage magazine and the tool change mechanism, as well as for effecting servo-controlled operation of the table, saddle, and knee. To accomplish this, hydraulic fluid from a sump 457 is withdrawn by a pump 458 and transmitted under pressure to a main pressure supply line 459, a main exhaust line 460 being connected to return fluid to the sump 457. The pump 458 and sump 457 comprise the source of hydraulic pressure fluid 239 schematically illustrated in FIG. 7, as hereinbefore explained. From the main supply line 459, pressure is transmitted via a throttle control valve 461 and a check valve 462 to a branch line 463. For effecting rotation of the tool storage magazine 346 in a clockwise direction, a solenoid 467 of a magazine control valve 468 is energized, urging an associated valve spool 469 axially in opposition to a spring 470. With this condition existing, pressure fluid from the branch line 463 is then transmitted via cannelure in the rightwardly moved valve spool 469 to a line 471 connected to rotate the fluid motor 417 for effecting clockwise rotation of the tool storage magazine 346. The flow of fluid is exhausted from the motor 417 via a line 472, and a cannelure in the valve spool connected to an exhaust line 473 which, in turn, is connected via a flow control valve 474 to a main exhaust line 460. To effect counterclockwise rotation of the storage magazine 346, solenoid 467 is deenergized and the solenoid 478 is energized to effect leftward axial movement of the valve spool 469 compressing a spring 479.

For effecting clockwise rotation of the tool change arm 345, a solenoid 481 of a valve 482 is energized to effect rightward movement of the valve pool 483 in opposition to a spring 484. With this condition existing, pressure fluid from the supply line 463 then flows via a cannelure in the rightwardly moved valve spool to a line 485 connected to operate the fluid motor 380 for effecting clockwise rotation of the tool change arm 345. The flow of fluid through the motor 380 continues via a line 486, another cannelure in the rightwardly moved valve spool 483, and thence via a branch exhaust line 487 connected to the main exhaust line 460. For rotating the tool change arm 345 in a counterclockwise direction to parked position, solenoid 481 is deenergized and a solenoid 489 is energized.

For effecting coordinate control of the axially movable tool change arm 351 and movable stop cylinder 389, there is provided a valve 494 having a valve spool 495 normally retained in resiliently biased central position as shown. To effect axial outward tool withdrawing movement of the tool change arm 345 and stop cylinder 389, a solenoid 498 of the valve 494 is energized to urge the associated valve spool 495 leftwardly in opposition to a spring 499. Leftward movement of the valve spool 495 effects corresponding movement of a valve spool cannelure to transmit pressure fluid from the line 463 to the common line 397 which is connected to effect leftward, or outward movement of the piston 398 and the movable stop piston 391. After the tool change arm 345 has been rotated 180° to align the interchanged tools for reinsertion, as hereinbefore explained, solenoid 498 is deenergized and a solenoid 504 is energized. As soon as solenoid 504 is energized, the valve spool 495 is urged axially rightward in opposition to a spring 505.

To release a tool in preparation for a tool change function, the solenoid 509 of control valve 508 is energized to effect movement of the valve spool 510 in opposition to the spring 511. As soon as this occurs, pressure fluid is then transmitted from the pressure supply line 463 via a cannelure in the now actuated valve spool 510 to the line 515 for urging the piston 514 and piston rod 364 outwardly into a collet unclamping position. Fluid from the cylinder 365 is then exhausted via the line 512.

As hereinbefore explained with reference to FIG. 7, the table 46, saddle 45, and knee 43 are normally constrained against movement in either direction by operation of hydraulically actuated friction brakes 122, 105, and 91 respectively as schematically shown in FIG. 10. At the same time, respectively associated hydraulically actuatable clutches 121, 106 and 92 are disengaged whenever the associated friction brakes are engaged. This condition exists due to the fact that valve spools 234, 262 and 273 of the respective valves 233, 259 and 260 are resiliently actuated to one of their two extreme positions. For effecting positional movement of the table along a selected axis, one of the solenoids 232, 261 or 272 is energized to urge the valve spool associated therewith to its opposite position, thereby connecting the associated brake to exhaust and, at the same time, connecting the pressure line 459 to effect engagement of the drive clutch.

Pressure fluid for operating the servo drive motor 153 is made available by energizing a solenoid 520 of a valve 521, urging a valve spool 522 in opposition to a spring 523. Thereupon, a flow of pressure fluid from the line 459 is transmitted by a valve spool cannelure to the supply line 245 connected to a port of the servo valve 248, another port therein being connected via the return line 246 to the exhaust line 460. Operation of the motor 153 is effected by the servo 252 which is responsive to one of the positioning drive control circuits. For flushing the system, another solenoid 525 may be selectively energized for effecting movement of the valve spool axially in opposition to a spring 526.

Whenever the hydraulic system is actuated, fluid pressure from the supply line 463 is connected to transmit fluid to a counterbalance cylinder 524. As schematically shown in FIG. 10, a piston 527 is operated to urge a piston rod 527A into engagement with a portion 43A of the knee 43. This has the effect of counterbalancing the weight of the knee during servo controlled operation.

Power for rotating the spindle at selected rate is derived from a unidirectional, two speed motor 528 having an output pulley connected by a belt 530 to rotate a driven pulley 531 secured to a rotatable shaft 532, as shown in FIG. 11. The input pulley shaft 532 is connected to rotate the driving plates of a selectively actuatable multiple disc clutch 533, the driven plates of which are connected in well-known manner to one end of a unidirectional transmission drive shaft 534. The selectively rotatable, input drive shaft 534 is positively connected to rotate the driving plates respectively associated with a forward clutch 536 and a reverse clutch 537. The driven plates of forward clutch 536 are secured to one end of an elongated hub 538 of a bevel gear 539 that meshingly engages a bevel gear 540 secured to one end of a splined transmission input shaft 541. In a similar manner, the driven plates of the reverse clutch 537 are secured to one end of an elongated hub 545 integrally formed with a bevel gear 546 that is likewise connected to intermeshingly engage the bevel gear 540. Whenever the spindle 49 is positively braked against rotation, the input clutch 533 is deactuated, thereby interrupting the transmission of unidirectional power from the input shaft 532 to the unidirectional driven shaft 534. With the common input drive shaft 534 not rotating, both the forward clutch 536 and the reverse clutch 537 are actuated to frictionally connect the input bevel gears 539 and 546 to the stationary shaft 534, thus braking the gear 540 against rotation.

For providing coordinated control of the main drive clutch 533 and the directional clutches 536, 537; there are provided a pair of interconnected control valves 547 and 548. Hydraulic fluid for operating the clutches, as well as effecting shiftable movement of the transmission gearing, is drawn from a sump 549 by a pump 550 driven by a motor 551, thus applying hydraulic fluid under pressure to a main supply line 552. Supply line 552 is connected to supply pressure fluid to one port of the main clutch control valve 547, the latter being provided with another port connected via a line 553 to return fluid to the sump 549.

To connect the motor 528 for rotating the spindle 49, it is necessary to effect energization of the solenoid 566 of valve 547, simultaneously with energizing either a solenoid 567 or a solenoid 568 of the valve 548. Energization of the solenoid 566 effects movement of the valve spool 556 leftwardly in opposition to the spring 554, as shown in FIG. 11, thereby connecting the line 552 to transmit pressure fluid to the line 564 for actuating the drive clutch 533. At the same time, energization of solenoid 567 effects leftward movement of valve spool 559, thereby connecting the hydraulic line 564 via a valve spool cannelure 570 to the line 561 for maintaining the forward directional clutch 536 in actuated condition. At the same time, the reverse directional clutch 537 is deactuated due to the fact that the supply line 562 therefrom is now connected via a valve spool cannelure 571 to the line 558, and thence through a cannelure in the leftward moved valve spool 557 to the main exhaust line 553.

As soon as both solenoids 566 and 567 are deenergized, drive clutch 533 is deactuated and directional clutches 536 and 537 are simultaneously actuated to immediately stop forward or clockwise rotation of the tool spindle 49.

In a similar manner, counterclockwise rotation of the spindle 49 is effected by simultaneous energization of solenoids 566 and 568.

For selectively varying the rate of rotation of the tool spindle 49, a shiftably geared transmission 573 is selectively shifted by a hydraulically actuatable shifting mechanism 574. Referring now to the transmission 573, the input splined shaft 541 is engaged by an axially slidable couplet 576 comprising gears 577 and 578, and is controlled for shiftable movement to one of two positions by a shifter fork 579. The fork 579 is pinned to an axially movable shifter rod 580 constrained at its opposite ends for movement within aligned cylinders 583 and 584 respectively formed in spaced apart walls of a support frame 585. Actually, as illustrated in FIG. 11, the rod 580 is provided at one end with a small diameter piston engaging the cylinder 583, and at its opposite end with a large diameter piston slidable within the cylinder 584 connected to a hydraulic line 586. With the line 586 connected to exhaust and the cylinder 583 connected directly to the common hydraulic pressure supply line 552, the shifter rod 580 is urged in a rightward direction for maintaining the gear 577 in meshing engagement with a non-shiftable gear 589 splined to a shaft 590. For shifting the couplet 576 to its opposite position, a solenoid 591 of a valve 592 is energized to urge valve spool 593 leftwardly in a manner to connect a line 594 to transmit fluid under pressure to the line 586. With pressure fluid from the line 586 transmited to the large diameter cylinder 584, the shifter rod 580 is urged axially leftward for moving the gear 578 into meshing engagement with a non-shiftable gear 588 carried by the shaft 590.

In addition to the gears 589 and 588, another non-shiftable gear 596 is splined to the shaft 590. As viewed in FIG. 11, a gear couplet 597 slidably splined to a shaft 598 is positioned to maintain a gear 599 thereof in meshing engagement with the gear 588. For maintaining the couplet 597 in its leftwardly shifted position, a cooperating shifter fork 603 is pinned to a shaft 604 constrained at its opposite ends for axial slidable movement within a small cylinder 605 and a large cylinder 606 formed in the side walls of the frame 585. Whenever a solenoid 609 of a valve 610 is energized to effect leftward movement of valve spool 611, a hydraulic circuit is completed from the pressure supply line 594 to a branch line 612 which is then operative to urge the large piston secured to the shifter rod 604 to its extreme leftward position. Inasmuch as the supply of pressure fluid from line 552 to the small cylinder 605 constitutes common fluid pressure biasing means, connection of the branch line 612 to exhaust permits immediate rightward shifting movement of the rod 604 and shifter fork 603, which operates to move a gear 615 of couplet 599 into meshing engagement with the non-shiftable gear 596. Rightward shifting movement of the couplet 597 is effected by deenergizing the solenoid 609.

Another gear couplet 616 comprising gears 617 and 618 is slidably splined to the shaft 598 for selective operation in transmiting power to rotate a splined shaft 619. For effecting shiftable movement, the gear couplet 616 is engaged by a cooperating shifter fork 622 pinned to shifter rod 623 provided at its opposite ends with a small and a large piston respectively constrained for slidable movement in spaced apart cylinders 624 and 625. With a valve spool 628 of an associated control valve 629 resiliently urged rightwardly, as shown, a cannelure 630 interconnects the exhaust line 552 with a branch supply line 632. With the large diameter cylinder 625 connected to exhaust, pressure fluid from the supply line 52 enters the small cylinder 624, urging the shifter rod 623 to its rightward position for maintaining the gear 618 in meshing engagement with a non-shiftable gear 636 splined to the shaft 619. Energization of a valve solenoid 631 urges the valve spool 628 in opposition to the biasing spring for supplying fluid pressure to the branch line 632, to effect leftward shiftable movement of the gear 617 into engagement with a non-shiftable driven gear 637 splined to the shaft 619.

Non-shiftable gears 638 and 639 are likewise splined to the shaft 619 for respective selective individual engagement with one of a cooperating pair of gears carried by a gear couplet 642 that is slidably engaged directly with the splines 357 presented by the rotatable tool spindle 49. For shifting the gear couplet 642 along the spindle splines 357, a shifter fork 643 is pinned to a rod 644 provided at its opposite ends with small and large pistons, the pistons being constrained for slidable movement within cooperating cylinders 645 and 696 respectively. As before, axial movement of the shifter rod 644 is under control of associated valve 649 responsive to a solenoid 650 for controlling the admission of pressure fluid to a hydraulic line 651 connected to the large cylinder 696. With the solenoid 650 deenergized, as shown, a valve spool 652 is resiliently urged in rightward direction connecting the line 651 to the exhaust line 552 to maintain the shifter rod 644 in rightward position. In illustrated condition, therefore, the shifter fork 643 urges the couplet 642 rightwardly to maintain a gear 655 thereof in engagement with the non-shiftable gear 639. To shift the couplet 642 leftwardly for moving a gear 656 thereof into engagement with the non-shiftable gear 638, the solenoid 650 is energized to move the valve spool 652 leftwardly, connecting pressure supply line 594 to transmit fluid under pressure to branch line 651.

With the hydraulically actuatable shifting mechanism 574 provided with the described differential piston arrangement, each of the four gear couplets 576, 597, 616, and 642 are respectively movable to one of two shiftably adjusted positions. Thus, selected adjustment of the shiftably geared transmission 573 is effected by energizing control solenoids 591, 631, 609 and 650 in predetermined selected combinations to rotate the tool spindle at a selected one of sixteen different gear ratios. In combination with shiftable adjustment of the gear couplets in the transmission 573, the motor 528 is connected to be operated at a selected one of two different speed rates for actually rotating the spindle 49 at a selected one of 32 different speed rates.

As shown in FIG. 12, electrical energy from a three phase source (not shown) is connected to energize line conductors L1, L2 and L3 which are connectable in well-known manner by a fused disconnect switch 660 to energize conductors 661, 662 and 663. Likewise, in well-known manner, conductors 662 and 663 are connected to energize a control transformer 665 operative to energize two phase supply conductors 666 and 667 for a control circuit. To energize a master control circuit for operating the machine, a master start button switch 668 is momentarily depressed completing a circuit from energized conductor 666 via a normally closed push button stop switch 669, to energize a relay coil 670, the opposite terminal of which is connected to energized conductor 667. Energization of relay 670 effects closure of a lower contact 670–1 to complete a seal-in circuit via a conductor 673, to energize one common supply conductor 674 for the program control circuit; and, simultaneous closure of an upper contact 670–2 completes a circuit from conductor 667 to energize another common supply conductor 675 for the program control system. Upon energization of conductors 674 and 675 one circuit is completed to energize a relay 678, effecting movement of its three associated contacts to closed position for transmitting current from the three phase supply conductors to energize the hydraulic pressure pump drive motor 551. Another circuit is completed between energized conductors 674 and 675 to energize a relay 679 for urging its associated contacts to their closed position for completing another circuit from the three phase supply conductors to energize another hydraulic pump drive motor 456. Conversely, to deenergize conductors 674 and 675, as well as pump drive motors 551 and 456, the normally closed push button stop switch 669 is momentarily depressed to interrupt the seal-in circuit from now energized conductor 673, thereby effecting deenergization of the master start relay 670.

To condition the spindle for rotation upon selective programmed energization of the spindle drive motor 528, a normally open push button switch 683 is momentarily depressed to energize a relay 685 to closed position. The circuit is completed from energized line 674, the momentarily closed push button switch 683, and an associated normally closed stop switch 684 to the coil of relay 685 connected to the energized supply conductor 675. Energization of relay 685 effects closure of contact bar 685–1, thereby completing a seal-in circuit from an energized conductor 687 to a conductor 688 for retaining the relay 685 in energized condition. At the same time, energization of relay 685 effects closure of another contact 685–2, FIG. 28, conditioning a circuit along a conductor 690 for effecting subsequent programmed energization of the solenoid 566.

For energizing the coolant pump motor 680, a relay 691 is selectively energized to effect closure of three normally open contacts 691–3, as shown in FIG. 12. To energize the spindle transmission drive motor 528, for operation at low speed, a relay 693 is energized effecting closure of three associated normally open contacts 693–3; and, for effecting high speed spindle operation, the relay 693 is deenergized and a relay 694 is energized to effect closure of the three associated normally open contacts 694–3. It is noted that the coils for relays 693 and 694 are dotted in FIG. 12 and are identified as being located in FIG. 20, which also depicts the circuits for effecting selective programmed energization of these relays. In a similar manner, the coil for relay 691 is dotted in FIG. 12, this coil being identified as located in FIG. 28. In a similar manner, the various interconnecting relays are cross-referenced to facilitate an understanding and reading of the control circuit drawings illustrated in FIGS. 12 to 28, inclusive. For example, the coil for relay 685 is identified as controlling another associated contact illustrated in FIG. 28.

To further facilitate the description, only two sets of switches on each of the sections 57, 58 and 59 represented in FIG. 2 are shown in the detailed circuit drawings on FIGS. 13 and 14 to provide a total of six sets. Each cooperating set of the six sets of switches there represented is arranged in a vertical column with corresponding adjacent switches of each cooperating vertical set being aligned horizontally in a manner that all of the switches are disposed in matrix fashion. The first two vertical columns comprise position selector switches PF–1 to PF–5 inclusive and PE–1 to PE–5 inclusive, with the two columns respectively comprising the P–2 and P–1 sets of switches on section 59. The adjacent vertical columns of switches PD–1 to PD–5 inclusive, and PR–1 to PR–5 inclusive comprise the P–2 and P–1 sets of position switches on panel section 58. Vertically disposed below the PD–1 position switch in FIG. 14 are the rate selector switches FD–1 and FD–2 inclusive; and vertically disposed below the PR–1 position switch are the rate selector switches FT–1 and FT–2.

In like manner, the P–2 set of switches on sub-panel 57 include rate selector switches FB–1 and FB–2, together with position selector switches PB–1 to PB–5 inclusive. The P–1 set of seven cooperating switches on sub-panel 57 comprises the two rate selector switches FA–1, FA–2, and the five position selector switches PA–1 to PA–5 inclusive. As indicated by the brackets in FIGS. 13 and 14, the six cooperating sets of position and rate selector switches there shown are representative of those switches included on sub-panel 56, FIG. 2, the operative relationship of these switches in the entire control system being diagrammatically illustrated in FIG. 7.

As likewise represented in FIGS. 13 and 14, each cooperating set of five position selector switches comprises one portion of the selectors 56, and is individually operative to actuate the position controller 223. Likewise, each set of two feed rate selector switches, such as FT–1 and FT–2 represented in FIG. 14, is cooperatively connected to actuate the feed rate controller 212. The feed rate controller 212 comprises one relay bank 697 including ten relays FT–1 to FT–0 inclusive and a second cooperating relay bank 698 including ten relays F–1 to F–0 inclusive. For effecting movement at a selected feed rate during a particular phase of a machine program, one selected relay of each of the cooperating relay banks 697 and 698 are simultaneously actuated to, in turn, effect selective actuation of the feed rate resistors 214, schematically represented in FIG. 7. To effect this result, a cooperating pair of feed rate selector switches are simultaneously interconnected for operation in coordinated relationship with five position selector switches. To energize a selected relay in the relay bank 697, the conductors 701 to 710 inclusive are respectively connected to 10 terminals of the feed rate selector switch FD–1, a wiper arm 712 thereof being presettably engageable with a selected one of the ten contacts. The three other rate selector switches identified by the suffix "–1" are likewise provided with wiper arms and ten contacts, each group of ten switch contacts being connected by ten branch conductors with the conductors 701 to 710 inclusive.

To actuate a selected relay in relay bank 698, the selector switch FD–2 is provided with a wiper arm 714 presettably engageable with one of ten contacts respectively connected via conductors 715 to 724 inclusive to the relays F–1 to F–0 inclusive. The other three horizontally aligned selector switches identified by the suffix "–2" are likewise respectively provided with wiper arms respectively engageable with corresponding banks of ten contacts interconnected by ten conductors to the conductors 715 to 724 inclusive. With the feed rate selector switches FD–1 and FD–2 preset to their 4.4 inch feed rate as shown, energization of the relay BP–2 effects closure of associated contacts to permit simultaneous energization of relays F–4 and FT–4 respectively. The coil for the relay BP–2 schematically represented in FIGS. 13 and 14 comprises one of a group of ten functions select relays BR, FIG. 22. Thus, for actually interconnecting feed rate selector switches FD–1 and FD–2 into the circuit for controlling feed rate, it is necessary to simultaneously energize the relay BP–2 in code relationship with a required one of the ten relays in program phase controller AR, FIG. 22.

For illustrative purposes, it will be assumed that movement is required along the Y axis to a predetermined position in accordance with the preset positions of the five position selector switches PD–1 to PD–5 inclusive. Therefore, relay AYY, of function select controller AR, is energized simultaneously with relay BP–2 of function select controller BR. As shown in FIG. 13, a circuit is then completed from the energized supply conductor 674 via conductors 727, 728, the now closed AYY contact, to a conductor 729 connected to effect energization of conductor 730 extending from FIGS. 13 to 14. From the now energized conductor 730, FIG. 14, the circuit continues via the now closed contact PB–2 to a conductor 732 which is connected to complete a circuit via the switch wiper arm 714 of rate selector switch FD–2. From the wiper arm 714, the circuit then continues via the conductor 718 to energize the relay F–4, connected at its opposite terminal to the energized supply line 675. Another circuit is simultaneously completed from the now energized conductor 730 via another one of the now closed BP–2 contacts to energize a conductor 733. The preset switch wiper arm 712 of rate selector switch FD–1 transmits current from the now energized conductor 733 to the conductor 704 connected to effect energization of the relay FT–4.

Three relays TEO, TE–1 and TE–2 comprising the relay bank 735 are respectively connected by horizontal conductors 741, 742 and 743 to three contacts of the position selector switch PD–1. A wiper arm 745 of switch PD–1 is preset to its 0 position, this setting corresponding to the first digit of the illustrative position "08.645" of a five digit number. With both program phase command relays AYY and BB–2 energized, as hereinbefore explained, a circuit is then established from the energized conductor 730 via the now closed contact BP–2 to a conductor 746 to the wiper arm 745 of switch PD–1. The circuit continues from the energized wiper arm 745 via conductor 741 to energize the relay TE–0, the opposite terminal of which is connected to the energized line 675. In a similar manner, the five other position selector switches identified by the suffix "–1" are aligned with the relay bank 735, and each of these switches is likewise provided with a wiper arm and an associated bank of three contacts respectively connected by vertical lines to the conductors 741, 742 and 743.

The required second digit of a five digit position command number is preset upon selective energization of one of the ten relays U–0 to U–9 inclusive, these relays comprising the relay bank 736. One terminal of each of the relays U–0 to U–9 inclusive is respectively connected by horizontal conductors 750 to 759 inclusive to one contact of a bank of ten contacts associated with the second digit position selector switch PD–2. With the second digit of the illustrative position number being "8," an associated wiper arm 761 of the switch PD–2 is preset to the position indicated for connecting now energized conductor 862 to the conductor 758 which is connected to effect energization of the relay U–8.

The other five second digit selector switches identified by the suffix "–2" are provided with presettable wiper arms and associated banks of ten contacts, the latter being respectively connected via branch conductors to the conductors 750 to 759 inclusive.

With the switch wiper arm 682 presettably adjusted as shown in FIG. 13, a circuit condition is established along the associated vertical conductor and the horizontal conductor 776 for effecting energization of the relay TN–6 corresponding to the numeral "6" which is, in this case, the third digit of the illustrative five digit position control number.

With contact AYY now closed to effect energization of the vertical supply conductor 730, a circuit is completed from the now closed contact BP–2 to energize a conductor 797 connected via the preset switch wiper arm 798 to the horizontal conductor 788 for energizing the relay H–4, the opposite terminal thereof being connected to the energized vertical supply conductor 675.

The fifth digit relay bank 739 comprises ten relays TH–1 to TH–0 inclusive which are respectively connected by horizontal conductors 801 to 810 inclusive, and interconnecting branch conductors to separate banks of ten contacts respectively associated with the horizontally spaced selector switches identified by the common suffix "–5." Thus, with conductor 730 energized, a circuit is completed via the now closed contact BP–2 to a conductor 811, the preset wiper arm 812, the associated branch conductor to the horizontal conductor 805 connected to one terminal of the relay coil TH–5, the opposite terminal of which is connected to the energized supply line 675.

To actually effect the required axis of movement, as will hereinafter be more fully explained in connection with FIGS. 15, 16 and 17, separate axis control relays are connected to be operated in coordinated relationship with either the contact AYR or the contact AXR, FIG. 13.

To illustrate the operative interconnection between the position control relay banks 735 to 739 inclusive and the command transformer for controlling the lineal transducers illustrated in FIGS. 15 to 17; the vertical column of five position selector switches PR–1 to PR–5 inclusive are described in their energized condition. These switches are respectively represented as being preset in conformity with the indicia represented on the corresponding P–1 switches, shown in section 58 of sub-panel 56 in FIG. 2. Further, for illustrative purposes, these preset switches for positional instructions are programmed to control X axis movement during phase PH–9, as represented by the preset condition of program selector switches 9A and 9B on sub-panel 55 in FIG. 2.

In a manner similar to that hereinbefore explained, the rate selector switches FT–1 and FT–2, FIG. 14, are preset to effect a feed rate of 6.6 inches per minute when activated to transmit current for effecting corresponding energization of relays FT–6 and F–6. Likewise, the five position selector switches PR–1 to PR–5 inclusive are preset to provide the five digit position control number "06.785." Energization of both the rate selector and position selector switches is effected upon simultaneous closure of the BP–1 contacts and the AXX contact respectively.

Position control circuits for X axis movement are simultaneously established from branch conductors 861 to 865 inclusive via the preset wiper arms 871 to 875 inclusive for energizing one relay in each bank of the position control relays 735 to 739 inclusive.

Command conditions are thus immediately established in the switching networks 880, 881 and 882 in FIGS. 15 and 16 for effecting the desired positional movement along the X axis, the preset command position being represented by the number "06.785" inch. This command signal is a discrete position requiring X axis movement of the worktable from its former position to the newly selected position. It will be apparent that the illustrative position command signal "06.785" is effected in the switching networks by closure of the associated relay contacts TE–0, U–6, TN–7, H–8, and TH–5 in which the last digit in the identifying reference numeral indicates the numerical value of both the contact and the associated position control relay. Inasmuch as X axis movement is required for this particular program phase, the positional command contacts are moved to closed position simultaneously with a plurality of X axis control contacts represented in FIGS. 15, 16 and 17.

All of the X axis control contacts shown in FIGS. 15, 16 and 17 are identified by like reference numerals AX, and all of them are shown in closed position in response to energization of an associated relay coil AX, shown in FIG. 25. Before describing the command transformer and lineal transducers for effecting servo controlled positional movement, it is emphasized that one of the novel features of this invention is the utilization of a single servo drive for precisely controlling movement along a plurality of different axes, in combination with a single command transformer network that is respectively connected to control a positioning device associated with each axis of movement. A principal reason for illustrating the command transformer and positional transducers, therefore, is to illustrate the novel switching contacts interconnected with the program control system to achieve this result.

As shown in FIG. 15, energization of the master start relay 670 effects closure of an associated contact 670–3 for connecting 400 cycle, A.C. supply conductors 889 and 890 to energize the primary winding 891 of a positional command transformer 892.

The transformer 892 is provided with a secondary winding 893 having ten taps interconnected with ten vertically depending conductors including energized output conductors 895, 896 and 897. The ten energized depending conductors are connected via ten transverse conductors including the normally open relay contacts TN–0 to TN–9 inclusive to ten conductors connected to a common conductor 898 of the switching network 881. The output conductor 898 is connected via an energized winding 7–T to the depending conductor 896. In a similar manner, the normally open relay contacts H–0 to H–9 inclusive are operatively interposed in ten transverse conductors interconnected between the ten energized depending output conductors from the transformer secondary winding 893 to a conductor 899 of the switching network 883, and thence via a winding 2T to a conductor 900 connected to the conductor 896.

Likewise, as shown in FIG. 15, the ten normally open relay contacts TH–0 to TH–9 are operatively interposed in ten transverse lines interconnected between the ten depending output conductors from the transformer and a common conductor 901 of the switching network 887, connected via energized winding 3T and conductor 902 to conductor 896. The ten energized output conductors continue, as shown in FIG. 16, to ten transverse conductors which are connected via the now closed ten contacts associated with the energized relay AX to ten associated depending conductors operatively interconnected with the transversely extending energized output conductors. This switching connection is exemplified by the connection of energized conductor 895 via the now closed AX contact to depending conductor 903; the connection between energized depending conductor 896 and a now closed contact of the energized AX relay to the depending conductor 904; and, the connection between energized depending conductor 897 and a now closed AX contact to the depending conductor 905. The conductors, including 903, 904 and 905 are respectively interconnected with the transverse conductors, including 895, 896 and 897. The ten normally open contacts TN–0 to TN–9 are operatively interposed in corresponding transverse conductors connected to a depending conductor 908.

From the energized conductors 896 and 908, FIG. 16, the command circuit continues to the correspondingly identified conductors in FIG. 17. As there shown, with the AX relay energized, conductor 908 is connected via an energized winding 5TX and the now closed AX contact to depending conductor 896 which is connected to supply command current to branch conductors 914 and 915 respectively. Energized conductor 914 is connected via one set of energized windings 3T, 2T, 7T and a resistor 918 to supply current to one transducer supply conductor 920. Energized conductor 915 is connected via windings 3T, 2T, 7T and a resistor 922 to a conductor 925. Depending upon the selected axis of movement, the output supply conductors 920 and 925 constitute a source of input supply current to a corresponding selected one of the transducer primary windings 188, 196, or 167. In the presently described example, for effecting X axis movement, the flow of current from supply conductors 920 and 925 continues along correspondingly identified conductors in FIGS. 16 and 15. As represented in FIG. 15, the flow of supply current from conductor 920 continues via an energized winding 6TX to a conductor 927 connected via a now closed AX contact to a conductor 928 connected to one end of the primary winding 167 of the X axis lineal transducer 160. At the same time, current from the energized conductor 925 is transmitted via an energized winding 6TX, a conductor 929, the now closed AX contact and a variable resistor 930 connected via a conductor 931 to the opposite end of the transducer primary winding 167.

As schematically represented in FIG. 15, the primary winding 167 is tapped at integral inch points to conductors connected to a lineal resistor 936, the latter being connected via correspondingly spaced branch conductors and the now closed AX contacts to conductors 940X to 936X inclusive. For establishing a return circuit path from an appropriate, predetermined position along the primary winding 167, one or another of the conductors 940X to 963X inclusive is connected via a preselected switching action of the switching network 880 to the transformer secondary winding 893. In the described example, it will be recalled that X axis movement has been programmed by activating the P–1 set of position switches on subpanel 58, FIG. 2, calling for a position of "06.785" inch. This identical "06.785" inch position is diagrammatically illustrated in FIG. 15 by the arrow 967. Inasmuch as the X axis primary winding 167 is fixedly secured to the worktable, the worktable is therefore caused to be moved in the direction of the arrow 970 until the secondary winding 170 is exactly centered over the illustrative position indicating arrow 967. After this required movement has taken place, the secondary winding 170 produces a null signal for stopping worktable movement.

For the purposes of this invention, it is deemed sufficient to state that the proportion of input current supplied to the transducer primary 167 on one side of the illustrative arrow 967 is so related to that proportion of the current supplied to the other side of the primary winding as to represent the desired position therealong. These currents combine to establish a current flow along the conductor 971 and the specific now closed AX contact No. 973 to the conductor 946X. This command circuit continues from the conductor 946X via the specific now closed U–6 contact 976 to a conductor 977 connected via a conductor 978 to a conductor 981. The circuit continues from conductor 981 via the now closed contact TE–0, the conductor 982, the now closed AX contact and energized windings 5TX, 4TX to a conductor 983. From the conductor 983, the circuit continues via another now closed AX contact to a conductor 984, connected via a junction point and a conductor 987 to the secondary winding 893. That portion of the circuit beyond the junction point and leftward of the conductor 987 including the energized windings and conductor 990 relates to a selective zero offset for all axes; a detailed description of this portion of the circuit not being necessary for this invention. The circuit from conductor 988 likewise continues via another now closed AX contact to a conductor 990 connected to the transformer secondary winding 893.

As these various circuit conditions are being established to initiate worktable movement in the direction of the arrow 970, the X axis secondary winding 170 is likewise connected via a pair of now closed AX contacts to conductors 993 and 994 respectively. The X axis secondary winding 170, therefore, is connected to supply command signals via conductors 993 and 994 to the discriminator and phase detector 218. As hereinbefore explained, the discriminator and phase detector 218 operates via conduit 255 to actuate a servo amplifier 254 for rotating the single servo drive motor 153 in the appropriate direction for effecting positionally controlled movement of the worktable in the direction of the arrow 970. Movement of the worktable continues until the secondary winding 170 is so positioned over the primary winding 167 as to be centered with respect to the arrow 967, at which time a null signal is transmitted via conductors 993 and 994 to so operate the discriminator and phase detector 218 as to stop worktable movement and provide a signal along conduit 280 for actuating the position complete relay IPR. Actuation of the relay IPR, in turn, effects advancement to the next program phase, thereby disconnecting the previously established conditions for effecting the described X axis movement. Thereupon, all of the positional control contacts in switching networks 880, 881, 883, 887 and 882 resume their normally open positions; likewise, all of the previously closed AX contacts resume their normally open positions.

In FIG. 16, a corresponding Y axis 06.785 inch position is schematically represented by the arrow 1006 with respect to the transducer primary winding 196 which is fixedly secured at its opposite ends to the column.

In a similar manner, Z axis movement may be effected to the exact "06.785" inch position represented in FIG. 17 by the arrow 1015 with respect to the Z axis primary winding 188. To effect such Z axis movement, since the primary winding 188 is secured to the knee, the saddle is moved in the direction of the arrow 1016 to center the Z axis secondary winding 189 over the arrow 1015.

For selecting and controlling the shifting of spindle speeds at required phases throughout a machine program, there are provided the fifteen cooperating pairs of speed selector switches identified at SP–1 to SP–15 inclusive shown on FIGS. 18 and 19, and corresponding to like switches in FIG. 2. Of these cooperating pairs of switches, switches RA–1 to RA–15 inclusive are sequentially operative to effect predetermined actuation of a relay bank 1020. The relay bank 1020 comprises four relays SP–10 to SP–13 inclusive which are respectively interconnected by conductors 1021 to 1024 inclusive to four contacts respectively associated with each of the switches RA–1 to RA–15 inclusive. The contacts actuated by energization of one of the relays SP–10 to SP–13 inclusive are represented in FIG. 20.

In a like manner, the respectively cooperating switches RB–1 to RB–15 inclusive are each provided with a bank of ten contacts respectively interconnected via conductors 1030 to 1039 inclusive to the coils of relays S–0 to S–9 inclusive that comprise a relay bank 1041. Energization of one of the relays in the relay bank 1041 is operative to effect closure of correspondingly identified contacts in FIG. 20. To selectively energize the spindle drive motor and shift the transmission for operating the spindle at speed SP–1, for example, the first pair of speed selector switches RA–1 and RB–1 are simultaneously connected to energize one relay in each of the relay banks 1020 and 1041. To accomplish this, as schematically shown in FIG. 19, there is provided a stepping switch 1042 having three wiper arms 1042A, 1042B and 1042C which are simultaneously and sequentially advanceable to engage corresponding contacts on associated banks of fifteen contacts. To effect a sequential, step-by-step advancement of the three wiper arms, there is provided the usual stepping switch coil 1043. As represented in FIG. 19, the three wiper arms of the stepping switch 1042 are in their home positions, and not engaging any of the fifteen associated contacts. As represented in FIGS. 18 and 19, the fifteen contacts associated with wiper arm 1042A are respectively interconnected by conductors 1045 to 1059 inclusive to the presettable switch contact arms of selector switches RA–1 to RA–15 inclusive. In like manner, the fifteen contacts associated with the stepping switch wiper arm 1042B are interconnected by conductors 1060 to 1074 inclusive with the presettable switch arms of the associated speed selector switches RB–1 to RB–15 inclusive.

With the stepping switch wiper arms advanced into engagement with their associated first contacts upon energization of stepper coil 1043, a circuit is then completed from the energized conductor 1078 via a conductor 1083, FIGS. 20 and 19, to the wiper arm 1042A. This circuit continues along the conductor 1045, FIGS. 19 and 18, to the preset switch arm 1084, associated with selector switch RA–1. From energized switch arm 1084, the circuit continues via the conductor M–1 to energize the relay S–10, the circuit being completed via conductors 1085 and 1086 to the energized supply conductor 675. The energized conductor 1083 is likewise connected to complete a circuit to the stepping switch wiper arm 1042B. With the wiper arm 1042B now engaging its first contact, the energized circuit continues via the conductor 1060, FIGS. 19 and 18, to a preset switch arm 1089 of selector switch RB–1. This circuit continues along conductor N–1 to energize the relay S–1, the circuit being completed via the common conductors 1085 and 1086 to the energized line 685. Upon energization of the relay S–1, the contacts associated therewith are moved to closed position, this condition likewise being represented in FIG. 20 for illustrative purposes.

As shown in FIG. 20, the closed contacts of the S–10 relay are disposed in coded combination with the closed contacts of the S–1 relay to effect the required energization of the spindle drive motor and shiftable adjustment of the speed transmission for operating the spindle at the selected rate.

In the described speed selecting condition, low speed motor relay 693 is energized in combination with the energization of shifting control valve solenoids 650 and 609, shown in FIGS. 11 and 20. Thus, a preselected shifting pattern is established for rotating the tool spindle at a selected speed upon a programmed command calling for spindle rotation in a selected clockwise or counterclockwise direction, as hereinbefore explained.

The remaining fourteen speed selections are accomplished in a similar manner by preselected energization of one relay in each of the relay banks 1020 and 1041, FIG. 18. Each subsequent command to shift speeds is accomplished upon closure of the normally open tool change contact TC to complete a circuit for energizing the coil 1043 for effecting a single step advancement of the associated stepping switch wiper arms. Although not shown, it will be understood that the usual repeat interrupter contact is operatively associated with the stepping switch coil 1043, FIG. 20, to insure a single stepping advancement of the wiper arms upon closure of the TC contact to conductor 1080.

In the event all of the fifteen available spindle speeds are not utilized during a particular machine program, it is necessary that all of the switch wiper arms be returned to their home position in preparation for initiating the next machine program. To accomplish this, after the selected speeds have been programmed, an EP relay is energized to indicate that that particular program has been completed. As this occurs, as shown in FIG. 20, an EP contact is closed completing a circuit from the energized conductor 1078 to energize a conductor 1131 connected to transmit current to the third stepping switch wiper arm 1042C for sequentially energizing the stepper coil 1043 to step the wiper arms to home position.

To facilitate the description, there are represented in the circuit drawings, FIGS. 21 and 22, sixteen sequentially interrelated pairs of program selector switches. This number of program switches is illustrated in lieu of the thirty-two pairs illustrated on sub-panel 55 of FIG. 2.

The third and fourth tiers of program selector switches 1B to 16B inclusive are respectively operative to energize a selected one of the ten relays comprising the relay bank BR, as shown in FIGS. 21 and 22. The only exception to this is the programming of a selected sub-cycle, as will hereinafter be more fully explained.

To provide branch circuits for selectively programming a sub-cycle, common conductors 1185 to 1188 inclusive are connected to branch conductors 1205 to 1208 inclusive. In a similar manner, the program selector switches 9B to 16B, in the fourth tier, are each provided with a bank of ten contacts individually connected by separate conductors to ten common conductors 1210 to 1219 inclusive.

As shown in FIG. 22, the four common conductors 1210 to 1213 inclusive, associated with the fourth tier of selector switches, extend transversely to interconnect with common conductors 1185 to 1188 inclusive for completing circuits via the four normally closed AS contacts to conductors 1195 to 1198 inclusive. For initiating a selected sub-cycle, the four common conductors 1210 to 1213 inclusive likewise are interconnected with branch conductors 1205 to 1208 inclusive. The common conductor 1219 is interconnected with common conductor 1194 for completing a circuit via the normally closed AS contact to the conductor 1199.

For selectively controlling the relay bank BR during a sub-cycle, the conductors connected to the coils thereof are respectively interconnected with ten transverse conductors 1225 to 1234 inclusive, the conductor 1234 being interconnected to conductor 1199. Whenever a sub-cycle is not being performed, five of the transverse conductors including 1229 to 1233 constitute common conducting paths for the fourth tier of program selector switches 9B to 16B inclusive.

In order to perform a preselected program of machine events or functions, it is necessary to sequentially activate successive, cooperatively related pairs of program selector switches, such as the preset switches 1A and 1B respectively. Power for completing circuits to accomplish this is derived from the energized conductor 674 via four transverse conductors 1137 to 1139 inclusive and 1140A which are respectively associated with the four tiers of program selector switches represented in FIGS. 21 and 22. For sequentially activating the sixteen pairs of program selector switches, there are provided sixteen sequentially energizable relays, the coils PH–1 to PH–16 of which are schematically represented in FIGS. 21 and 22. To initiate the first programmed function, therefore, the relay PH–1 is energized to close the associated pair of PH–1 contacts for respectively interconnecting energized conductors 1137 and 1139 with selector switch contact arms 72 and 76 respectively, of switches 1A and 1B. As soon as current is transmitted to the preset wiper arms 72 and 76 of the first pair of program selector switches 1A and 1B, the selected machine function or event is initiated and the relay coil PH–1 remains energized until that particular function is completed.

The control circuit via selector switch 1A can be traced from energized conductor 1137 via the now closed PH–1 contact to a branch conductor 1243, and thence via the preset switch contact arm 72 to one of the common conductors 1140 to 1149 inclusive, in a manner to effect energization of one of the ten relays, FIG. 22, of the relay bank AR. Upon energization of the preselected relay in relay bank AR, a circuit is completed from common conductor 1201 associated with relay bank BR to the energized conductor 675. At the same time, FIG. 21, an energized circuit for the cooperating program selector switch 1B is completed from energized conductor 1139 via the now closed PH–1 contact to a branch conductor 1244. From the energized conductor 1244, the circuit continues via the preset contact arm 76 of the selector switch 1B to one of the common conductors 1185 to 1194 inclusive. With this condition existing, as shown in FIG. 2, a preselected one of the relays BP–1 to BP–0 inclusive of the relay bank BR is energized. With one relay in each of the relay banks AR and BR now energized in code fashion, the preselected machine function is initiated.

In the event the preselected function operates to control positional movement, as hereinbefore explained, completion of that positional movement operates to advance the program to effect deenergization of the relay PH–1 in FIG. 21. With relay PH–1 now deenergized, the circuit to switch wiper arms 72 and 76 is interrupted effecting simultaneous deenergization of the code actuated relays. As soon as relay PH–1 has been deenergized, the relay PH–2 is energized to effect closure of an associated pair of contacts for initiating the next selected machine function.

It is not deemed necessary to describe in detail the circuits for initiating all of the machine functions, since each of them is generally similar to that hereinbefore described with respect to energization of relays PH–1 and PH–2. In all cases, the pair of contacts associated with each of the function control relays is identified for simplicity in tracing the energized circuits via a corresponding pair of the program selector switches.

For effecting the required sequential energization of relays PH–1 to PH–16 inclusive, FIGS. 21 and 22, there is provided a program controller 283 or stepping switch, as shown in FIG. 25. It will be understood that electronic or static switching devices may be used in lieu of the stepping switch represented as comprising the program controller 283 in FIG. 25. As schematically represented in FIG. 25, the stepping switch 283 is provided with five wiper arms 1251A to 1251E inclusive that are simultaneously indexed in a step-by-step manner upon energization of an associated stepping switch coil 1252.

As will hereinafter be more fully explained, four of the stepping switch wiper arms 1251A to 1251D inclusive are operatively interconnected with the recycle selector switches RE–1 and RE–2, which together comprise the recycle selectors 66 as explained with reference to FIGS. 2 and 7. The fifth wiper arm 1251E is indexably advanceable into engagement with individual contacts respectively connected to one terminal of the coils for program control relays PH–1 to PH–16 inclusive. The relay coils are respectively connected by conductors to a common conductor 1255 and a conductor 1256 connected to the energized supply conductor 675. Further, the fifth stepping switch wiper arm 1251E is connected to an energized conductor 1258 that, in turn, is connected to be energized by the energized supply conductor 674.

With the stepping switch wiper arms 1251A to 1251E positioned as represented in FIG. 25, each of them is in its home position prior to starting a preset program of machine events according to the preset adjustment of the sixteen pairs or program selector switches illustrated in FIGS. 21 and 22. For indexably advancing the wiper arms 1251A to 1251E inclusive from their home positions into engagement with the first contact of the banks of sixteen contacts, the stepping switch coil 1252 is energized manually. Upon advancement of the wiper arm 1251E into engagement with its first contact, a circuit is completed from energized conductor 1258, via the wiper arm 1251E and thence via the relay coil PH–1 to conductor 1256 connected to the energized conductor 675. Thereupon, the associated pair of PH–1 contacts in FIG. 21 are moved to closed position to simultaneously connect the first pair of program selector switches 1A and 1B for initiating the first preselected machine function. Upon completion of that function, the stepping switch coil 1252 is again energized to advance the wiper arms into engagement with their second contacts. Thus, the second PH–2 relay is then energized to initiate the next preselected machine function or event.

As shown in FIGS. 25 and 26, a circuit is completed to energize the stepping switch wiper arm 1251E from the energized conductor 674 along a transverse conductor 1260. This circuit continues from conductor 1260, FIG. 26, via a normally closed position complete contact IPR and thence via a normally closed action complete contact AC to a conductor 1261. The circuit continues from conductor 1261 to a horizontal conductor 1262, and thence via normally closed contacts R1 and R2 to energize the conductor 1258 which is directly connected to energize the stepping switch wiper arm 1251E, FIG. 25.

To initiate any predetermined program of machine functions, it is necessary to energize the program switch coil 1252 for initially effecting a single step, indexable advancement of the five wiper arms of the stepping switch 283 from their home position into engagement with the first contact. This is accomplished manually by momentarily depressing a program cycle start button switch 201 represented in FIGS. 7 and 26. Momentary closure of switch 201 completes a circuit from energized conductor 674 along conductor 1263 via the now closed program switch contact 1264 of switch 201 to a conductor 1265A which is connected via a now closed contact PSC to a conductor 1265, connected to directly energize the stepping switch coil 1252. The program coil is connected via a conductor 1266 to the energized supply line 675. As known in the art, contacts PSC, PSS, and PSR are operatively associated with the program stepping switch coil in the following manner:

(1) Contact PSC is closed only in the "home" position of the wiper arms, and is open during phases 1 to 16 inclusive.

(2) Contact PSS is open in the "home" position, and closed during phases 1 to 16 inclusive.

(3) Contact PSR is in closed position, only when the associated coil 1252 is deenergized, and is opened momentarily each time the coil 1252 is energized to constitute the repeat interrupter. Thus, contact PSR insures a single step indexable advancement of the wiper arms.

In the event a planned program stop is required during a program, the wiper arms will be advanced from "home" position and the contact PSC in line 1265A is in open position; and a program stop relay PS is programmed for operation to effect closure of a normally open PS contact in line 1265. Restarting of the program may then be effected by again depressing the program start switch 201, the circuit now being completed via the now closed PS contact directly to conductor 1265 for energizing coil 1252.

Immediately upon energization of the coil 1252, the stepping switch wiper arms are advanced to initiate the first program function by effecting energization of relay PH–1, FIG. 25. As soon as the first selected function has been completed, the program stepping switch coil 1252 is again energized to effect indexable advancement of the wiper arms into engagement with the next contacts. Upon completion of the first programmed function, assuming it was not positional movement, a circuit is completed from energized conductor 1263, via conductors 1269 and 1270 and thence via the momentarily closed, action complete contact AC to a conductor 1271. From the conductor 1271, the circuit continues via a conductor 1272, and thence through a normally closed AS contact to a conductor 1273. From the conductor 1273, the circuit continues along conductor 1265 to energize the program stepping switch coil 1252 for advancing the associated wiper arms to initiate the second programmed phase.

Assuming for illustrative purposes that the second program phase requires positionally controlled movement along a selected axis, then completion of that positional function effects closure of a position complete contact IPR to complete a circuit between an energized conductor 1275 and the conductor 1272. Again, the program advance circuit continues via a normally closed AS contact to conductor 1273, via conductor 1265 to energize the stepping switch coil 1252 for initiating the third selected program phase of operation. In a similar manner, the stepping switch coil 1252 is energized upon completion of each subsequent programmed function. Depending upon the function occurring during a particular phase, energization of the coil 1252 is effected either upon closure of the action complete contact AC along conductor 1270, or upon momentary closure of the position complete contact IPR to complete a circuit from conductor 1275.

It should be noted that the coil 1252 is energized for advancing the program to initiate a selected sub-cycle of events. Once initiated, i.e. during a selected sub-cycle of four preselected sub-phases of machine operation, however, the program stepping switch coil 1252 is not energized to initiate the next selected sub phase. During a sub-cycle of machine operations, therefore, the AS relay contact is retained in open position to preclude completion of an energized circuit to conductors 1273 and 1265.

Likewise, during a recycle function, the AS relay contact is retained in open position to preclude energization of the conductor 1273, even though the stepping switch coil 1252 is sequentially energized and deenergized to advance the five stepping switch wiper arms to the selected starting phase of the recycle function.

For illustrating the operation of a selected recycle function it will now be assumed that recycle selector switch RE–1 has been preset to its phase 3 position, and that this particular recycle is to occur during phase 12 of a predetermined sixteen phase machine program. To achieve this result, program selector switches 12A and 12B are preset to their S and P–7 positions respectively. This particular setting of the code operative program selector switches 12A and 12B is illustrated in FIG. 21. Thus, upon completion of the preselected function during the eleventh phase, the program controller advances one step to energize the PH–12 relay closing a pair of associated PH–12 contacts to render switches 12A and 12B operative to effect simultaneous coded actuation of relays AS and BP–7, as shown in FIG. 22. Thereupon, the associated normally closed AS contact, FIG. 26, is moved to open position to momentarily preclude energization of the conductor 1273. At the same time, another associated AS contact is closed, completing a circuit from energized conductor 674 via a conductor 1279 for energizing the conductor 1280. With the BP–7 relay now energized, an associated contact in FIG. 26 is likewise closed, completing a circuit directly to a wiper arm 1281 of the recycle controller 337, or stepping switch which is schematically illustrated in FIG. 26. From the wiper arm 1281, an energized circuit is immediately completed via a conductor 1284 to energize a relay R–1, this circuit being completed via a normally closed contact R–2 to a conductor 1285 connected to the energized supply line 675.

Upon energization of relay R–1, an associated normally closed contact R–1 is moved to open position to preclude energization of a relay R–2. Likewise, a normally open R–1 contact is closed completing a seal-in circuit to the wiper arm 1281 for retaining the relaly R–1 energized. The seal-in circuit for retaining relay R–1 energized is completed from a conductor 1279, a branch conductor 1287 connected via the now closed R–1 contact to a conductor 1288 connected via conductor 1289 directly to the wiper arm 1281. As will hereinafter be apparent, the seal-in circuit is necessary because contacts AS and BP–7 resume their normally open position as soon as the program stepping switch coil 1252 is energized to advance from the twelfth to the thirteenth phase of operation.

In the recycle function being described, it will be recalled that the recycle was programmed to occur during the twelfth program phase of a sixteen phase program, with the recycle selector switch RE–1 preset to program phase PH–3. With these conditions existing, the machine program operates to repeat program phases PH–3 to 11 inclusive, after which it automatically advances to initiate whichever of the program phases that has been selected by the preset condition of the cooperatively disposed recycle selector switch RE–2. To illustrate this selectivity, recycle selector switch RE–2 is shown as being preset to its phase fourteen position to thereby subsequently effect an advancement from recycled phase PH–11 directly to phase PH–14. It will be understood that presetting switch RE–2 to its PH–14 position will result in simply advancing from recycled PH–11 to PH–14, thereby bypassing PH–12, during which the described recycle function had been programmed to occur, as well as phase PH–13.

To accomplish the described recycle function, the program stepping switch coil 1252 is sequentially energized and deenergized to advance the five stepping switch wiper arms to their phase PH–3 position. Although the wiper arms are caused to pass through program steps 13 to 16 inclusive and one to two inclusive, no functions occur during this intermediate, or by-pass stepping movement of the wiper arms due to the preset position of recycle selector switch RE–1.

As shown in FIGS. 25 and 26, the conductor 1291 terminates in a stationary contact 1294 that is maintained in continuous frictional engagement with a rotatable switch plate 1295 secured to an insulated shaft 1296. The switch plate 1295 is so formed as to be in continuous conducting engagement with sixteen of the seventeen contacts respectively associated with conductors RC–1 to RC–17 inclusive. With the recycle switch RE–1 angularly adjusted to the third program phase, all of the conductors are in engagement with the switch plate 1295, with the exception of conductor RC–4. To prevent conducting engagement between the switch plate and conductor RC–4, a rectangular opening RO is formed in the periphery of the plate 1295. In addition to the switch 1295, recycle switch RE–1 is provided with another switch plate 1298 which is secured to the insulated shaft 1296.

As shown in FIG. 25, the second stepping switch wiper arm 1251B is selectively engageable with contacts connected to seventeen conductors EC–1 to EC–17 inclusive, each of the conductors terminating in a frictional contact that is selectively engageable with a single peripherally formed contact arm COA integrally formed with the switch plate 1298. With recycle switch RE–1 preset to its third phase position, switch plate contact arm COA is in engagement with the conductor EC–4.

From the energized switch wiper arm 1251–A, a circuit continues, as before described, via conductor RC–1 to switch plate 1295 to energize the conductor 1291 for effecting the next indexable advancement of the wiper arms. Indexable movement continues, until the wiper arms 1251–A and 1251–B are respectively moved into engagement with contacts associated with conductors RC–4 and EC–4 respectively. Since the energized conductor RC–4 is not in engagement with the plate 1295 because of the rectangular opening RO formed therein, the previously established stepping circuit to the conductor 1291 is now interrupted.

At this time, however, the energized wiper arm 1251B completes a circuit via conductor EC–4 and the switch contact arm COA to the plate 1298 which is frictionally engaged by a contact associated with the conductor 1301. This energized control circuit along conductor 1301 continues, as shown on FIG. 26, via the still closed R–1 contact to energize a relay RR–1 which is connected by a conductor 1303 to the energized conductor 675. At this moment, it will be recalled that the program control wiper arm 1251E has been indexably advanced into a position with a contact associated with the relay PH–3, this position corresponding to engagement of the recycle control wiper arm 1251B with the contact associated with conductor EC–4.

Referring again to FIG. 26, energization of the relay RR–1, as described, effects closure of an associated RR–1 contact to complete a circuit from energized conductor 1289 along a conductor 1304 to energize a coil for indexably advancing the recycle stepping switch wiper arm 1281, this circuit being completed to the energized supply lines 675. A single step indexable advancement of the recycle control wiper arm 1281 causes it to move into engagement with a contact associated with a conductor 1305. As the wiper arm 1281 indexably advances, the by-pass control circuit therethrough to conductor 1284 is interrupted, effecting deenergization of the coil R–1. Even though an associated R–1 contact returns to normally closed position, no circuit is completed from conductor 1305 via the now closed R–1 contact to energize the relay R–2. This is due to the fact that the seal-in circuit to wiper arm 1281 has now been interrupted by return movement of another R–1 contact to normally open position, thereby interrupting the circuit between the conductor 1288 and energized conductors 1287 and 1279. Further, the energized circuit from 1279 is precluded from energizing the wiper arm 1281 because the contacts AS and BP–7 are both in normally open position. It will be recalled that the AS and BP–7 contacts are closed only upon energization of the corresponding relays, this condition occurring in response to an operative interconnection of a pair of program selector switches as described. Deenergization of relay R–1 has likewise effected return movement of another associated R–1 contact to normally open position, interrupting the circuit between conductors 1291 and 1292. Further, another R–1 contact is now returned to its normally open position to interrupt the energized circuit from conductor 1301, to deenergize the relay RR–1. As this occurs, an energized circuit is reestablished from energized conductor 1260, normally closed contacts IPR and AC to conductor 1261, conductor 1262, and thence via the now closed R–1 contact and an associated R–2 contact to reenergize the conductor 1258 connected to the program control wiper arm 1251E. As this happens, of course, a circuit is immediately established to effect energization of relay PH–3 for repeating the preselected third phase of the sixteen phase machine program.

With the selected recycle portion of the program actually begun upon energization of relay PH–3 in FIG. 25 as described, relays PH–4 to PH–11 are sequentially energized, with each relay being energized upon completion of the prior function. Inasmuch as this described recycle was programmed to occur during phase 12, no function is now performed during program phase 12 at the completion of recycled program phase 11.

Again, however, during program phase PH–12, the preset program selector switches 12A and 12B are simultaneously connected to effect coded energization of the relays AS and BP–7, effecting simultaneous closure of the corresponding contacts in line 1279 of FIG. 26. Thereupon, a circuit is completed from energized conductor 1279, via the now closed AS and BP–7 contacts to the recycle stepping switch wiper arm 1281. With the wiper arm 1281 now advanced to engage the second contact, an energized circuit now continues via the conductor 1205, and the now closed R–1 contact to energize the coil R–2. Closure of a lower R–2 contact then completes a seal-in circuit from energized conductor 1279 and the conductor 1287 to the conductor 1289, connected via the wiper arm 1281 for retaining the relay R–2 energized. With the described circuit conditions now completed, and recycle selector switch RE–2 preset to its phase PH–14 position, the program is now operative to advance from phase PH–12, by-passing phase PH–13, thereby energizing the program control wiper arm to restart the program with phase PH–14.

Before explaining the effect of interconnecting recycle selector switch RE–2, its general relationship to the program controller 283 will now be described. Although different in function, switch RE–2 is similar in general configuration to switch RE–1. As shown in FIG. 25, one current conducting switch plate 1295A of switch RE–2 is simultaneously engageable with sixteen of seventeen frictionally engageable contacts connected to conductors RD–1 to RD–17 inclusive, these conductors terminating in a like number of contacts associated with wiper arm 1251C. With the switch RE–2 preset in its phase PH–14 position, as shown, only conductor RD–15 is not in conducting relationship with the plate 1295A, due to the peripheral opening formed therein.

Another switch plate 1310 is associated with seventeen frictional contacts respectively connected to conductors ED–1 to ED–17 inclusive, the latter terminating in a bank of contacts associated with the wiper arm 1251D. With the switch RE–2 preset to its program phase PH–15 position, therefore, a single radial contact arm of the plate 1310 engages a frictional contact associated with conductor ED–15.

At the moment of completing the recycled portion of the program, the program control wiper arm 1251E had been indexably advanced from phase PH–11 to PH–12, thereby effecting a reenergization of coils AS and BP–7, as described. With wiper arm 1251E now engaging the PH–12 contact, wiper arms 1251C and 1251D now engage contacts associated with conductors RD–13 and ED–13 respectively. Upon energizing relay PH–12, circuits had been completed via wiper arm 1320 to open one R–2 contact to interrupt an energized circuit to conductor 1258. Simultaneously, another R–2 contact was closed completing a circuit from conductor 1309 to conductor 1292. With these conditions existing, one circuit is then completed from energized conductor 1262, FIG. 25, via switch wiper arm 1251C to conductor RD–13, this circuit extending via switch plate 1295A to the output conductor 1309. From conductor 1309, the circuit continues via the now closed R–2 contact to conductor 1292 connected to effect stepping energization of the coil 1252.

Upon stepping advancement, to the next phase, relay PH–13 now remains deenergized, and another stepping circuit is immediately initiated. This circuit extends from wiper arm 1251C to conductor RD–14 to the plate 1295A, and via output conductor 1309 to energize the coil 1252 for advancing the wiper arms to phase PH–14. As this occurs, no circuit can be completed from conductor RD–15 to plate 1295A. A circuit is now completed, however, from wiper arm 1251D to conductor ED–15 which is now engaging the radial contact arm of plate 1310. This circuit continues via output conductor 1311, and thence via a now closed R–2 contact, FIG. 26, to energize a relay RR–2. As this occurs, an associated RR–2 contact is closed, completing a circuit from the still energized conductor 1289 to conductor 1304 connected to effect a single step indexable advancement of the wiper arm 1281 to its home position, engaging a contact connected to conductor 1284. As this arm 1281 advances, the R–2 relay along conductor 1305 is deenergized, immediately interrupting the previously established circuits to recycle switch RE–2, and interrupting the energized circuit previously established between energized conductor 1287 and 1289 to the wiper arm 1281. Likewise, deenergization of the relay R–2 permits return movement of another R–2 contact to its normally closed position to reconnect energized conductor 1262 to the conductor 1258. With conductor 1258 again energized, a circuit is immediately established via wiper arm 1251E to energize relay PH–14 for immediately interconnecting the corresponding pair of program selector switches for initiating the next program phase. With the main program now resumed, completion of the selected function for program phase PH–14, operates to advance the program for initiating phase PH–15 upon momentary closure of contacts AS or IPR, as hereinbefore explained.

Whenever the recycle stepping switch wiper arm 1281 is returned to "home" position, as viewed in FIG. 26, a contact PRS associated therewith is returned to its normally open position.

As shown in FIG. 26, the sub-cycle controller 303 comprises a stepping switch having a wiper arm 1320 sequentially engageable with one of four associated contacts in response to energization of an associated actuating coil SUS. With the wiper arm 1320 positioned as shown, it is in its home position engaging the first contact interconnected with a relay SA which is connected to a common conductor 1321 connected via a transverse conductor 1322 to the energized supply line 675. In the event a selected subcycle is programmed to occur during a particular phase of a machine program, a circuit is completed to energize the wiper arm 1320 which is then positioned in home position to complete a circuit for energizing the relay SA via conductors 1321 and 1322. Energization of the relay SA operates to immediately initiate the first sub-phase of whichever of the four available sub-cycles has been programmed to occur. Upon completion of that sub-phase initiated by energization of relay SA, FIG. 26, a circuit is completed to energize the actuating coil SUS to effect a single step indexable advancement of the associated wiper arm 1320 into engagement with the second contact for energizing a relay SB, connected to initiate the second subphase. In a similar manner, upon completion of the second sub-phase, the coil SUS is again energized to sequentially advance wiper arm 1320 into engagement with the third contact for energizing a relay SC which is then operative to initiate the third sub-phase. Upon completion of the sub-phase SC of the selected sub-cycle, the coil SUS again energized advancing the wiper arm 1320 into engagement with the fourth contact for energizing a relay SD which immediately initiates the fourth or last sub-phase of the selected sub-cycle.

Upon completion of the fourth sub-phase of a selected sub-cycle, the coil SUS is again energized to indexably advance the wiper arm 1320 to its starting, or home, position, as represented in FIG. 26. Simultaneously therewith, the energized circuit to the wiper arm 1320 is interrupted, and the program stepping switch coil 1252 is energized for advancing the associated wiper arms 1251A to 1251E inclusive for initiating the next preset phase of programmed machine operation. In other words, upon completion of the last sub-phase of a sub-cycle, the sub-cycle of operation is terminated and the next step in the main program initiated.

It will be apparent, therefore, that the relays SA, SB, SC and SD are sequentially energized by the wiper arm 1320 for respectively initiating one corresponding sub-phase of a selected sub-cycle of machine operation. For selecting the particular sub-cycle that is to be performed, a preselected one of the normally open contacts S–1 to S–4 inclusive is actuated to closed position. If, for example, that sub-cycle identified as P–1 is programmed to occur; the contact S–1 is closed upon energization of an associated coil, as will hereinafter be more fully described. Thus, an energized circuit is completed from supply line 674 along a conductor 1325, a common conductor 1326 and the now closed S–1 contact to energize a conductor 1328. The conductor 1328 is connected to energize the wiper arm 1320 for immediately energizing the relay SA which is then operative to initiate the first sub-phase of the selected P–1 sub-cycle. The remaining three sub-phases of the selected P–1 sub-cycle are then effected by sequential energization of relays SB, SC and SD after which the sub-cycle is terminated, and program controlled operation resumed in response to operation of the program stepping switch coil 1252.

The four normally open sub-cycle selector contacts S–1 to S–4 inclusive are provided with associated actuating coils, represented in FIG. 22. The four sequentially energizable relays SA to SD inclusive for sequencing the sub-phases occurring within a sub-cycle are provided with correspondingly identified associated contacts, FIGS. 23 and 24. Inasmuch as a sub-cycle is initiated by simultaneous energization of a pair of preset program selector switches, however, the arrangement for initiating this particular function is best explained with reference to FIGS. 21 and 22.

As represented in FIG. 21, the cooperating pair of program selector switches 11A and 11B have been respectively preset to their S and P–1 positions for initiating the P–1 sub-cycle during the eleventh phase of machine operation. With this condition existing, upon completion of the selected function for the tenth phase, the program controller 283 is indexably advanced to deenergize relay PH–10 and energize relay PH–11, thereby closing the pair of associated PH–11 contacts.

A first energized circuit is then completed from conductor 1138 via the now closed PH–11 contact to the wiper arm 1330 for program selector switch 11A. With the wiper arm 1330 engaging the fifth contact in the associated bank of contacts, the energized circuit continues via the branch conductor to the transverse conductor 1159 connected, FIG. 22, to a tranverse conductor 1174 interconnected with the common conductor 1144. Energization of the conductor 1144 effects energization of the relay AS, as hereinbefore explained. With relay AS energized, the five normally closed associated contacts in FIG. 22 are moved to open position to interrupt circuits to conductors 1195 to 1198 inclusive and to conductor 1199. Simultaneously therewith, the four normally open contacts associated with energized relay AS are closed to complete circuits from conductors 1205 and 1208 inclusive to conductors respectively associated with coils for the relays S–1 to S–4 inclusive. The relays S–1 to S–4 inclusive are connected to a common conductor 1332 which is connected via the conductor 1333 to the energized supply line 675.

With the S–1 relay shown in FIG. 22 energized, the associated S–1 contact, FIG. 26, is moved to closed position, immediately completing a circuit to energize the wiper arm 1320 of the sub-cycle controller 303. Simultaneously with the energization of the wiper arm 1320 to initiate the selected P–1 sub-cycle, another pair of normally open S–1 contacts are urged to closed position, as shown in FIG. 23. Closure of the S–1 contacts in FIG. 23 operate to condition circuits for selectively energizing the four cooperating pairs of sub-cycle selector switches comprising the first, or P–1 sub-cycle. A first energized circuit, FIG. 24, is established from the energized supply line 674 via a conductor 1334 to a conductor 1335, FIG. 23, via the now closed S–1 contact to a conductor 1336. As shown in FIG. 24, the energized conductor 1336 supplies current to four branch conductors 1337 to 1340 inclusive, respectively associated with sub-cycle selector switches SA–1 to SA–4 inclusive. The second energized circuit extends from conductor 674 along a conductor 1344 to a conductor 1345, FIG. 23, and thence via the now closed S–1 contact to a conductor 1346. Conductor 1346 is connected, as shown in FIG. 24, to four branch conductors 1347 to 1350 inclusive associated with the cooperating sub-cycle selector switches SB–1 to SB–4 inclusive. It will be recalled that during the first P–1 sub-cycle, each preselected sub-phase is sequentially controlled by a cooperating pair of sub-cycle selector switches, such as switches SA–1 and SB–1.

It will be noted that selector switches SA–1 to SA–4 inclusive are respectively provided with cooperating banks of ten contacts, with corresponding contacts being connected by branch conductors to transverse conductors 1355 to 1364 inclusive. The conductors 1356 to 1364 inclusive, as shown in FIG. 23, are respectively connected to conductors 1170 to 1179 inclusive, the latter conductors being respectively interconnected with conductors 1140 to 1149 inclusive, as shown in FIG. 22. Thus, operative connections are provided to effect selective energization of one of the ten relays comprising the relay bank AR.

In a similar manner, the cooperating selector switches SB–1 to SB–4, FIG. 24, are each provided with banks of ten contacts, the corresponding contacts being connected by branch conductors to conductors 1370 to 1379 inclusive. The conductors 1370 to 1379 inclusive extend to FIG. 23 for interconnection with conductors 1225 to 1234 inclusive. As hereinbefore explained with reference to FIG. 22, conductors 1225 to 1228 inclusive are respectively interconnected with conductors 1195 to 1198 inclusive, the latter conductors being connected to the relays BP–1 to BP–4 inclusive of the relay bank BR. Likewise, conductors 1229 to 1234 inclusive are respectively interconnected with conductors 1189 to 1194 inclusive, the latter being interconnected with the coils of relays BP–5 to BP–0 inclusive.

It will be apparent, therefore, that the four sub-cycle selector switches SA–1 to SA–4 inclusive, FIG. 24, are selectively and sequentially operative to energize a preselected one of the relays in relay bank AR. Likewise, th cooperating sub-cycle selector switches SB–1 to SB–4 inclusive are sequentially operative to individually energize a preselected one of the relays in relay bank BR. To effect this result, with the described circuit conditions having been completed, energization of relay S–A effects closure of four associated contacts, as shown in FIG. 24. A circuit is then completed from the previously energized conductor 1337 via the preset wiper arm 1351 of switch SA–1 to one of the conductors 1355 to 1364 inclusive.

Simultaneously therewith, another circuit is completed from energized conductor 1347 via a now closed S–A contact to the preset wiper arm 1352 of sub-cycle selector switch SB–1 for completing a circuit to a preselected one of the conductors 1370 to 1379 inclusive. As this occurs, the first preselected sub-phase is initiated in a manner identical to that hereinbefore described with respect to selective energization of a pair of program selector switches. In other words, the first sub-phase of the selected sub-cycle is initiated upon coded energization of one relay in each of the relay banks AR and BR, FIG. 22. Upon completion of the first selected sub-phase, the sub-cycle controller is actuated to effect deenergization of the coil S–A, schematically represented in FIG. 24. This is accompanied by immediate energization of the relay S–B to effect an operative interconnection of sub-cycle selector switches SA–2 and SB–2 into the control circuit. A first energized circuit is then established from conductor 1334, via branch conductor 1338 and the now closed S–B contact to the preset wiper arm 1383 of switch SA–2, FIG. 24. At the same time, another energized circuit is completed from the energized conductor 1346 via branch conductor 1348 and the now closed S–B contact to a wiper arm 1384 of selector switch SB–2. With the preset wiper arms of switches SA–2 and SB–2 now connected to transmit current, circuits are simultaneously established to effect preselected coded energization of one relay associated with each of the relay banks AR and BR to initiate the second sub-phase.

Again, upon completion of that sub-phase of operation, the sub-cycle controller advances to the next selected sub-phase by effecting energization of relay S–B and energization of relay S–C. Another energized circuit is then established from conductor 1336 via branch conductor 1339 to the preset wiper arm 1387 of sub-cycle selector switch SA–3; and simultaneously a circuit is completed from energized conductor 1346 via branch conductor 1349 to the preset switch contact arm 1388 of the cooperating selector switch SB–3. As before, depending upon the preset positions of wiper arms 1387 and 1388, two circuits are simultaneously established to effect the next required coded energization of one relay in each of the relay banks AR and BR, FIG. 22. Upon completion of the third selected sub-phase of the exemplifying sub-cycle of machine operation, the sub-cycle controller again operates to deenergize the sequence control relay S–C and effect energization of the relay S–D.

The last or fourth sub-phase of the illustrative sub-cycle is then effected by completion of a circuit from energized conductor 1336 via branch conductor 1340 to the preset switch contact arm 1391 of switch SA–4; and another energized circuit being completed from conductor 1346 via the branch conductor 1350 to the switch wiper arm 1392 of the cooperating switch SP–4. In a manner similar to that hereinbefore explained, simultaneous energized circuits are then established by cooperating selector switches SA–4 and SB–4 to energize one relay associated with each of the relay banks AR and BR for the last sub-phase. Upon completion of the fourth or last sub-phase, the two cooperating sets of selector switches SA–1 to SA–4 inclusive and SB–1 to SB–4 inclusive are simultaneously disconnected from the circuit and control is again transferred back to the program selector switches represented in FIG. 21. Completion of the last or fourth sub-phase, of any selected sub-cycle, therefore simultaneously operates to effect stepping movement of the sub-cycle controller and stepping movement of the program controller.

As the fourth or last sub-phase of the sub-cycle P–1 is initiated, contact IPR and AC are in their normally open positions. With the described circuit conditions existing, however, it will be apparent that relay SCM is energized immediately upon completion of the last sub-phase. The relay SCM is provided with an associated normally open contact SCM interconnected in a conductor 1415 that is connectable to the common conductor 1273 which, in turn, is connected via conductor 1265 to the coil 1252 for the main program controller or stepping switch 283, conditioning a circuit for energizing coil 1252.

Immediately upon completion of the fourth or S–D sub-phase, either the AC contact in line 1411, FIG. 26, or the IPR contact in line 1410 is actuated to closed postion, depending upon the coded identity of the function being performed. Thereupon an energized circuit is completed from conductor 1409 to the branch conductor 1412 to effect immediate energization of the sub-cycle complete relay SCM. As this happens, one associated SCM contact is moved to closed position, completing a time delay seal-in circuit between branch conductors 1409 and 1412 for insuring proper stepping energization of the program stepping switch coil 1252. Another associated SCM contact is closed completing a circuit from the energized conductor 1415 via branch conductor 1273 and conductor 1265 to energize the coil 1252, thus effecting immediate indexable advancement of the five associated wiper arms 1251A to 1251D inclusive, FIG. 25. Inasmuch as the described P–1 sub-cycle had been programmed to occur during the eleventh phase of opeartion, it will be recalled that the wiper arm 1251E had been maintained in continuous engagement with a contact for energizing the PH–11 relay. Irrespective of the duration of each of the four sub-phases occurring during the P–1 sub-cycle, the PH–11 relay is maintained in energized condition during the entire four sub-phases of the sub-cycle. This operates to insure retention of the program selector switches 11A and 11B in FIG. 21 in their activated conditions for continuously maintaining the associated sub-cycle identification relays in energized condition.

Another SCM contact is closed to complete a circuit from the momentarily energized conductor 1396 to a conductor 1406 via a now closed stepping switch contact PSU to the conductor 1405 for energizing the coil SUS thereby stepping the wiper arm 1320 from its fourth sub-phase position to its first sub-phase or "home" position. This circuit is momentary since it is in timed relationship with closure of contact IPR or AC indicating the last sub- phase is completed. Contacts PSU and SSU associated with sub-cycle wiper arm 1320 are moved from open to closed position whenever the wiper arm 1320 is advanced from its "home" or SA position, to one of its other three sub-phase positions.

With the P–1 sub-cycle now completed, the described energization of coil 1252 therefore effects single step advancement of the wiper arms for moving wiper arm 1251E into engagement with the conductor connected to effect energization of the next or PH–12 program control relay. As this occurs, the PH–11 relay is immediately deenergized, to disconnect the eleventh phase program selector switches from the circuit, effecting deenergization of the relays AS and S–1 in FIG. 22.

Deenergization of the S–1, or sub-cycle selector relay, effects return movement of its associated contact, FIG. 26, to open position thereby disconnecting the energized seal-in circuit to the conductor 1328 connected to the wiper arm 1320. As these circuit conditions have been occurring, the wiper arm 1320 has been indexably returned to its home or starting position, as viewed in FIG. 26, in preparation for reenergization to initiate any of the four sub-cycles. Likewise, with the PH–12 control relay now energized, the corresponding phase PH–12 pair of program control selector switches in FIG. 21 are now interconnected into the circuit for initiating the next phase of programmed machine operation.

The operation of either the P–2, P–3, or P–4 sub-cycles is effected in a manner similar to that hereinbefore described for the four complete sub-phases comprising the illustrative sub-cycle P–1. Generally, it might be stated that whenever a particular P–1 to P–4 sub-cycle is programmed to occur, the correspondingly identified selector relay is energized in coded combination with the AS relay.

As shown in FIGS. 23 and 24, the P–2 sub-cycle selector switches comprise four cooperating pairs including switches SC–1 to SC–4 inclusive and SD–1 to SD–4 inclusive. In all cases, the numerical suffix denotes the sequence of energizing the cooperating pairs of switches. In the P–2 sub-cycle, therefore, the first cooperating pair of switches includes those identified as SC–1 and SD–1 for the first sub-phase. The second sub-phase is controlled by preset coded activation of cooperating switches SC–2 and SD–2. Switches SC–3 and SD–3 combine to operate the third sub-phase, while cooperating switches SC–4 and SD–4 control the fourth or last sub-phase of a P–2 sub-cycle.

The P–3 sub-cycle selector switches comprise switches SE–1 to SE–4 inclusive and switches SF–1 to SF–4 inclusive, these switches likewise being arranged in cooperating pairs according to the numerical suffix. Operative interconnection of these particular four pairs of selector switches into the control circuit is effected upon closure of contacts S–3 in response to energization of the corresponding S–3 relay.

The last or P–4 sub-cycle comprises cooperating selector switches SG–1 to SG–4 inclusive, together with switches SH–1 to SH–4 inclusive. These four cooperatively disposed pairs of switches are connectable for preset operation upon closure of contacts S–4 in response to energization of the S–4 relay.

Initially, before a program is started, a circuit is completed from the energized conductor 674 along a conductor 1473, FIG. 27, via a now closed relay contact 1474C to a conductor 1476. This circuit continues from conductor 1476 via a now closed tool change complete contact TCC to energize a relay 1478 connected via a conductor 1479 to the energized conductor 675.

With the relay 1478 now energized, a seal-in circuit is established from the energized conductor 1473 via a conductor 1482 and a now closed contact 1478C to a conductor 1483 interconnected with the conductor 1476. This seal-in circuit via the now closed contact 1478C is established prior to actuation of the switch 439 by the code identified tool during clockwise rotation of the tool storage magazine. The established circuit via now closed contact 1478C is maintained until after the first tool change function has been completed, thereby effecting movement of a tool change complete contact TCC to open position, deenergizing relay 1478.

With the circuit via energized conductor 1482 now connected to maintain relay 1478 energized, a magazine control relay DCCW is in deenergized condition during which associated contacts operate to rotate the magazine in a clockwise direction for identifying the first, or coded tool upon momentarily depressing the program control start switch. To condition a circuit for initially effecting rotation of the magazine in a clockwise direction, as shown in FIG. 28, a circuit is completed from the energized supply conductor 674 via a conductor 1487, and a normally closed contact associated with the now deenergized relay DCCW to a conductor 1488 to the solenoid 567 connected to a common conductor 1490.

With a selected program preset and these conditions established, the program start switch 201 is momentarily depressed, thereby effecting momentary closure of an associated contact 201B, FIG. 27, to immediately effect clockwise rotation of the tool storage magazine for positioning the code identified tool at the change station. The starting circuit is completed from an energized conductor 674 via a conductor 1493, a normally closed program stop switch 1495 to a conductor 1496. From the conductor 1496, the starting circuit continues via the now closed contact 201B to a conductor 1497 connected via a now closed, automatic program stop contact 1500–PS to a conductor 1501 for energizing a program start relay 1504 connected via a conductor 1505 to the energized conductor 675. To maintain the relay 1504 energized, a seal-in circuit is established by closure of an associated normally open contact 1504C completing a circuit from conductor 1496 to the conductor 1497.

Energization of the program start relay 1504 effects closure of another associated contact 1504C, FIG. 28, completing a circuit from a vertical conductor 1490 to a conductor 1508 connected to the energized conductor 675. Closure of contact 1504C completes a circuit for energizing the solenoid 567 for effecting the required clockwise rotation of the tool storage magazine to identify the first or coded tool carried therein.

With the magazine now rotating in a clockwise direction, the coded tool carried thereby is moved in a corresponding direction to effect closure of the tool identifying switch 439, FIG. 27.

Closure of switch 439 completes a circuit from energized conductor 674 to a conductor 1509, connected via a conductor 1510 to a conductor 1511. This energized circuit continues from conductor 1511 via a normally closed end of program contact EP to energize the relay 1474 connected by a conductor 1512 to energized conductor 675. Energization of relay 1474 effects closure of an associated contact 1474C to complete a seal-in circuit from conductor 674 via conductor 1515 to the conductor 1510. Once the switch 439 has been energized to identify the coded tool holder, relay 1474 is maintained in energized condition during all subsequent indexable movement of the magazine and all required tool changing functions of a particular machine program. With the relay 1474 now energized, an associated normally closed contact 1474C is moved to open position interrupting the circuit between conductors 1473 and 1476. In spite of this, relay 1478 is maintained in its energized condition via the seal-in circuit completed by the closed contact 1478C to conductor 1483.

Another associated contact 1478C has already been moved to closed position completing a circuit between conductors 1517 and 1518.

With these conditions already having been established, it will be apparent that energization of conductor 1510 completes a circuit via a now closed contact 432–B to the conductor 1518, which continues via the now closed contact 1478C to the conductor 1517. Energized conductor 1517 is connected to energize a magazine control relay 1520 connected via a conductor 1521 to the supply line 675. Closure of one associated contact 1520C completes a seal-in circuit from energized conductor 1510, via a conductor 1523 to a conductor 1518, connected via the closed contact 1478C to conductor 1517. Closure of another associated contact 1520C completes a circuit between a conductor 1525 and a conductor 1526 connected to the relay DCCW which is interconnected by a conductor 1527 to the energized line 675.

During momentary continued rotation of the storage magazine in a clockwise direction, the beveled face of one of the locating dogs secured thereto effects a momentary actuation of switch 432 to immediately initiate reversed or counterclockwise rotation of the magazine. As this occurs, a circuit is completed from energized conductor 1510 via the momentarily closed contact 432A to a conductor 1530, connected via a conductor 1531 to energize conductor 1525, which is now connected via the closed contact 1520C to energize relay DCCW. This circuit is maintained for continuously energizing the relay DCCW until after the first tool interchange has been completed.

Upon energization of relay DCCW, the associated normally closed contact, FIG. 28, is moved to open position interrupting a circuit from energized conductor 1487 to 1488, thereby effecting deenergization of the magazine clockwise control solenoid 567. At the same time, closure of another associated DCCW contact completes a circuit from energized conductor 1487 and conductors 1534, 1535 to a conductor 1536. From the conductor 1536, the circuit continues to effect energization of the counterclockwise control solenoid 568, this circuit being completed via the common conductor 1490 and the now closed contact 1504C to the conductor 1508.

The described circuit conditions are effected in response to momentary closure of the switch 439 for positioning the first, or code identified tool at the tool change station. Thus, conditions are now established for effecting a transfer of the code identified tool from the storage magazine to the tool spindle. Before proceeding with a description of the detailed circuit for effecting a tool interchange, it is noted that all subsequent indexable movement of the storage magazine to position a next preselected tool at the change station is initiated upon momentary movement of the tool change complete contact TCC to interrupt the seal-in circuit from conductor 1483, permitting immediate deenergization of the relay 1478, FIG. 27. Upon deenergization of relay 1478, the lower associated contact 1478C is opened to effect deenergization of the relay 1520. Thereupon, the associated upper contact 1520C is opened to interrupt the seal-in circuit to conductor 1526, permitting deenergization of the relay DCCW. With the relay DCCW now deenergized, the associated contacts in FIG. 28 are so actuated as to deenergize the counterclockwise control solenoid 568 and simultaneously energize the clockwise control solenoid 567.

Upon resumption of rotation of the magazine in a clockwise direction, one beveled cam face of a magazine dog 420 operates to actuate switch 432, conditioning a circuit for initiating counterclockwise magazine rotation upon a second actuation of the same switch 432 by the next succeeding magazine dog.

In effect, the switch 432 is disposed to coact with two successive dogs during clockwise rotation of the tool storage magazine to constitute a novel counting circuit for actually rotating the magazine in its proper tool changing position by engagement of the third successive adjacent dog 420 with the pivoting locating or ratchet arm 424. Thus, all indexing movements of the magazine subsequent to closure of the tool identification switch 439 rely upon actuation of the switch 432 twice in succession for initiating rotation of the magazine in a counterclockwise direction for positioning the required next tool at the tool change station.

In response to momentary opening of tool change complete contact TCC, the relay DCCW is deenergized to immediately initiate clockwise rotation of the storage magazine. As this occurs, a first dog 420 passes completely by the switch 432 effecting closure of contact 432A, completing a circuit from energized conductor 1510 to conductor 1530 to energize an intermediate control relay 1540 connected via a conductor 1543 to the supply line 675. Energization of relay 1540 effects closure of an associated contact 1540C, thereby completing a circuit from energized conductor 1510, via conductor 1541 to the conductor 1483 connected via the now closed TCC contact to energize relay 1478. As before described, closure of an associated contact 1478C completes a seal-in circuit from conductor 1482 to the conductor 1483 for retaining the relay 1478 in energized condition, even though relay 1540 is deenergized upon reopening of switch contact 432A during its first actuation.

Closure of a lower contact 1478C associated with the energized relay completes a circuit from conductor 1517 to conductor 1518, thereby energizing relay 1520, and thus conditioning a circuit to initiate reversed magazine rotation the second time switch 432 is actuated. As this occurs, in response to engagement by the beveled face of the next adjacent magazine dog 420, the second closure of contact 432A completes a circuit to conductors 1530, 1531 to the conductor 1525. The circuit continues through the now closed contact 1520C, relay 1520 having been energized in timed relationship upon return movement of switch contact 432B to its normally closed position. With these conditions established, the energized circuit continues along conductor 1526 to energize relay DCCW for initiating counterclockwise rotation of the tool storage magazine to a dynamically controlled stop position, as hereinbefore described.

All subsequent indexable control movements of the tool storage magazine during the same program are accomplished in a similar manner.

Whenever the tool storage magazine is forcibly urged in a counterclockwise direction for maintaining a tool in the tool change station as described, a tool change function may be initiated either manually or automatically.

With the manual control contact 1550 in open position as shown in FIG. 27, a tool change can be initiated automatically by closure of a contact TC. Upon momentary closure of the relay contact TC, a circuit is completed from energized conductor 1554 to the conductor 1552 and the now closed contact TCC to the conductor 1560 for energizing the tool change start relay TCS. Closure of another associated contact completes a seal-in circuit for maintaining the relay TCS energized during the subsequent tool interchange. Closure of another contact associated with the relay TCS completes a circuit for energizing a relay ACW that is operative to initiate rotational movement of the tool change arm from its horizontal parked position to its vertical tool engaging position, as hereinbefore described.

With the contact TCS–C now closed, the seal-in circuit from energized conductor 1554 is now connected to effect energization of a conductor 1563 constituting the input supply line for effecting all machine movements necessary to a tool interchange. Prior to initiating the tool interchange, the saddle had been moved outwardly along the Z axis to retracted position thereby effecting closure of a saddle interlock switch 1564. With this condition established, a circuit is provided from the energized conductor 1563 to a conductor 1565 connected via a normally closed relay contact L3–C and the now closed tool change start contact TCS–C to a conductor 1566. With the tool storage magazine being urged in counterclockwise tool locating position, an associated DCCW contact is closed completing a circuit from conductor 1566 to a conductor 1570 which continues via a normally closed contact ACCW to energize the relay ACW connected via conductor 1571 to energized line 675. Energization of relay ACW, FIG. 27, effects closure of an associated contact, FIG. 28, to complete a circuit from energized conductor 1534, along a conductor 1573, via the now closed ACW contact to energize the solenoid 481 as hereinbefore described with reference to FIGS. 8 to 10 inclusive; energization of the solenoid 481 effecting rotation of the tool change arm 345 from its horizontal parked position into vertical tool engaging position, while retained in retracted position. As the solenoid 481 is being energized to rotate the tool change arm 345 from parked to vertical tool engaging position, another solenoid 504 is maintained in energized condition for simultaneously urging the tool change arm to its fully retracted position. The "tool in" circuit is provided from energized conductor 1534 to a conductor 1575 via a now closed contact TO to a conductor 1576 connected to effect energization of the solenoid 504.

As the tool change arm 345 is moved into its vertical tool engaging position, the switch 404 is actuated to initiate outward movement for withdrawing tools from the magazine and tool spindle respectively. With the change arm now in vertical position, therefore, a normally closed switch contact 404–B is opened, and an associated switch 404–A is moved to its closed position, completing a circuit from the energized conductor 1563 to a conductor 1580, FIG. 27. From the conductor 1580, the circuit continues to energize a relay L–3 connected via conductor 1581 to the energized line 675. Initially, therefore, one associated contact L3–C is opened to interrupt a circuit from energized conductor 1565 to deenergize the relay ACW. Another, normally open contact L3–C is now closed completing a circuit from energized conductor 1583 to a conductor 1584, this circuit now continuing via a normally closed LL–3 contact to a conductor 1587. The energized circuit from conductor 1587 continues to energize a relay TO for effecting outward movement of the tool change arm, this circuit being completed by a conductor 1588 to the line 675. Upon energization of the relay TO, the associated normally closed TO contact, FIG. 28, is opened to deenergize the solenoid 504. At the same time, an associated contact TO–A is closed, completing a circuit from energized conductor 1575 to energize a conductor 1590 connected to energize the collet release solenoid 509. At the same time, another associated contact TO–B is closed completing a circuit from conductor 1575 to a conductor 1591 for energizing a solenoid 498 for urging the tool change arm outwardly to withdraw tools. It will be understood that the "tool out" relay TO is maintained in energized condition during the subsequent 180° rotational movement of the tool change arm 345.

Upon arrival of the tool change arm at its outer limit of tool withdrawing movement, the sequence control switch 399 is closed to immediately initiate 180° clockwise tool interchange movement. Closure of the switch 399 completes a circuit from energized conductor 1565 to a conductor 1594 connected via the now closed LL3 contact to a conductor 1566. From the conductor 1566, the circuit continues via a now closed contact associated with the energized DCCW relay to the conductor 1570 to reenergize the relay ACW for initiating 180° clockwise rotational movement of the tool change arm.

At the start of this movement, the tool change arm is in vertical position in a manner that switch 404 is cam actuated, with contact 404A in closed position and contact 404B in open position. As the change arm rotates in a clockwise direction to its horizontal position, contact 404B closes to complete a circuit from energized conductor 1563 to a conductor 1596. This circuit continues from conductor 1596 via a now closed TO contact to energize a relay CL3 connected via a conductor 1497 to the energized line 675. Closure of an associated CL3 contact thus completes a circuit from a conductor 1599 to a conductor 1600 for effecting subsequent energization of a relay LL3.

Originally, upon arrival of the tool change arm in its outward position, switch 407 had been actuated completing a circuit to a conductor 1603 for energizing a relay TI connected via conductor 1604 to energize line 675. Closure of an upper associated contact TI completed one overlapping circuit from energized conductor 1605 to the conductor 1584 for maintaining the relay TO energized during 180° rotational movement. Simultaneously therewith, a normally closed TI contact is opened to interrupt a circuit from energized conductor 1608 to preclude premature energization of a relay ACCW, the latter being subsequently operative to return the change arm to its horizontal parked position. At the same time, an associated normally open TI contact, FIG. 28, is closed completing a circuit from the energized conductor 674, via a conductor 1610 to the conductor 1590 for maintaining the collet release solenoid 509 energized during reinserting movement of the interchanged tools.

With the various described circuit conditions having been established both prior to and during 180° rotational movement of the tool change arm, movement thereof is stopped in a vertical position with the interchanged tools now properly aligned for reinsertion, as hereinbefore explained. As this occurs, switch 404, FIG. 27, is again cam actuated moving contact 404A to closed position for completing an energized circuit to conductor 1580, thereby effecting reenergization of relay L3. At the same time, a circuit is completed from conductor 1580 via conductor 1599, the still closed CL3 contact, to conductor 1600. This circuit continues from conductor 1600 via a conductor 1612 to energize a relay LL3, the circuit being completed via a conductor 1614 to the energized line 675. Movement of associated contacts L3–C and LL–3 of the correspondingly identified now energized relays interrupts the energized circuit to conductor 1570 to effect deenergization of the relay ACW as the change arm is being urged inwardly by another energized circuit.

At the same time, movement of another normally closed LL–3 contact to open position interrupts a circuit from energized conductor 1583 to deenergize the "tool out" relay TO. Movement of an associated contact TO–B, FIG. 28, to open position deenergizes the "tool out" solenoid 498; and movement of associated contact TO–A to open position interrupts the circuit from conductor 1575 to conductor 1590. In spite of this, the collet release solenoid 509 remains in energized condition due to the overlapping circuit established via the now closed contact TI to energized conductor 1610. Further, upon deenergization of the relay TO, contact TO resumes its normally closed position to complete an energized circuit to the conductor 1576 for reenergizing the "tool in" solenoid 504 for effecting immediate reinserting movement of the interchanged tools.

As the tool change arm is completely retracted to reinsert the interchanged tools into their respective sockets, switch 407, FIG. 27, is actuated to closed position completing a circuit from energized conductor 1563 to conductor 1603 for energizing the relay TI.

With the interchanged tools now fully reinserted, therefore, movement of the associated TI contact to open position, FIG. 28, interrupts the energized circuit from conductor 1610 to deenergize the collet release solenoid 509, permitting resiliently operative reclamping of the tool in the spindle. This condition having been established, another associated TI contact is returned to normally closed position completing a circuit from conductor 1608 via a now closed LL3 contact of the corresponding energized relay to a conductor 1617. Energization of the conductor 1617 effects energization of a relay ACCW connected via conductor 1618 to the energized supply line 675. Thereupon, closure of an associated contact ACCW, FIG. 28, completes a circuit from energized conductor 1573 to energize the solenoid 489 for effecting counterclockwise rotation of the fully retracted tool change arm to its horizontal parked position.

Upon arrival of the tool change arm in horizontal parked position, the switch 405 is cam actuated to closed position thus completing a circuit from energized conductor 1617 to energize the tool change complete relay TCC, this circuit being completed via a conductor 1620 to the energized line 675. As hereinbefore explained, a normally closed contact TCC is opened to interrupt the originally established seal-in circuit from conductor 1554 to the relay TCS, permitting deenergization of this relay. Thereupon, all of the relays associated with the tool interchange circuit resume their normally deenergized conditions. At the same time, movement of another associated contact TCC interrupts a previously established holding circuit between the energized conductors 1473, 1482 and 1483, FIG. 27, to effect deenergization of the relay 1478 connected to the conductor 1479. Upon deenergization of the relay 1478, an associated contact 1478C resumes its normally open position and the previously established holding circuit to the relay DCCW is interrupted, as hereinbefore explained. As soon as relay DCCW is deenergized, solenoid 567 is reenergized, as explained, to initiate a clockwise rotation of the tool storage magazine for sequentially advancing the next preselected tool into the tool change station. For retaining that tool in the change station, it will be recalled that the cam initiated switching action effected a reenergization of the relay DCCW to deenergize solenoid 567 and reenergize solenoid 568 for urging the magazine to rotate in a counterclockwise direction for retaining the next tool in its proper tool changing position.

As described in connection with FIG. 27, a manual control switch 1550 can be moved to closed position for completing a circuit between conductors 1551 and 1552, thereby permitting operation of the automatic tool change mechanism in response to manually depressing the push button switch 1553 thereshown. With the switch 1550 moved to closed position, an associated contact 1550M, FIG. 28, is likewise closed to complete a circuit from the energized conductor 1622 to a conductor 1623. With this condition existing, another manual switch 1624 is movable to closed position for completing a circuit from the now energized conductor 1623 via a conductor 1625 and the conductor 1590 to energize the collet release solenoid 509. With the collet release solenoid 509 energized as described, a tool may be manually inserted or withdrawn from the tool spindle.

Included among the various programmed functions hereinbefore described to illustrate the diversity of operating commands are the following:

(1) Precise position and rate control instructions for effecting movement along one of three different axes.

(2) Tool change instructions including correspondingly preestablished spindle speed rate instructions to provide for rotating the next tool at the appropriate operating speed.

(3) Sub-cycle control instructions to provide for selectively controlling a plurality of sequentially related subfunctions at different points throughout a machine program.

(4) Recycle control instructions for predeterminately varying the sequence of functions provided in a preestablished machine program in a manner that functions available in portions of that program can be repeated.

In addition to the foregoing, a plurality of miscellaneous sub-functions are provided, as enumerated on the code chart in FIG. 2. As thereshown, these miscellaneous functions are programmed by adjusting one program selector switch in its "A" position in coded combination with the cooperating selector switch of the same pair being adjusted to its P–1 to P–4 position. Whenever circuits are completed to initiate any of these miscellaneous functions during a program phase, it is necessary to energize one of the relays P–1 to P–0 inclusive in coded combinations with the relay AA, closure of the associated contacts being represented in FIG. 28 for initiating the function selected.

In a modification, there is provided a greatly simplified positioning control indicating device schematically represented in FIG. 29. As thereshown, and as hereinbefore described with reference to the schematic block diagram in FIG. 7, a rotatable screw 97 journalled in the knee 43 threadedly engages a cross feed nut 98 secured to the saddle 45 for effecting selective movement along the Z axis. To effect precise positional control for Z axis movement, a winding comprising a lineal resistance 1760 is fixedly supported by the knee 43. As the screw 97 is rotated to effect Z axis movement of the saddle 45, a slider 1761 schematically represented as being supported by the saddle is moved along the lineal resistance 1760. The arrangement is such that a voltage command signal proportional to the distance to be moved is supplied to the winding 1760. Thereupon, servo controlled movement of the saddle 45 is effected in a manner similar to that hereinbefore described for moving the slider 1761 along the resistance 1760 until a null condition exists, at which time servo controlled movement is stopped. To effect the proper output voltage command signal, there are provided a plurality of separate, operatively interconnected lineal resistors 1763 to 1777 inclusive. Each of the resistors 1763 to 1777 inclusive is respectively provided with a plurality of transverse tabs, interconnected by normally open relay contacts individually engageable to complete a circuit to respectively associated conductors 1773 to 1777 inclusive. It will be apparent that one relay contact may be closed to complete a circuit between a respective one of the resistors 1763 to 1777 inclusive and the correspondingly associated spaced conductors 1773 to 1777 inclusive. Those contacts associated with the resistor 163 are individually actuated to closed position by energization of a corresponding relay TH–0 to TH–9 inclusive, this connection corresponding to the selected thousandths position. It will likewise be apparent that resistor 1764 is connected to conductor 1774 by selective energization of one of the relays H–0 to H–9 inclusive, for the hundredths position. In a similar manner, those relays schematically identified as TN–0 to TN–9 are indicative of the tenths position, selected energization of one completing a connection to the common conductor 1775 associated with resistor 1765. Likewise, the relays identified as U–0 to U–9 inclusive correspond to the unit position and are individually energizable to complete one preselected circuit from the resistor 1766 to its associated conductor 1776. The first digit of a preselected five digit number is achieved by selectively energizing one of the relays TE–0 to TE–2 inclusive, closing an associated contact to complete a circuit from resistors 1767 to 1777. The respective groups of relays associated with each of the five resistors correspond to relay banks 735 to 739 inclusive, hereinbefore described with reference to FIGS. 13 and 14. As thereshown, it will be recalled that simultaneous energization of one group of five associated position indicating switches effect simultaneous energization of one preselected relay in each of the relay banks 735 to 739 inclusive. Simultaneous energization of the preselected five relays represents a command input instruction of one five digit number, effected by one cooperating set of position switches, such as the switches PR–1 to PR–5 inclusive. Thus, it will be apparent that the simplified voltage command resistor network represented in FIG. 29 is operatively connected to be preset for effecting a desired positional movement.

Although illustrated diagrammatically in FIG. 29, it will be apparent that the positioning device thereshown may be operatively interconnected with the various command relays responsive to preset program controlled operation. These positioning devices for X, Y, and Z axis movement may be used in lieu of the specific form of lineal transducers represented in FIGS. 15, 16 and 17 as hereinbefore described.

Although the illustrative embodiments of the invention have been described in considerable detail for the purpose of disclosing a practical operative structure whereby the invention may be practiced advantageously, it is to be understood that the particular apparatus and control system described is intended to be illustrative only, and that various novel characteristics of the invention may be incorporated in other forms without departing from the spirit and scope of the invention as defined in the subjoined claims.

The principles of this invention having now been fully explained in connection with the foregoing description, I hereby claim as my invention:

1. In a machine tool having a plurality of relatively movable members capable of performing a plurality of different functions in predetermined sequence;

a plurality of presettable positioning measuring means operative to determine the relative position of each of said members;

a variable speed transmission selectively connectible to drive a predetermined one of said members at a predetermined setting of said positioning measuring means operative to deactivate said transmission mechanism for stopping movement of said support in predetermined position;

presettable control means including a plurality of manually settable switch means respectively operable in coactive groups to identify the member to be moved, the rate at which said transmission is operably connectible to drive the selected member, and to preset said positioning means for indicating the extent of movement of the selected member, each of said coactive groups of function switch means being energizeable when activated to correspondingly activate said preselected program measuring means and to connect said transmission for moving the selected member the required distance at the selected rate;

a sub-cycle control system comprising a plurality of separate sequentially interconnectible cycle select switch means presettable to program a cycle in which a plurality of said groups of selector switch means are activated;

a presettable program control system including a plurality of sequentially interconnectible program switch means respectively presettable to program the sequence in which individual groups of function switch means and said sub-cycle control are activated; and means responsive to preset actuation of said position measuring control means connected to effect sequential activation of said program switch means to effect corresponding activation of said function switch means and said cycle switch means for effecting a predetermined program of machine movements.

2. In a machine tool having a plurality of relatively movable members;

a plurality of power drive means selectively operative to move said members for performing selected predetermined functions;

a plurality of function controllers each being manually presettable in code fashion to operate a selected one of said power drive means for operating said associated movable member to perform the function selected;

control means for energizing one of said function controllers for controlling the function selected in accordance with its preset condition;

a sequentially operative sub-cycle controller manually presettable in code fashion to sequentially connect said control means to energize said function controllers for effecting a predetermined sub-cycle of machine functions;

a sequentially operative program cycle controller manually presettable in code fashion to sequentially connect said control means to energize said function controllers and to operate said sub-cycle controller in selected sequential relationship for effecting a predetermined program of machine functions including preset sub-cycles of machine functions; and sequence control means including cycle start means actuatable to effect sequential operation of said program cycle controller and said sub-cycle controller.

3. In a machine tool operable to perform a plurality of functions;

a plurality of power drive means selectively operable to perform the functions;

a sub-cycle controller comprising a plurality of sequentially actuatable sub-cycle selector means manually presettable to operate said power drive means in predetermined sequence for performing a selected subcycle of machine functions;

a plurality of sequentially actuatable program control means manually presettable to operate said power drive means and said sub-cycle controller in predetermined sequence for performing a preselected program of machine functions; and, sequence actuating means responsive to completion of a prior function connected to effect sequential actuation of said sub-cycle control means and said program control means in selectively coordinated relationship.

4. In a machine tool;

a plurality of power drive means selectively actuatable to perform a plurality of selected functions in predetermined sequence;

function complete control means operative in response to completion of a selected function by said power drive means;

sub-cycle selector means manually presettable to actuate said power drive means in predetermined sequence to perform a selected sub-cycle of machine functions;

main program selector means manually presettable to actuate said power drive means and said manually preset sub-cycle selector means in predetermined sequence for performing a selected program of machine functions; and sequence actuating means connected to be operated by said function complete control means and operative thereupon to effect sequential operation of said main program control means and said sub-cycle control means in cooperating predetermined sequential relationship.

5. In a machine tool program control system;

a plurality of function selector means connectible to identify the function, rate and extent of machine functions to be performed;

variable speed power driven means and position determining means responsive to activation of one of said function selector means for effecting a preselected machine function;

a plurality of sequentially interconnectible sub-cycle selector means respectively presettable to determine the sequence in which a plurality of preset ones of said function selector means are activated;

a plurality of sequentially interconnected program selector means respectively presettable to determine the sequence in which a plurality of said preset function selector means and said sub-cycle selector means are activated, and recycle selector means respectively presettable to selectively repeat the activation of certain of said program selector means in predetermined sequence; and means responsive to the completion of a preselected machine function connected to activate said program selector means and said recycle selector means.

6. In a machine tool provided with a plurality of power drive means selectively operative to perform different machine functions in predetermined sequence;

function complete control means actuatable upon completion of a function performed by said power drive means;

sequentially actuatable program control means selectively presettable to operate said power drive means in predetermined sequence;

a re-cycle controller presettable to selectively repeat certain of the machine functions preset by said program control means; and sequence control means operatively connected to actuate said program control means and said recycle controller.

7. In a machine tool adapted to perform a plurality of different functions in manually preset predetermined sequence;

a plurality of different power drive means respectively operable to perform a different selected function;

a plurality of function complete means connected to be actuated upon completion of a function initiated by one of said power drive means;

a sub-cycle controller comprising sequentially operable sub-cycle control means respectively presettable to actuate selected ones of said power drive means in predetermined sequence;

a program controller comprising sequentially operable program control means sequentially presettable to actuate selected ones of said power drive means and to operate said sub-cycle controller in predetermined sequence; and sequence control means connected to effect sequential actuation of said program control means for effecting a complete program of machine functions.

8. In a machine tool adapted to perform a plurality of different functions in predetermined sequence;

a plurality of different power drive means respectively operable to perform different preselected functions;

a selectively operable program controller comprising sequentially operative program control means selectively presettable to initiate a plurality of functions including the operation of selected ones of said power drive means in predetermined sequence;

a recycle controller adapted to be programmed for operation by said program controller, said recycle controller being presettable for subsequent operation to effect repetitive operation of a predetermined plurality of said program control means; and sequence control means responsive to completion of functions by said power drive means connected to effect sequential actuation of said program control means.

9. In a machine tool adapted to perform a plurality of different functions;

a plurality of power drive means selectively actuatable to perform corresponding different functions;

a sub-cycle controller comprising sequentially actuatable sub-cycle selector means respectively presettable for actuating one of said power drive means for performing a selected function in a manner to perform a plurality of machine functions in predetermined sequence;

a program controller comprising a plurality of sequentially actuatable program control means respectively presettable for actuating said power drive means and said sub-cycle controller in predetermined sequence to perform a predetermined program of machine functions; and presettable recycle control means connected to be selectively actuated by said program controller for effecting sequential reactuation of predetermined ones of said program control means.

10. In a machine tool adapted to perform a plurality of functions;

a plurality of power drive means respectively actuatable to perform different functions;

a program controller comprising sequentially actuatable coded program control means respectively presettable in code fashion for actuating said power drive means in predetermined sequence for performing a corresponding sequence of different machine functions;

a coded presettable recycle controller connected to be predeterminately actuated by said program controller for selectively reactuating a predetermined sequence of said program control means; and sequence control means operated by completion of machine functions effected by said power drive means for effecting sequential actuation of said program control means.

11. In a machine tool having a plurality of movable members;

separate translating means operable to move each of said members including a clutch and a brake associated with each of said translating means;

power operable means connected to normally maintain each of said clutches disengaged and each of said brakes engaged to preclude movement of said associated translating means;

single servo drive means connectible to operate a selected one of said translating means for moving said associated member; and control means connected to energize said servo drive means and to operate said power operable means for releasing one of said brakes and engaging the associated one of said clutches, whereby said single servo drive means is operable to operate one of said translating means at the same time said other translating means are braked against movement.

12. In a machine tool having a plurality of movable members;

separate translating means operable to move each of said members including a clutch and a brake associated with each of said translating means;

power operable means connected to normally maintain each of said clutches disengaged and each of said brakes engaged to preclude movement of said associated translating means;

singe servo drive means connectible to operate a selected one of said translating means for moving said associated member;

presettable control means connected to energize said servo drive means and to operate said power operable means for releasing one of said brakes and engaging the associated one of said clutches for moving a corresponding selected one of said members;

position determining control means responsive to movement of the selected servo driven member for disconnecting said control means to stop member movement;

a sub-cycle selector presettable to actuate a predetermined program sequence of said presettable control means;

a presettable program controller operative in code fashion to predetermine the sequence of member movement effected by said control means and to vary the extent of member movement effected by said position determining control means as well as to selectively actuate said sub-cycle selector; and, a presettable recycle selector predeterminately actuated by said program controller for selectively repeating selected member movements programmed by said program controller.

13. In a machine tool having a plurality of movable members;

presettable position control means connectible to limit the extent of movement of each of said members selectively and in any predetermined sequence;

a single servo drive selectively connectible to effect individual movement of each one of said members a predetermined distance and in any selected sequence relative to said other members;

program control means selectively actuatable to connect said single servo drive to move a selected one of said members at a time and simultaneously to connect said preset position control means to control the extent of movements of said corresponding members;

motion complete means responsive to arrival of said selected moving member at the position determined by said preset position control means and operative thereupon to deactuate said program control means for disconnecting said single servo drive and said position control means from said selected member; and, means for actuating said program control means for effecting movement of the same one or a different one of said members.

14. In a machine tool having a plurality of movable members;

separate brakes normally engaged for positively retaining correspondingly associated members in predetermined positions;

a preset positional control selectively connectible in any predetermined sequence to control the extent of movement of each individual one of said members at a time;

a single servo drive selectively connectible in any predetermined sequence to effect individual movement of each one of said members;

a controller actuatable to move a selected one of said members at a time and being simultaneously operative to disengage said brake associated with said selected member, to connect said single servo drive for moving said selected member, and to connect said preset positional control for controlling the extent of movement of said selected member; and, feedback control means responsive to said positional control for deactuating said servo drive upon arrival of said selected member in its preselected position and being operative thereupon to deactuate said controller for effecting reengagement of said brake, disconnection of said single servo, and disconnection of said positional control, whereby said selected member is retained in its next selected position.

References Cited by the Examiner

UNITED STATES PATENTS

| | | | |
|---|---|---|---|
| 3,099,873 | 8/1963 | Brainard | 29—568 |

References Cited by the Applicant

UNITED STATES PATENTS

| | | |
|---|---|---|
| 2,528,736 | 11/1950 | Bullard. |
| 2,859,290 | 11/1958 | Grinage. |
| 3,007,097 | 10/1961 | Shelley et al. |
| 3,009,399 | 11/1961 | Waters et al. |
| 3,016,804 | 1/1962 | Zankl et al. |

RICHARD H. EANES, Jr., *Primary Examiner.*